United States Patent
Hasegawa et al.

(10) Patent No.: US 8,572,450 B2
(45) Date of Patent: Oct. 29, 2013

(54) SYSTEMS AND METHODS FOR DETECTING AND CORRECTING ERRORS IN TRANSMITTED DATA

(75) Inventors: Eiji Hasegawa, Kawasaki (JP); Hironori Sakakihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 725 days.

(21) Appl. No.: 12/731,067

(22) Filed: Mar. 24, 2010

(65) Prior Publication Data

US 2010/0251035 A1 Sep. 30, 2010

(30) Foreign Application Priority Data

Mar. 27, 2009 (JP) ................................. 2009-080398

(51) Int. Cl.
*G06F 11/00* (2006.01)
*H03M 13/00* (2006.01)
*H04L 1/00* (2006.01)

(52) U.S. Cl.
USPC .......................................... 714/746; 714/819

(58) Field of Classification Search
USPC .................. 714/746, 748, 749, 712, 774, 819
See application file for complete search history.

(56) References Cited

U.S. PATENT DOCUMENTS

| 2003/0070172 A1 | 4/2003 | Matsuzaki | |
|---|---|---|---|
| 2003/0135784 A1* | 7/2003 | Yamaguchi et al. | 714/18 |
| 2005/0160345 A1* | 7/2005 | Walsh et al. | 714/776 |
| 2008/0301746 A1* | 12/2008 | Wiser et al. | 725/114 |

FOREIGN PATENT DOCUMENTS

| JP | H11-53194 A | 2/1999 |
|---|---|---|
| JP | 2002-218427 A | 8/2002 |
| JP | 2004-140663 | 5/2004 |
| JP | 2005-020437 | 1/2005 |
| JP | 2006-332935 | 12/2006 |
| JP | 2008-160698 A | 7/2008 |

OTHER PUBLICATIONS

Chin Keong Ho; Hongming Yang; Pandharipande, A.; Bergmans, J.W.M.; , "ARQ with Subcarrier Assignment for OFDM Systems," Signals, Systems and Computers, 2007. ACSSC 2007. Conference Record of the Forty-First Asilomar Conference on , vol., No., pp. 1723-1727, Nov. 4-7, 2007.*
Ying Zhu; Pu, K.Q.; , "Adaptive Multicast Tree Construction for Elastic Data Streams," Global Telecommunications Conference, 2008. IEEE Globecom 2008. IEEE , vol., No., pp. 1-5, Nov. 30, 2008-Dec. 4, 2008.*
Ji Xu; Jiangchuan Liu; Hsiao-Hwa Chen; Xiao Chu; , "Utility-Aware Resource Allocation for Multi-Stream Overlay Multicast," Communications, 2007. ICC '07. IEEE International Conference on , vol., No., pp. 506-511, Jun. 24-28, 2007.*
"Japanese Office Action" mailed by JPO and corresponding to Japanese Application No. 2009-080398 on Jan. 22, 2013, with partial translation.

* cited by examiner

*Primary Examiner* — Cynthia Britt
(74) *Attorney, Agent, or Firm* — Fujitsu Patent Center

(57) ABSTRACT

An information processing device includes: a receiving operation for receiving, from a transmission device, content and first verification data corresponding to divided content obtained by dividing the content; a detecting operation for detecting an error of the divided content based on second verification data to be calculated based on the divided content and the first verification data received in the receiving operation; and an obtaining operation for obtaining other divided content corresponding to the divided content having the error detected in the detecting operation from another information processing device different from the transmission device, when the error of the divided content is detected in the detecting operation.

13 Claims, 56 Drawing Sheets

FIG. 6

IP ADDRESS FILE 352

| BROADCAST DEVICE ID | VIDEO DATA ID | IP ADDRESS |
|---|---|---|
| A1 | 01 | ..21 |
| | | ..22 |
| | | ..23 |
| | | ..24 |
| | | ..25 |

FIG. 26

IP ADDRESS FILE 352

| BROADCAST DEVICE ID | VIDEO DATA ID | RELATED INFORMATION | IP ADDRESS |
|---|---|---|---|
| 110 | 1101 | 1201 | ··21 |
|  |  |  | ··22 |
|  |  |  | ··23 |
|  |  |  | ⋮ |
|  | 1102 | 1603 | ··21 |
|  |  |  | ··22 |
|  |  |  | ⋮ |
| 120 | 1201 | 1101 | ··24 |
|  |  |  | ··25 |
|  |  |  | ⋮ |
|  | 1202 | 1403 | ··24 |
|  |  |  | ··25 |
|  |  |  | ⋮ |
| 130 | 1301 | 1503 | ··28 |
|  |  |  | ··29 |
|  |  |  | ⋮ |

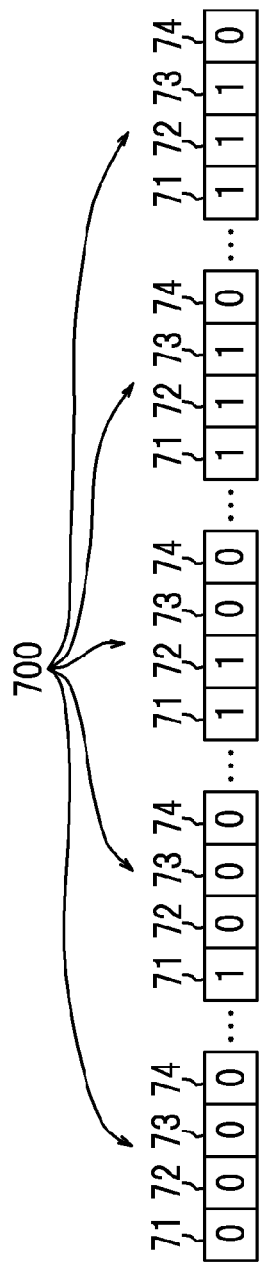

SYSTEMS AND METHODS FOR DETECTING AND CORRECTING ERRORS IN TRANSMITTED DATA

CROSS-REFERENCE TO RELATED APPLICATIONS

This application is based upon and claims the benefit of priority of the prior Japanese Patent Application No. 2009-80398, filed on Mar. 27, 2009, the entire contents of which are incorporated herein by reference.

FIELD

The present invention relates to a program, an information processing device, a content processing method, and a content processing system, whereby content transmitted from a transmission device is processed by an information processing device.

BACKGROUND

Transmission of content such as video, audio, a program, or the like has been performed from a transmission device to multiple information processing devices. With these content to be transmitted, an error may occur on data due to communication failure or the like. Techniques for detecting and correcting an error of content have been discussed in Japanese Unexamined Patent Application Publication No. 2002-218427, Japanese Unexamined Patent Application Publication No. 11-53194, and Japanese Unexamined Patent Application Publication No. 2008-160698.

SUMMARY

According to an aspect of the invention, an information processing device includes: a receiving operation for receiving, from a transmission device, content and first verification data corresponding to divided content obtained by dividing the content; a detecting operation for detecting an error of the divided content based on second verification data to be calculated based on the divided content and the first verification data received in the receiving operation; and an obtaining operation for obtaining other divided content corresponding to the divided content having the error detected in the detecting operation from another information processing device different from the transmission device, when the error of the divided content is detected in the detecting operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating the record layout of an IP address file;

FIG. 26 is a diagram illustrating the record layout of an IP address file;

FIGS. 43A and 43B are diagrams illustrating the transition of changed information;

DESCRIPTION OF EMBODIMENTS

In content broadcasting systems, errors sometime occur during broadcast. According to a previous invention, when an error occurs in received content, a device on the receive side sends a request for correct data to a device on the transmission side to recover error. So a device on the transmission side is requested to obtain error corrected data again. As a result thereof, an increase in communication traffic between the transmission side and the reception side, and an increase in load on the transmission side are caused.

According to an embodiment of the present invention, error verification data is added to the content beforehand, and the content is obtained from another information processing device at the time of detecting an error, thereby reducing communication traffic, and transmitting the content more effectively.

A program according to an embodiment of the present invention causes an information processing device for processing content transmitted from a transmission device to execute a receiving operation, a detecting operation, and an obtaining operation. In the receiving operation, the content, and a plurality of verification data corresponding to divided content obtained by dividing the content are received from the transmission device. In the detecting operation, an error of the divided content is detected based on verification data that is calculated based on the divided content and the verification data received in the receiving operation. In the obtaining operation, divided content corresponding to the content is obtained from another information processing device, when an error of the divided content is detected in the detecting operation.

According to an embodiment of the present invention, even in the event that there is an error within the divided content, the divided content is obtained from another information processing device, and accordingly, the processing load of the transmission device is reduced. Also, when the verification data is not transmitted, extra traffic is caused, for example, due to communication with another device which received the same content to determine whether or not the data matches. However, the transmission device transmits the verification data that is calculated based on the divided content, and accordingly, the program according to an embodiment of the present invention verifies an error of the divided content without communication with another information processing device. Accordingly, the program according to an embodiment of the present invention may not provide extra traffic for verifying an error of the divided content, and accordingly, reduces communication traffic between the transmission device and the information processing device or between information processing devices.

Figure 1:
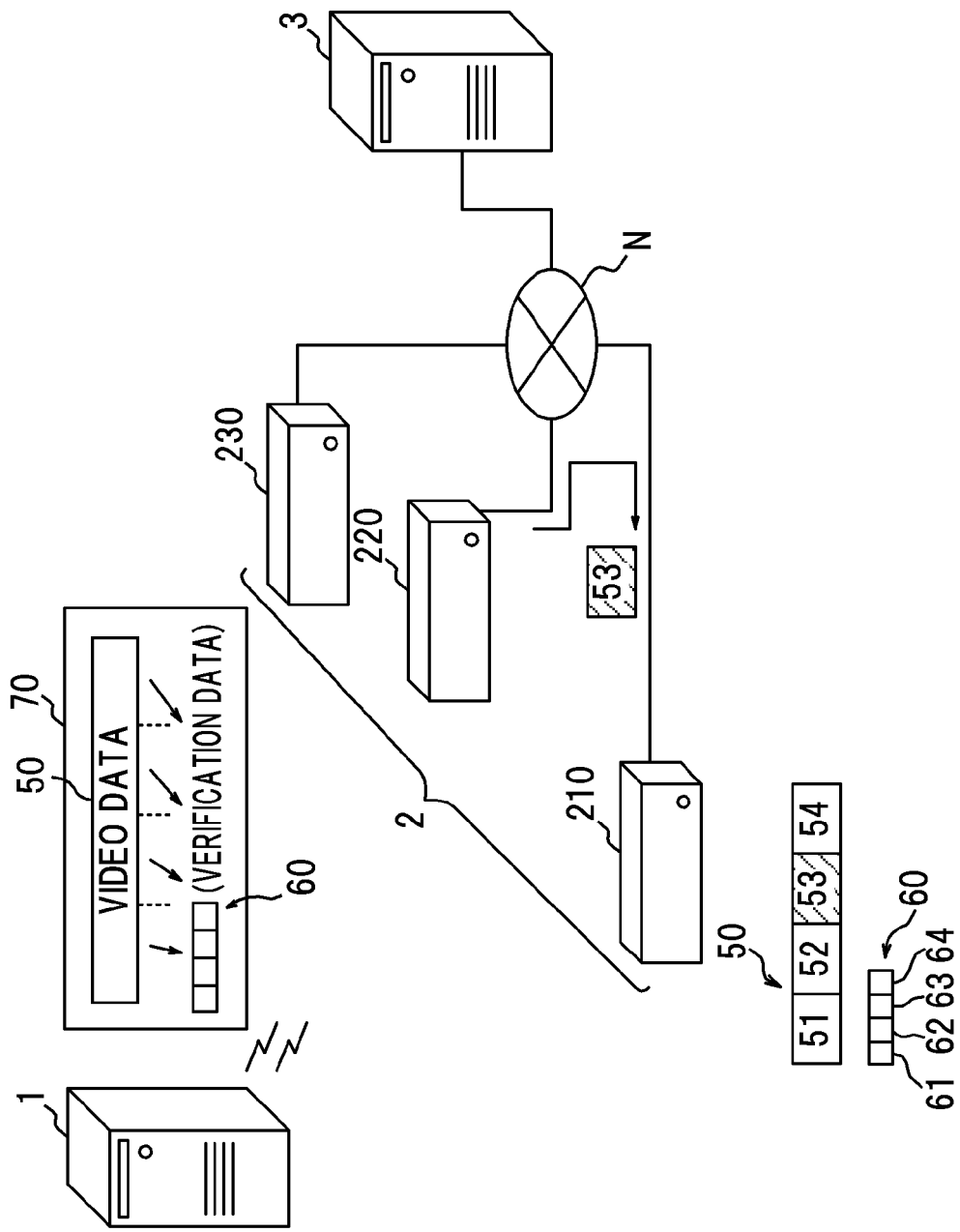
FIG. 1 is a diagram illustrating a content processing system.

An embodiment will be described with reference to the drawings. FIG. 1 is an explanatory diagram illustrating an outline of a content processing system. The content processing system includes a transmission device 1, a plurality of information processing devices 2, an information storage device 3, and the like. The plurality of information processing devices 2 includes individual information processing devices 210, 220, 230, and so on. The transmission device 1 is a device for transmitting content to the plurality of information processing devices 2. An example of the transmission device 1 is a broadcast device or intermediary device for transmitting video data and audio data by terrestrial digital broadcasting, and content such as various types of programs or the like. In addition, a server computer or the like for transmitting content via the Internet may be used as the transmission device 1.

With the present embodiment, in order to facilitate explanation, an example will be described wherein video data is transmitted as the content. Also, description will be made assuming that the transmission device 1 is a broadcast device 1 for transmitting video data using Moving Picture Experts Group-2 (MPEG-2) Transport Stream (TS) protocol by terrestrial digital broadcasting. In response to this, description will be made assuming that each of the plurality of information processing devices 2 includes a tuner. Note that the plurality of information processing devices 2 may be cellular phones, Personal Digital Assistants (PDA), televisions, recording devices such as DVDs or the like, car navigation devices, or the like as long as a tuner is mounted in each of the plurality of information processing devices 2. Also, in the case that the transmission device 1 is a server computer and content is provided to the plurality of information processing devices 2 by Internet Protocol (IP) through the Internet or the like, personal computers, PDAs, cellular phones, or the like may further be applied as the plurality of information processing devices 2. Hereinafter, the following descriptions will explain the processes of receiving and verifying received content using a tuner 2 and another tuner 2 as representatives of the plurality of information processing devices 2.

The tuner 2 is connected to an information storage device 3 via a communication network N such as the Internet or the like. The information storage device 3 is, for example, a server computer or database server, and exchanges information with the tuner 2 using, for example, Hyper Text Transfer Protocol (HTTP) or the like. Hereinafter, the information storage device 3 will be referred to as server computer 3. Subsequently, an outline of the content transmission system will be described. The broadcast device 1 packetizes and transmits transmission data in which verification data 60 is multiplexed to video data 50, to the tuner 2. The verification data 60 is data to be calculated based on divided video data obtained by dividing the video data 50 into a plurality of pieces. With the present embodiment, in order to facilitate explanation, description will be made regarding an example wherein the video data 50 is divided into four pieces. Note that the number of divisions is an example, and is not restricted to four. Also, data to be transmitted may include audio data, control data, caption data, and the like other than the video data 50, but in order to facilitate explanation, description will be made regarding an example wherein the video data 50 alone is processed.

The verification data 60 is data used for detecting an error of the transmitted video data 50. For example, CRC (Cyclic Redundancy Check) data of the video data, a hash value, or the like may be used as the verification data 60. The video data 50 includes four pieces of divided video data 51, 52, 53, and 54. The four pieces of the divided video data 51, 52, 53, and 54 will be referred to as divided video data 50D collectively for convenience sake. The verification data 60 includes four pieces of verification data 61, 62, 63, and 64. With the present embodiment, description will be made regarding an example wherein hash values are used. The four pieces of the verification data 61, 62, 63, and 64 are calculated corresponding to the four pieces of the divided video data 51, 52, 53, and 54. The verification data 60 serving as a set including a combination of the four pieces of the verification data 61 through 64 is multiplexed with the video data 50, and is repeatedly transmitted from the transmission start to the transmission end of the video data 50.

The tuner 2 calculates the hash value of each of the divided video data 51, 52, 53, and 54 (verification data 60) after completion of reception of the video data 50. The tuner 2 determines whether or not the calculated verification data 60 is identical to each of the received verification data 61, 62, 63, and 64. If the calculated verification data 60 and the received verification data 61, 62, 63, and 64 match, determination is made that there is no radio disturbance or the like, and that the received video data 50 is correct. On the other hand, if it is determined that the calculated verification data 60 and the received verification data 61, 62, 63, and 64 do not match, the divided video data 50D is obtained from another tuner 220 or 230.

For example, when the divided video data 53 includes an error, error-free divided video data 53 is obtained from, for example, another tuner 220 or 230. At this time, the tuner 210 requests the server computer 3 to obtain transmission destination information for specifying the tuners 2 which received the same video data 50. For example, an IP address or MAC (Media Access Control) address or the like is used as the transmission destination information as long as the transmission destination information may specify the tuner 2. Description will be made below assuming that the transmission destination information is an IP address. The server computer 3 transmits an IP address to the tuner 210 in response to the obtaining request. The tuner 210 refers to the IP address to obtain the divided video data 50D from, for example, the tuner 220 or tuner 230. Subsequently, the processing described above will be described in detail.

Figure 2:
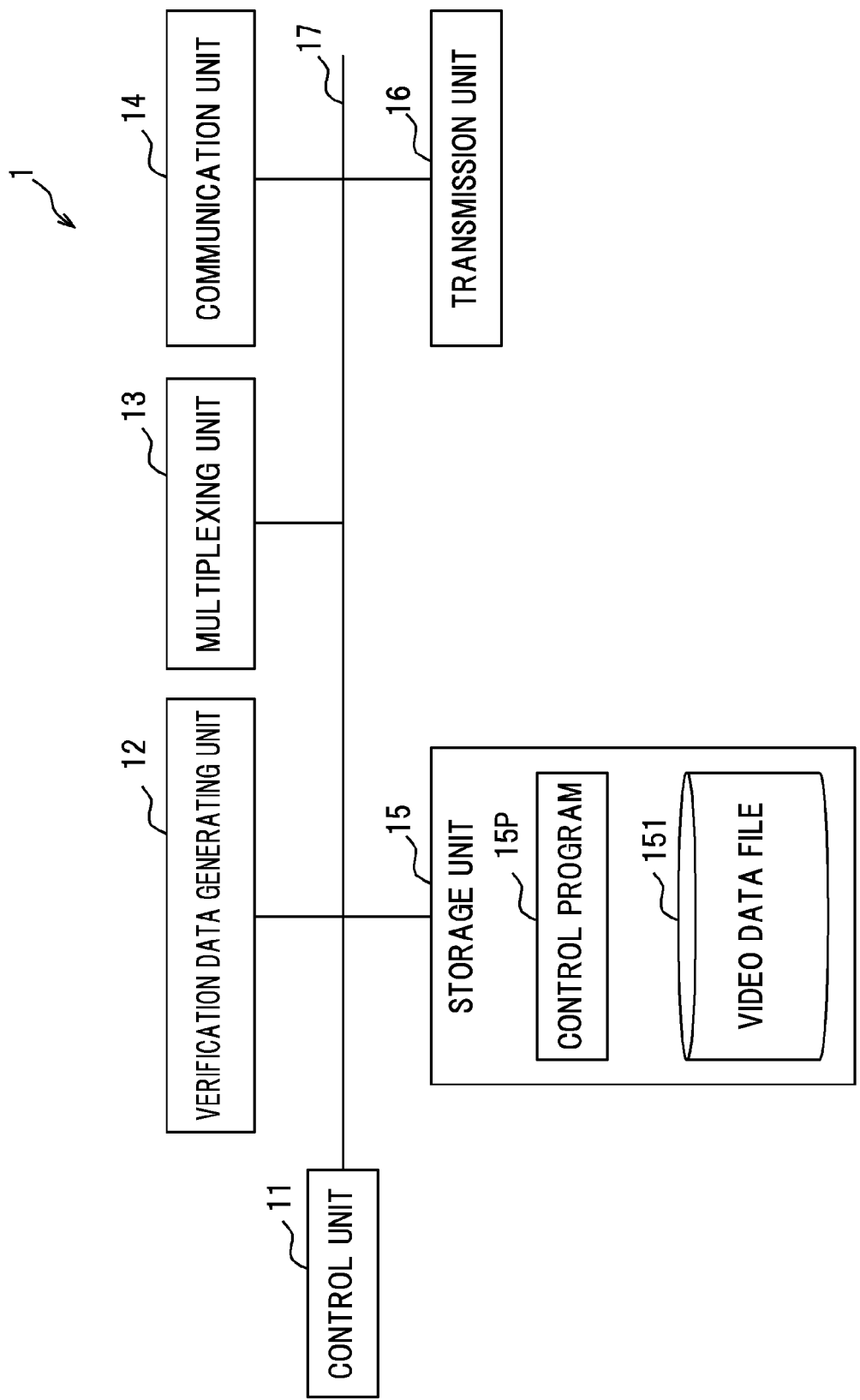
FIG. 2 is a block diagram illustrating the hardware of a broadcast device.

FIG. 2 is a block diagram illustrating the hardware of the broadcast device 1. The broadcast device 1 includes a control unit 11, a storage unit 15, a verification data generating unit 12, a multiplexing unit 13, a communication unit 14, a transmission unit 16, and the like. The control unit 11 includes a CPU (Central Processing Unit) and RAM (Random Access Memory), and the like. The control unit 11 is connected to each hardware unit of the broadcast device 1 via a bus 17. The control unit 11 controls each hardware unit of the broadcast device 1 in accordance with a control program 15P stored in the storage unit 15. The storage unit 15 is a hard disk or large-capacity memory, and stores the control program 15P and a video data file 151. Note that the video data file 151 may be made by obtaining the video data 50 from a database server as appropriate. In order to realize this, the video data file 151 is stored in the database server beforehand, and the database server is connected via the communication unit 14.

The video data file 151 stores the video data 50 scheduled for transmission. With the video data 50, a unique video data ID is prepared for specifying the video data 50. The video data file 151 stores the video data 50 scheduled for transmission in association with the video data ID. The communication unit 14 is a Local Area Network (LAN) card or the like, and exchanges information with another computer or the like (not illustrated) including the server computer 3 using HTTP or the like. The control unit 11 reads out the video data 50 to be transmitted from the video data file 151. Subsequently, the control unit 11 divides the video data 50 by the number of divisions to generate the divided video data 50D. Note that, with the present example, description will be made assuming that the number of divisions is four as an example, but the number of divisions is not restricted to this.

The control unit 11 outputs the divided video data 50D to the verification data generating unit 12. The verification data generating unit 12 reads out the hash function to generate the verification data 60 of the video data 50D divided in accordance with the instructions of the control unit 11. The verification data generating unit 12 also reads out the hash function for all of the divided video data 50D to generate a total of four pieces of the verification data 61, 62, 63, and 64. The verification data generating unit 12 outputs the verification data 61, 62, 63, and 64 to the multiplexing unit 13. Similarly, the control unit 11 outputs the corresponding divided video data 51, 52, 53, and 54 to the multiplexing unit 13. The multiplexing unit 13 repeatedly multiplexes the verification data 60 serving as a set of the four pieces of the verification data 61, 62, 63, and 64 to the video data 50.

Figure 3:
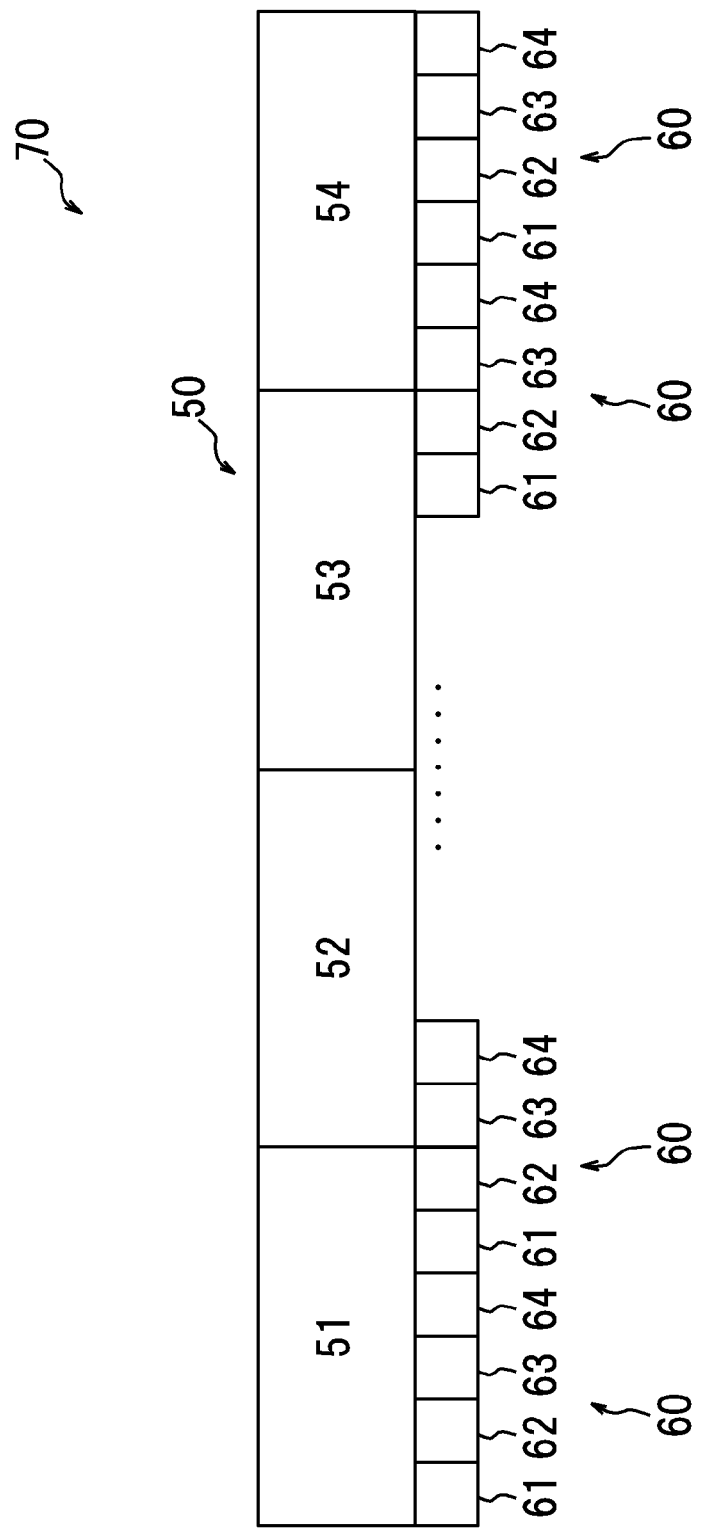
FIG. 3 is a diagram illustrating the data layout of transmission data.

FIG. 3 is an explanatory diagram illustrating the data layout of transmission data 70. The video data 50 is divided into four pieces and disposed in time series in the order of the divided video data 51, 52, 53, and 54. The verification data 60 to be multiplexed becomes a set of the verification data 61 corresponding to the divided video data 51, the verification data 62 corresponding to the divided video data 52, the verification data 63 corresponding to the divided video data 53, and the verification data 64 corresponding to the divided video data 54 in order.

The multiplexing unit 13 multiplexes a plurality of the verification data 60, 60, and 60 to the single divided video data 50D. The transmission data 70 completed by multiplexing is output to the transmission unit 16. The transmission unit 16 subjects the packetized transmission data 70 to modulation processing or the like, and transmits the transmission data 70 after modulation to the tuner 2.

Figure 4:
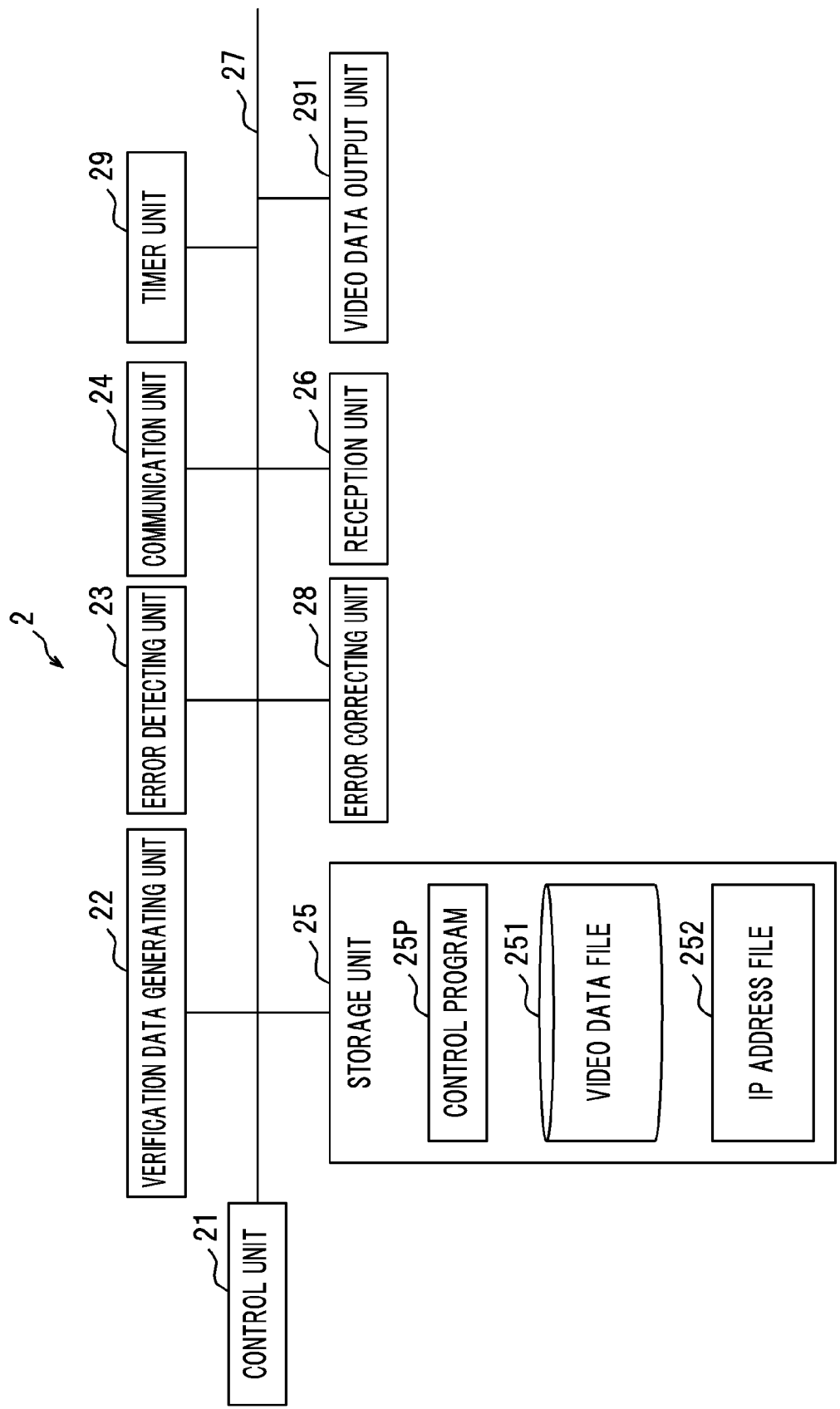
FIG. 4 is a block diagram illustrating the hardware of a tuner.

FIG. 4 is a block diagram illustrating the hardware of the tuner 2. The tuner 2 includes a control unit 21, a storage unit 25, a verification data generating unit 22, an error detecting unit 23, an error correcting unit 28, a communication unit 24, a timer unit 29, a video data output unit 291, and a reception unit 26. The control unit 21 including a CPU, RAM, and the like is connected to each hardware unit of the tuner 2 via a bus 27, and controls the hardware in accordance with a control program 25P stored in the storage unit 25. The timer unit 29 outputs point-in-time information to the control unit 21. The storage unit 25 is a hard disk or large-capacity memory, and stores the control program 25P, a video data file 251, and an IP address file 252.

The video data file 251 stores the video data 50 received via the reception unit 26 serving as an obtaining unit in association with the video data ID. The control unit 21 reads out the video data 50 stored in the video data file 251, and outputs video data 50 to the video data output unit 291. A monitor (not illustrated) is connected to the video data output unit 291, and displays the video data 50. The IP address file 252 stores the IP address of the server computer 3, and also stores the IP address of another tuner 2 obtained by later-described processing. The reception unit 26 receives the transmission data 70 transmitted from the transmission unit 16 of the broadcast device 1. The reception unit 26 demodulates the received transmission data 70, and outputs the demodulated transmission data 70 to the control unit 21. The control unit 21 outputs, to the verification data generating unit 22, the divided video data 50D after receiving all of the divided video data 51, 52, 53, and 54. The control unit 21 receives the verification data 60 repeatedly output from the reception unit 26. After receiving the verification data 61, 62, 63, and 64, each time the control unit 21 receives new verification data 61, 62, 63, and 64, the control unit 21 updates the new verification data 60.

The control unit 21 outputs the verification data 60 after updating to the error detecting unit 23. The verification data generating unit 22 calculates verification data (hash values) 61, 62, 63, and 64 of the divided video data 51, 52, 53, and 54 based on the hash function. The verification data generating unit 22 outputs the calculated verification data 61, 62, 63, and 64 to the error detecting unit 23. The error detecting unit 23 determines whether or not the verification data 61, 62, 63, and 64 calculated by the verification data generating unit 22 matches with the verification data 61, 62, 63, and 64 received by the reception unit 26.

Figure 18:
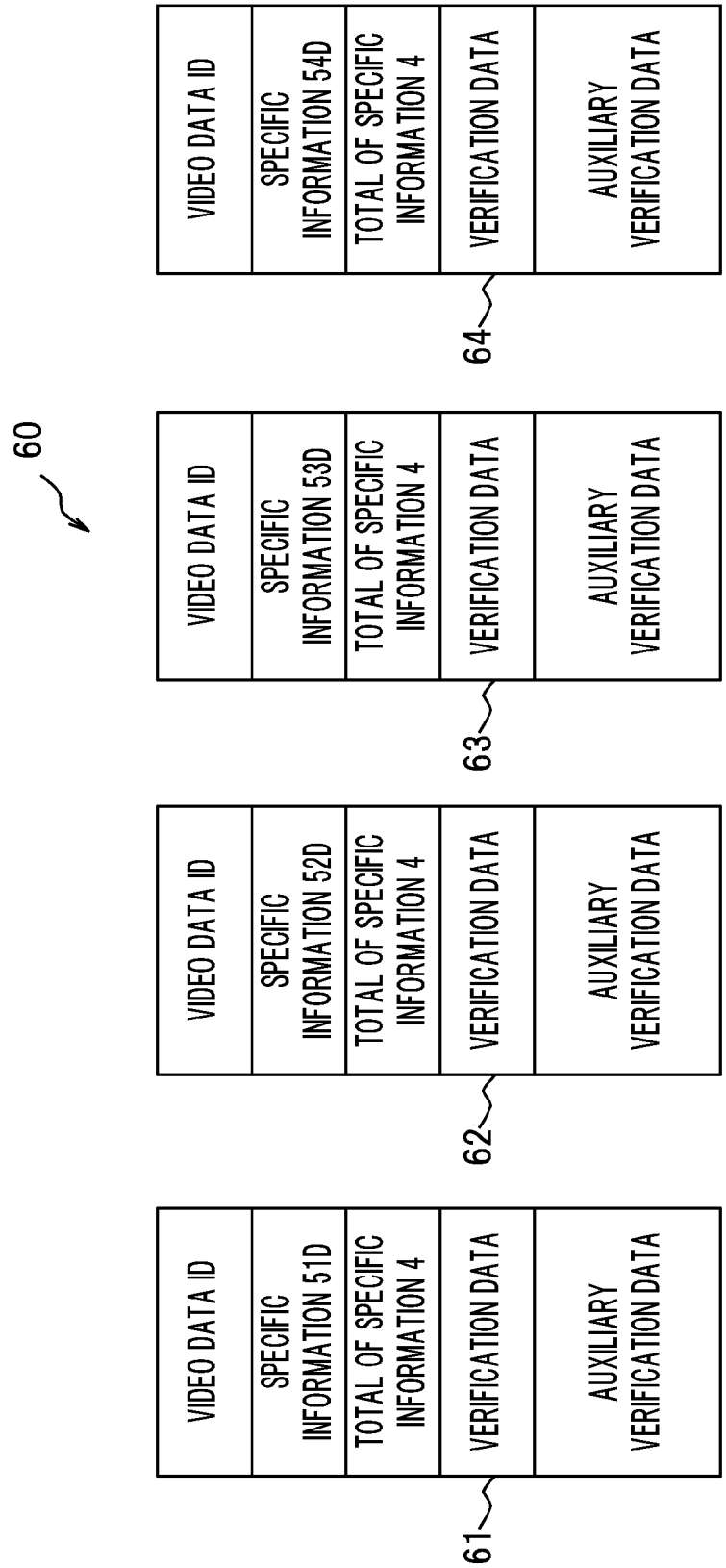
FIG. 18 is a diagram illustrating the record layout of verification data.

When a match is determined, the error detecting unit 23 outputs information stating that there is a match to the control unit 21. In response, the control unit 21 stores the divided video data 51, 52, 53, and 54 received from the reception unit 26 in the video data file 251 in association with the video data ID. When no match is determined, the error detecting unit 23 outputs specific information for specifying the divided video data 51, 52, 53, and 54 corresponding to the unmatching verification data 61, 62, 63, and 64, and error information to the control unit 21. The specific information is data for specifying any one of the plurality of the divided video data 51, 52, 53, and 54. The specific information may be a value indicating a sequence such as a sequence number as the value of "specific information" itself, for example. This specific information may be, for example as illustrated in FIG. 18, 51D as the specific information of the divided video data 51, 52D as the specific information of the divided video data 52, and the like.

In addition, a timestamp of the divided video data 51 may be 10 through 11, the timestamp of the divided video data 52 may be 11 through 12, the timestamp of the divided video data 53 may be 12 through 13, and the timestamp of the divided video data 54 may be 13 through 14. Also, an index of the divided video data 51 may be 51, the index of the divided video data 52 may be 52, the index of the divided video data 53 may be 53, and the index of the divided video data 54 may be 54. The control unit 21 outputs the video data ID, the specific information, and the unmatching verification data 60 to the error correcting unit 28.

The error correcting unit 28 outputs the video data ID to the communication unit 24 such as a LAN card or the like. The control unit 21 reads out the IP address of the server computer 3 from the IP address file 252. The control unit 21 refers to the read IP address and performs an IP address obtaining request to obtain the IP address of the tuners 2 which received the same video data 50 via the communication unit 24. At this time, the communication unit 24 transmits the video data ID, the communication unit 24's own IP address, and an IP address obtaining request.

Figure 5:
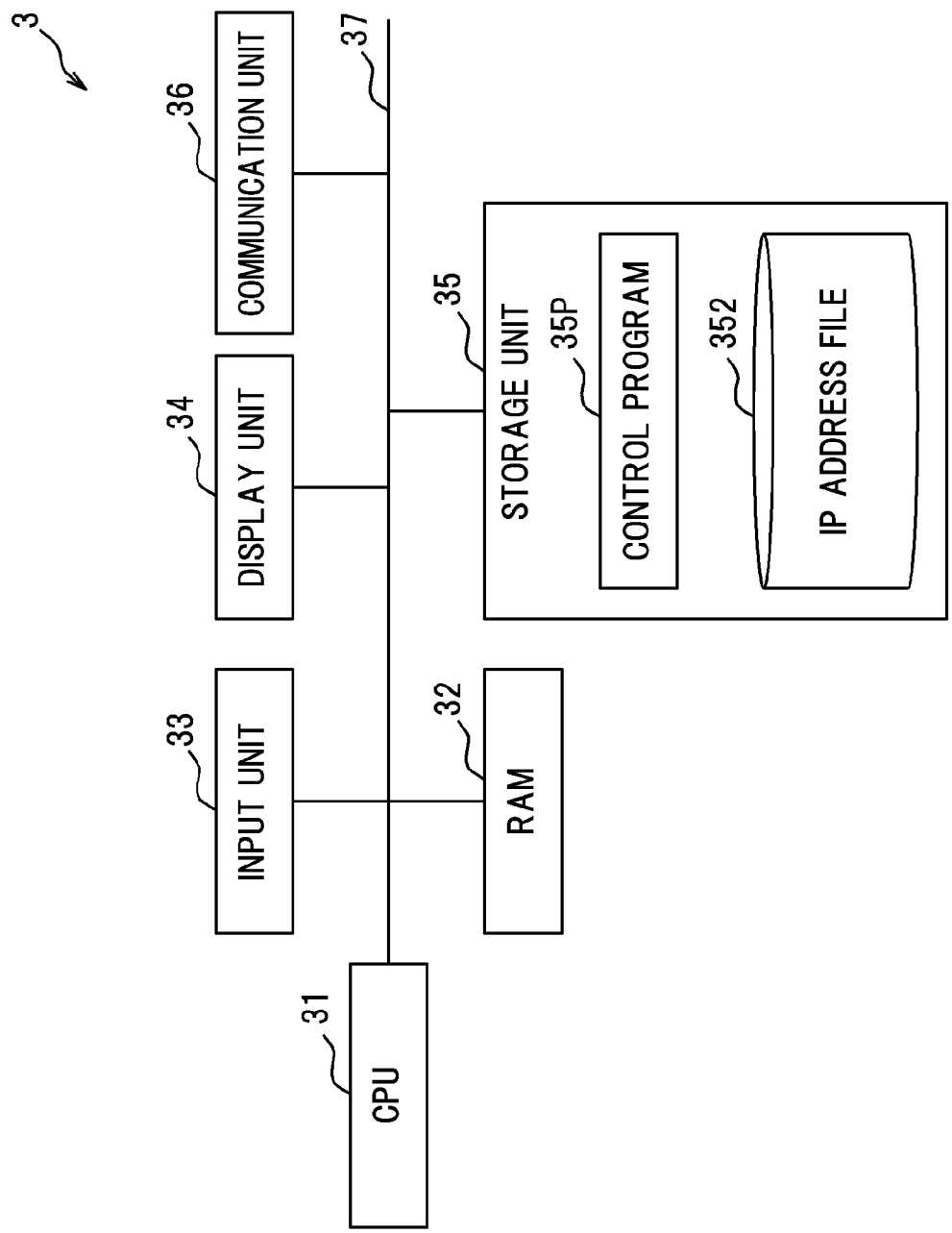
FIG. 5 is a block diagram illustrating the hardware of a server computer.

FIG. 5 is a block diagram illustrating a hardware group of the server computer 3. The server computer 3 includes a CPU 31, RAM 32, an input unit 33, a display unit 34, a storage unit 35, a communication unit 36, and the like. The CPU 31 is connected to each hardware unit of the server computer 3 via a bus 37, and controls the hardware in accordance with a control program 35P stored in the storage unit 35. The storage unit 35 is a hard disk or large-capacity memory, and stores the control program 35P and an IP address file 352. The input unit 33 is a keyboard or mouse or the like, and the display unit 34 is a liquid crystal display or the like. The communication unit 36 is, for example, a LAN card or the like, and exchanges information with another computer (not illustrated) including the broadcast device 1 and the tuner 2 using HTTP or the like.

The server computer 3 receives the video data ID, and the IP address of the tuner 2 at an appropriate timing from the broadcast device 1 via the communication unit 36. The CPU 31 stores the received video data ID and the IP address of the tuner 2 in the IP address file 352. FIG. 6 is an explanatory diagram illustrating a record layout of the IP address file 352. The IP address file 352 includes a broadcast device ID field, a video data ID field, and an IP address field, and the like. The broadcast device ID field stores unique identification information for determining the broadcast device 1. With the example in FIG. 6, "A1" is stored as the broadcast device ID of the broadcast device 1. The video data ID field stores the video data ID for determining the video data 50 that the broadcast device 1 transmitted to the tuners 2, in association with the broadcast device ID.

The IP address field stores the IP address for determining the tuner 2 which is the transmission destination of the video data 50 in association with the broadcast device ID and video data ID. In the case of receiving the video data ID, the IP address of the tuner 2 itself, an IP address obtaining request, and the like from the tuner 2, the CPU 31 searches the IP address file 352. The CPU 31 reads out, of the IP addresses corresponding to the video data ID, an IP address other than the IP addresses including the transmitted own IP address. The CPU 31 transmits the read IP address to the tuner 2.

The control unit 21 of the tuner 2 receives the IP address via the communication unit 24. The control unit 21 refers to the received IP address to transmit an obtaining request for the divided video data 50D including an error to another tuner 2 via the communication unit 24. At this time, the control unit 21 outputs the video data ID, the specific information, control unit 21's own IP address, and an obtaining request to another tuner 2. The other tuner 2 receives the obtaining request to read out the divided video data 50D corresponding to the video data ID and the specific information from the video data file 251. The control unit 21 of the other tuner 2 transmits the divided video data 50D to the tuner 2 via the communication unit 24. The tuner 2 receives the divided video data 50D via the communication unit 24.

The control unit 21 outputs the received divided video data 50D to the verification data generating unit 22. The verification data generating unit 22 calculates the verification data 60' based on the hash function. The verification data generating unit 22 outputs the calculated verification data 60' to the error detecting unit 23. Subsequently, determination is made whether or not the verification data 60 received from the broadcast device 1, and the verification data 60 based on the divided video data 50D received from the other tuner 2 match. If a match is determined, the error detecting unit 23 outputs information indicating the match to the control unit 21. The control unit 21 refers to the specific information of the divided video data 50D received from the other tuner 2 to connect the divided video data 50D, and the video data 50 by combining the other divided video data 50D. The control unit 21 stores the connected video data 50 after correction in the video data file 251 in association with the video data ID.

Figure 7:
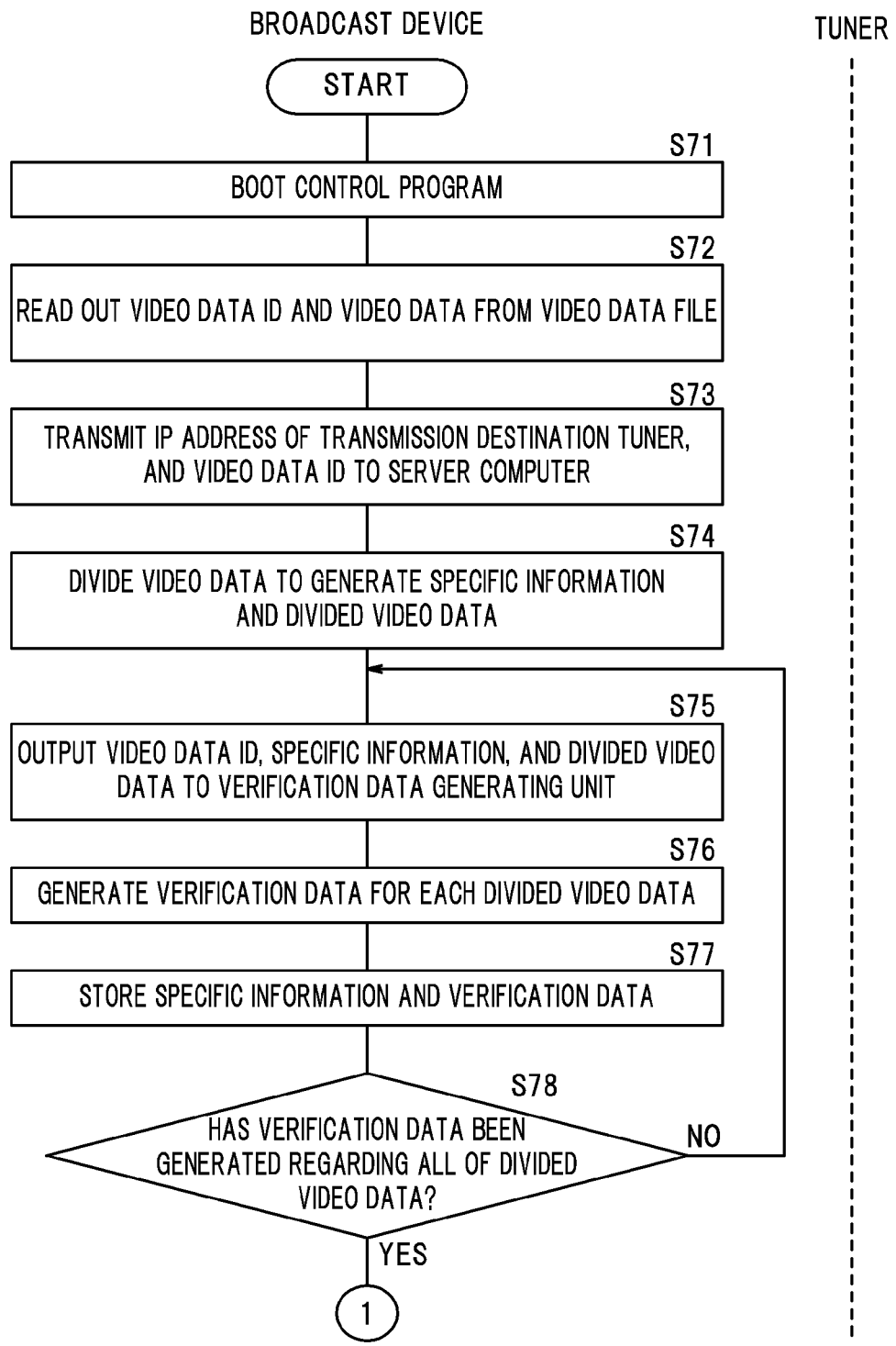
FIG. 7 is a flowchart illustrating transmission procedures of transmission data.
Figure 8:
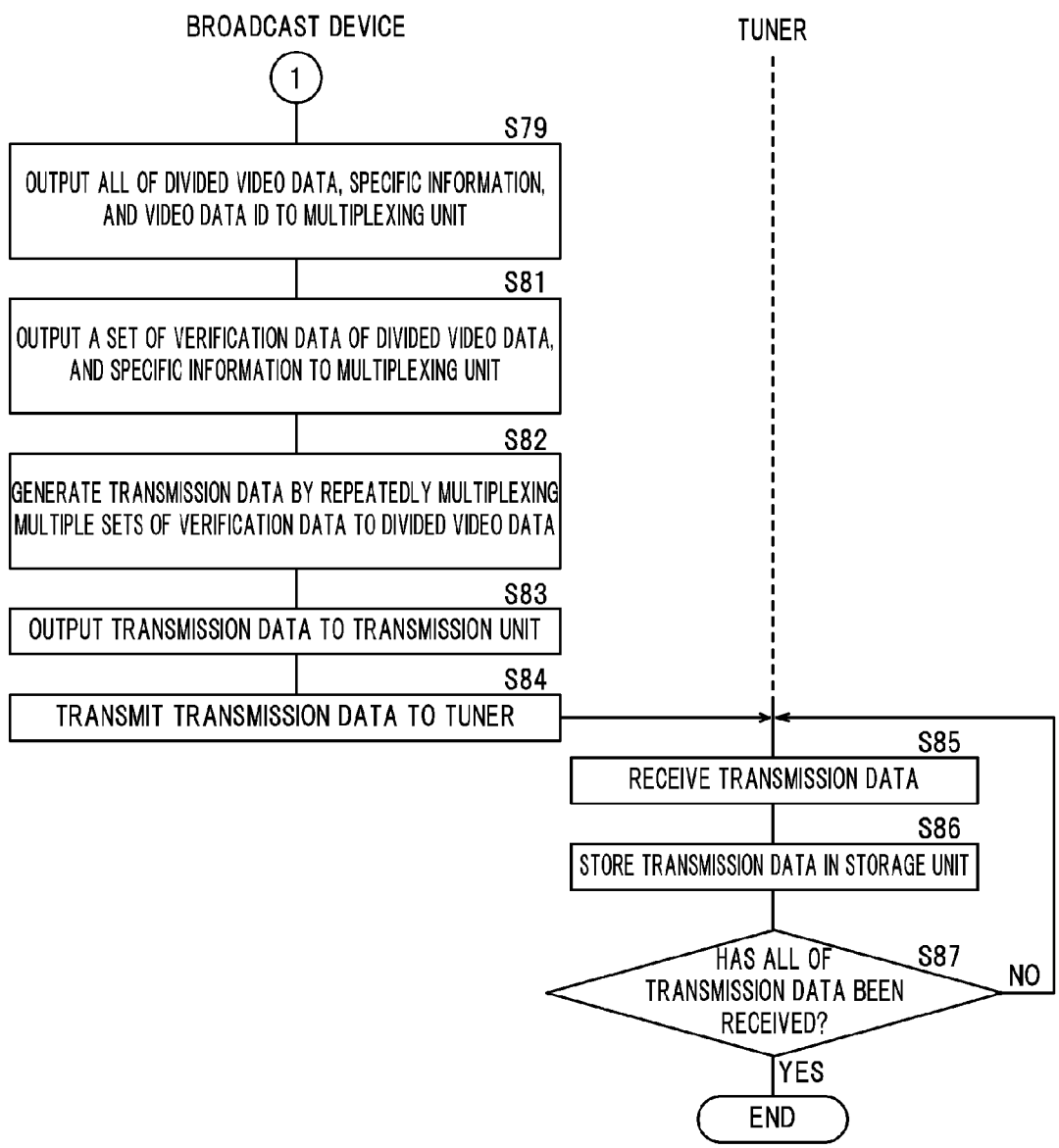
FIG. 8 is flowchart illustrating the transmission procedures of transmission data.

With the above hardware, the procedures of transmission/reception processing will be described using a flowchart. FIG. 7 and FIG. 8 are flowcharts illustrating the transmission processing procedures of the transmission data 70. The control unit 11 of the broadcast device 1 boots the control program 15P (operation S71). The control unit 11 reads out the video data ID and video data 50 of a transmission object from the video data file 151 (operation S72). The control unit 11 reads out the IP addresses of the tuners 2, that are transmission destinations stored beforehand in the storage unit 15. The control unit 11 transmits the read IP addresses and video data ID to the server computer 3 via the communication unit 14 (operation S73). Note that the processing in operation S73 may not be performed, and rather, another computer not illustrated may transmit the IP addresses and video data ID to the server computer 3.

Figure 9:
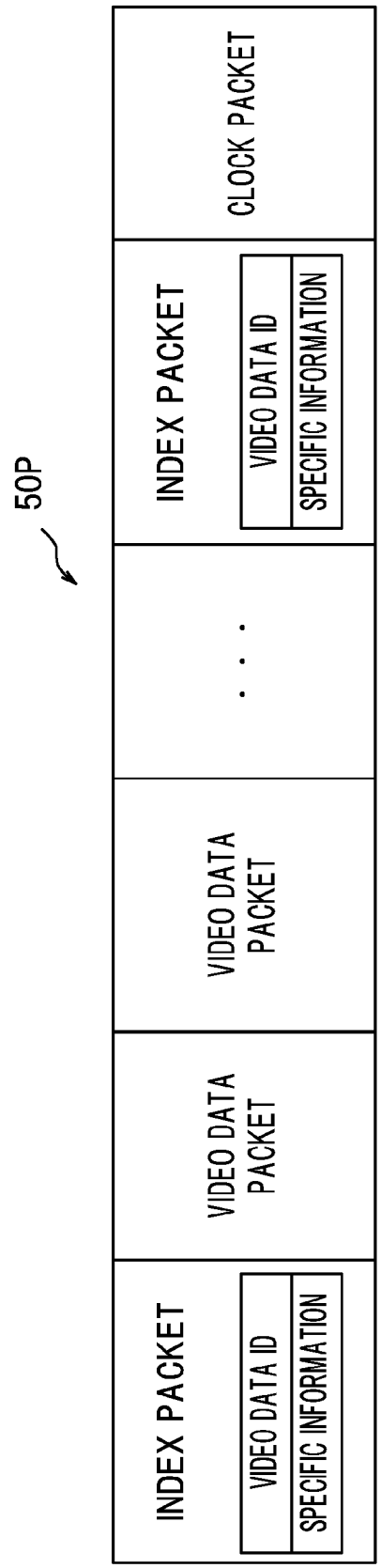
FIG. 9 is a diagram illustrating the record layout of divided video data.

The control unit 11 divides the read video data 50 in accordance with the number of divisions stored in the storage unit 15 beforehand to generate specific information and divided video data 50D (operation S74). FIG. 9 is an explanatory diagram illustrating a record layout of the divided video data 50D. The divided video data 50D is further packetized into a plurality of video data packets. An index packet is added to the packet of the divided video data 50D. The video data ID and specific information are described in this index packet. In addition, a clock packet for defining reproducing timing of the video data 50, and the like are included. The control unit 11 outputs the video data ID, the specific information, and the divided video data 50D to the verification data generating unit 12 (operation S75).

Figure 10:
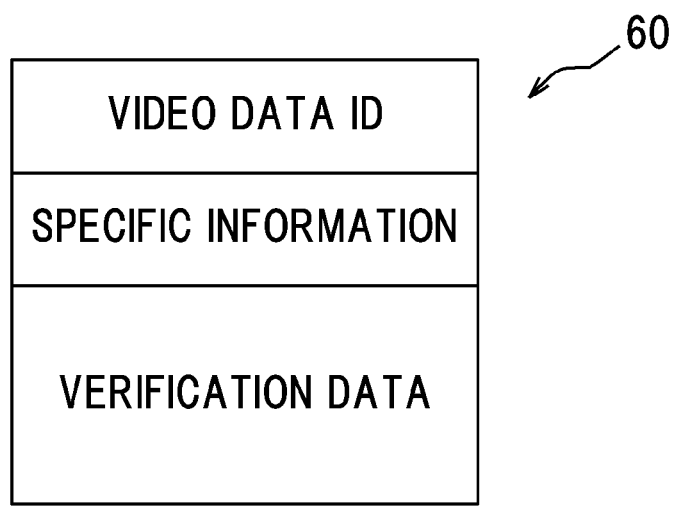
FIG. 10 is a diagram illustrating the record layout of verification data.
Figure 11:
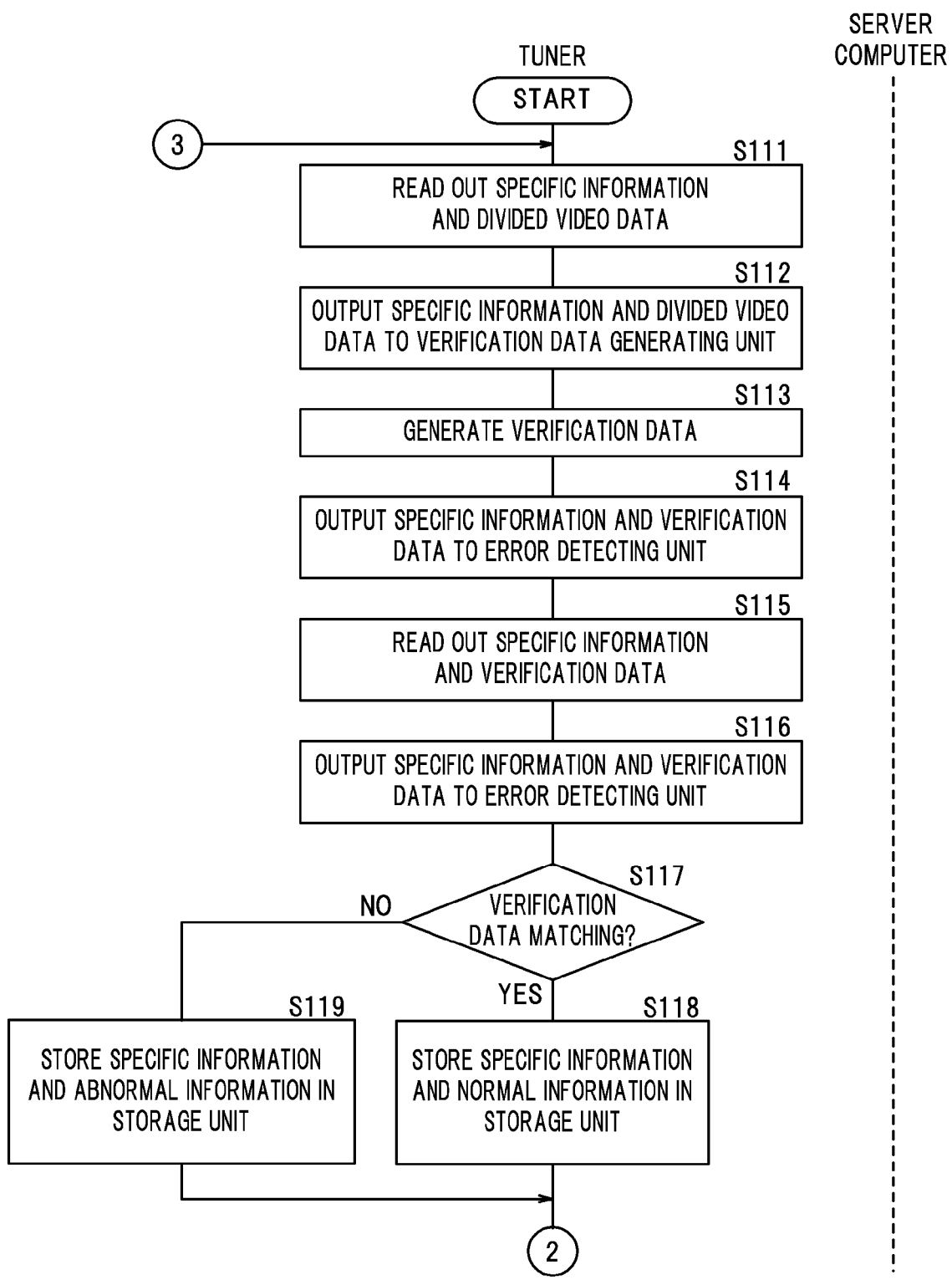
FIG. 11 is a flowchart illustrating the procedures of error detection and correction processing.
Figure 12:
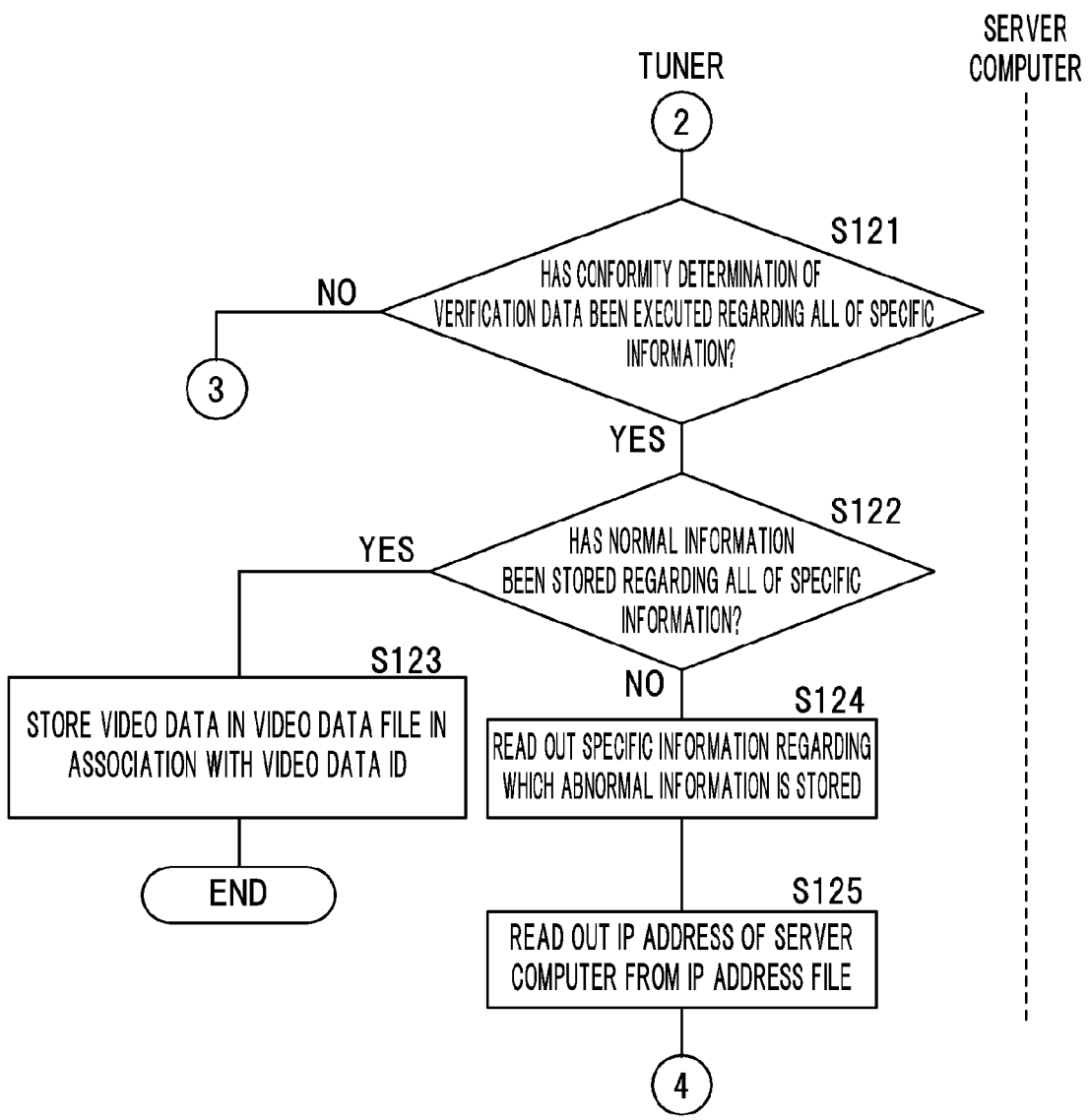
FIG. 12 is a flowchart illustrating the procedures of the error detection and correction processing.
Figure 13:
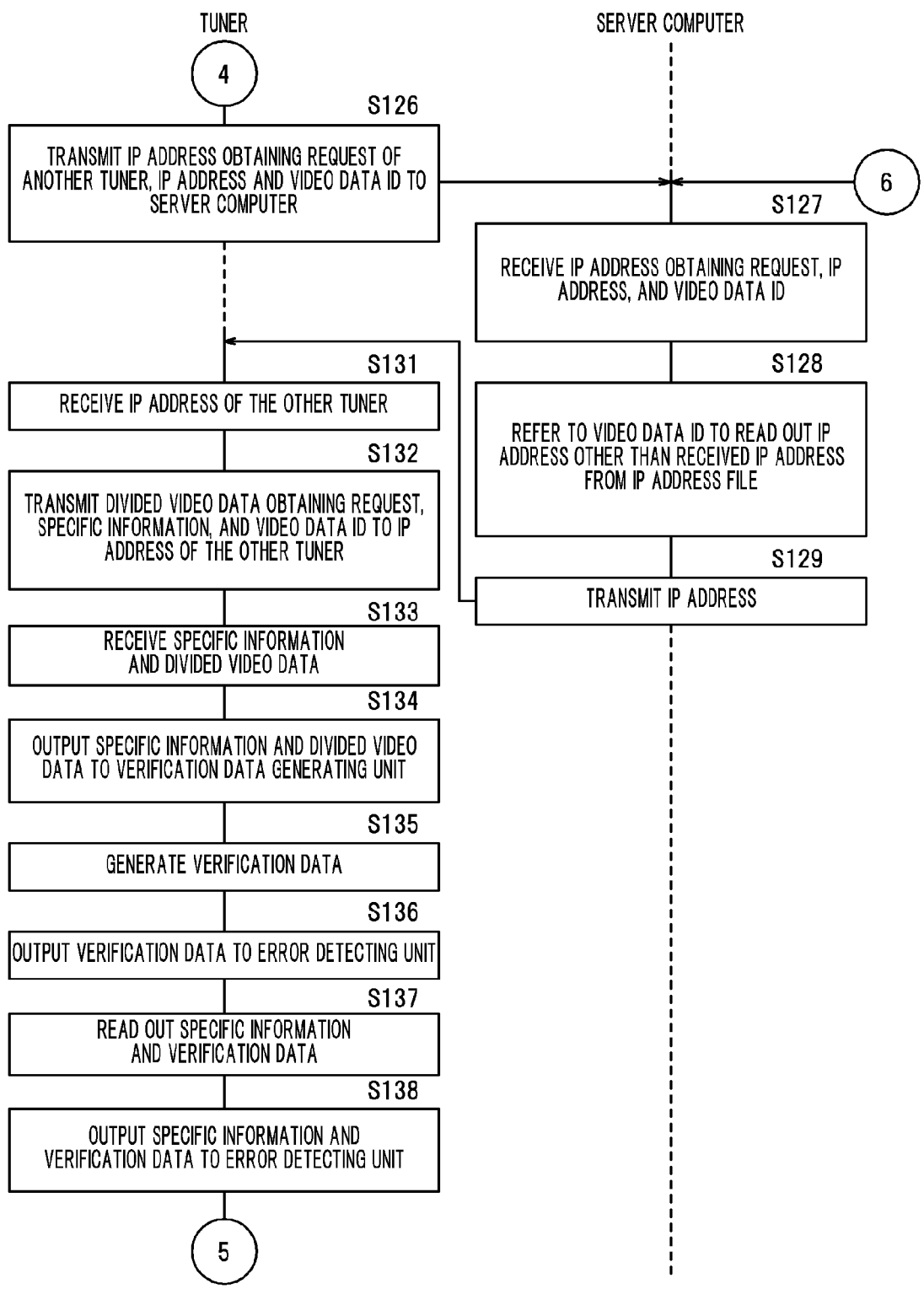
FIG. 13 is a flowchart illustrating the procedures of the error detection and correction processing.
Figure 14:
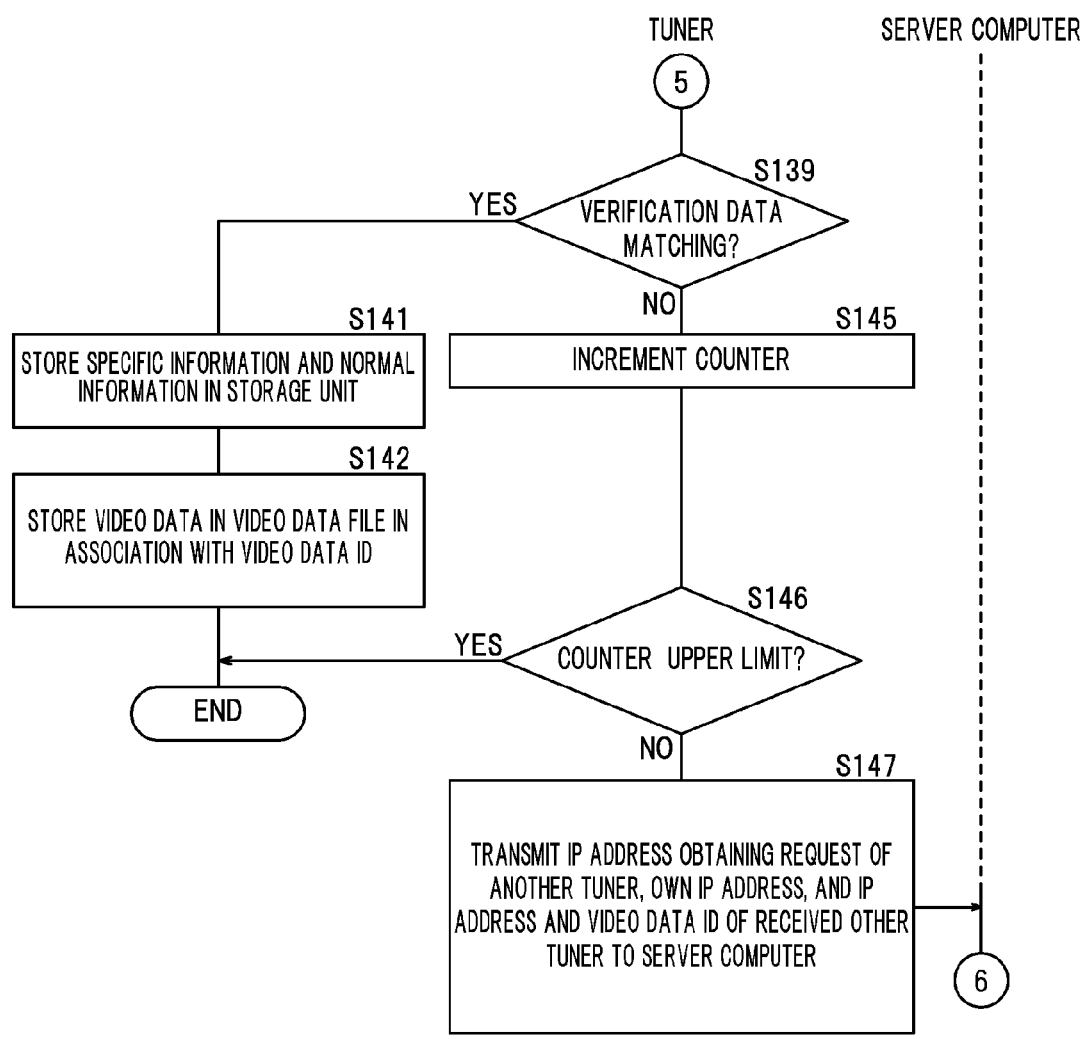
FIG. 14 is a flowchart illustrating the procedures of the error detection and correction processing.

The verification data generating unit 12 generates the verification data 60 for each of the pieces of the divided video data 50D (operation S76). The verification data generating unit 12 uses a hash function to generate verification data 60 for the divided video data 50D relating to the specific information. FIG. 10 is an explanatory diagram illustrating a record layout of the verification data 60. Specific information indicating which divided video data 50D the video data ID and verification data 60 correspond to is added to the packet of the verification data 60. The control unit 11 stores the generated verification data 60 in the storage unit 15 in association with the specific information (operation S77). The control unit 11 determines whether or not verification data 60 has been generated regarding all of the divided video data 50D (operation S78). For example, the control unit 11 determines whether or not verification data 60 corresponding to all of the divided video data 50D has been generated by counting the specific information stored in the storage unit 15.

Upon determining that generation of the verification data 60 has not been completed regarding all of the divided video data 50D (NO in operation S78), the control unit 11 proceeds to operation S75, and executes generation processing of the verification data 60 of the divided video data 50D according to different specific information. Upon determining that generation of the verification data 60 has been completed regarding all of the divided video data 50D (YES in operation S78), the control unit 11 outputs all of the divided video data 50D and specific information and video data ID stored in the storage unit 15 to the multiplexing unit 13 (operation S79).

The control unit 11 outputs a set of the verification data 60 of the divided video data 50D and specific information stored in the storage unit 15 to the multiplexing unit 13 (operation S81). With the example in FIG. 3, the video data ID, the divided video data 51, 52, 53, and 54, and the specific information 51D, 52D, 53D, and 54D corresponding thereto are output to the multiplexing unit 13. Also, the verification data 61, 62, 63, and 64, and the specific information 51D, 52D, 53D, and 54D corresponding thereto are output. The multiplexing unit 13 repeatedly multiplexes multiple sets of verification data 60 to the divided video data 50D to generate transmission data 70 (operation S82). With the example in FIG. 3, the verification data 60 made up of the verification data 61, 62, 63, and 64 serving as a set is repeatedly multiplexed to a set of the divided video data 51, 52, 53, and 54 with the divided video data 51, 52, 53, and 54.

The multiplexing unit 13 outputs the transmission data 70 to the transmission unit 16 (operation S83). After executing modulation of the transmission data 70, and the like, the transmission unit 16 transmits the transmission data 70 after modulation to the tuner 2 (operation S84). The tuner 2 receives the transmitted transmission data 70 at the reception unit 26 (operation S85). The reception unit 26 successively subjects the transmission data 70 to demodulation and the like to output the transmission data 70 after demodulation to the control unit 21. The control unit 21 successively stores the received transmission data 70 in the storage unit 25 (operation S86).

The control unit 21 determines whether or not all of the transmission data 70 scheduled for transmission has been received (operation S87). For example, the control unit 21 may determine whether or not all of the transmission data 70 has been received by referring to broadcast end information included in a part of the packet of the transmission data 70. Upon determining that all of the transmission data 70 has not been received (NO in operation S87), the control unit 21 proceeds to operation S85, and subsequently, executes reception. On the other hand, upon determining that all of the transmission data 70 have been received (YES in operation S87), the control unit 21 ends the processing.

FIG. 11 through FIG. 14 are flowcharts illustrating the procedures of error detection and correction processing. The control unit 21 of the tuner 2 executes the following processing in accordance with the control program 25P. The control unit 21 of the tuner 2 separates the video data 50 and the verification data 60 from the transmission data 70 stored in the storage unit 25. The control unit 21 refers to the specific information described in the index packet of the video data 50 to separate the video data 50 into divided video data 50D corresponding to the specific information. The control unit 21 stores the separated video data ID, the specific information, and the divided video data 50D in the storage unit 25. Similarly, the control unit 21 refers to the specific information described in the packet of the verification data 60 to separate the verification data 60 into the verification data 61, 62, 63, and 64 corresponding to the specific information. The control unit 21 stores the separated verification data 60 corresponding to the specific information in the storage unit 25 along with the video data ID.

The control unit 21 reads out the specific information and the divided video data 50D from the storage unit 25 (operation S111). The control unit 21 outputs the read specific information and divided video data 50D to the verification data generating unit 22 (operation S112). The verification data generating unit 22 uses the same hash function as the hash function used in operation S76 to generate the verification data 60 (operation S113). The verification data generating unit 22 outputs the specific information and the calculated verification data 60 to the error detecting unit 23 (operation S114). The control unit 21 reads out the specific information and the verification data 60 after separation stored in the storage unit 25 (operation S115). The control unit 21 outputs the read specific information and the verification data 60 to the error detecting unit 23 (operation S116).

The error detecting unit 23 determines whether or not the mutual verification data 60 match (operation S117). For example, the error detecting unit 23 determines whether or not the verification data 60 output in operation S114, and the verification data 60 output in operation S116 match. The verification data 60 output in operation S114 is the verification data 60 calculated at the tuner 2. The verification data 60 output in operation S116 is the received verification data 60. That is to say, the error detecting unit 23 determines whether or not the verification data 60 calculated at the tuner 2, and the received verification data 60 match. Upon determining that these match (YES in operation S117), the error detecting unit 23 outputs normal information indicating that the received divided video data 50D is normal, and the specific information to the control unit 21. The control unit 21 stores the specific information and the normal information in the storage unit 25 (operation S118).

On the other hand, upon determining that these do not match (NO in operation S117), the error detecting unit 23 outputs abnormal information indicating that the received divided video data 50D is abnormal, and the specific information to the control unit 21. The control unit 21 stores the specific information and the abnormal information in the storage unit 25 (operation S119). The control unit 21 refers to the number of the specific information stored in the storage unit 25 to determine whether or not the conformity determination of the verification data 60 according to all of the specific information has been executed (operation S121).

Upon determining that the conformity determination of the verification data 60 according to all of the specific information has not been executed (NO in operation S121), the control unit 21 returns the processing to operation S111 to also perform verification regarding divided video data 50D according to other specific information. Thus, verification regarding divided video data 50D according to all of the specific information is performed. Upon determining that the conformity determination of the verification data 60 according to all of the specific information has been executed (YES in operation S121), the control unit 21 determines whether or not normal information is stored in the storage unit 25 regarding all of the specific information (operation S122).

Upon determining that normal information is stored in the storage unit 25 regarding all of the specific information (YES in operation S122), the control unit 21 proceeds to operation S123. The control unit 21 stores video data 50 in which all of the divided video data 50D is connected in the specific information order in the video data file 251 in association with the video data ID (operation S123). Upon determining that normal information is not stored in the storage unit 25 regarding all of the specific information (NO in operation S122), the control unit 21 skips the processing in operation S123 and transfers the processing to operation S124.

The control unit 21 reads out the specific information regarding which abnormal information is stored, from the storage unit 25 to execute error correction (operation S124). The control unit 21 reads out the IP address of the server computer 3 from the IP address file 252 (operation S125). The control unit 21 transmits an obtaining request for the IP address of the other tuner 2, the IP address of the tuner 2 itself, and the video data ID to the server computer 3 addressed to the IP address read out via the communication unit 24 (operation S126). The CPU 31 of the server computer 3 receives the IP address obtaining request, IP address, and video data ID via the communication unit 36 (operation S127). Note that the control unit 21 of the tuner 2 may not directly store the IP address of the server computer 3. For example, an obtaining request for the IP address of the server computer 3 may be requested to the server computer 3 via another node (not illustrated) including the other tuner 2 using the peer-to-peer format. In this case, a request packet to the effect that "let me know the IP address of the server computer 3 for managing IP address according to the video data ID" is transmitted to an adjacent node. Thus, the request packet is transferred by the bucket-brigade method. In the case that the request packet is ultimately transmitted to the server computer 3, a reply is returned to the request source from the server computer 3. Thus, the request source knows the IP address of the server computer 3.

The CPU 31 refers to the video data ID to read out an IP address other than the IP address received from the IP address file 352 (operation S128). For example, the IP address transmitted in operation S73 is stored in the IP address file 352 in association with the video data ID. The CPU 31 reads out an IP address other than the IP address received in operation S127 (other than the IP address of the tuner 2 itself). The CPU 31 transmits the IP address read out via the communication unit 36 to the tuner 2 (operation S129).

Thus, the tuner 2 receives (obtains) the IP address of the other tuner 2 via the communication unit 24 (operation S131). The control unit 21 of the tuner 2 transmits an obtaining request for the divided video data 50D, the specific information read out in operation S124, and the video data ID to the IP address of the other tuner 2 (operation S132). The control unit 21 receives the specific information and the divided video data 50D transmitted from the other tuner 2 via the communication unit 24 (operation S133). The control unit 21 outputs the received specific information and the divided video data 50D to the verification data generating unit 22 (operation S134). The verification data generating unit 22 uses the hash function to generate the verification data 60 (operation S135). The verification data generating unit 22 outputs the specific information and the calculated verification data 60 to the error detecting unit 23 (operation S136). The control unit 21 reads out the specific information and the verification data 60 after separation stored in the storage unit 25 (operation S137). The control unit 21 outputs the read specific information and the verification data 60 to the error detecting unit 23 (operation S138).

The error detecting unit 23 determines whether or not mutual verification data 60 match (operation S139). For example, the error detecting unit 23 determines whether or not the verification data 60 output in operation S136, and the verification data 60 output in operation S138 match. The verification data 60 output in operation S136 is verification data 60 based on the divided video data 50D received from the other tuner 2. The verification data 60 output in operation S138 is the received verification data 60. That is to say, the error detecting unit 23 determines whether or not the verification data 60 based on the divided video data 50D received from the other tuner 2, and the received verification data 60 match. Upon determining that these match (YES in operation S139), the error detecting unit 23 outputs normal information indicating that the received divided video data 50D is normal, and the specific information to the control unit 21. The control unit 21 stores the specific information and normal information in the storage unit 25 (operation S141). The control unit 21 stores video data 50 in which all of the divided video data 50D is connected in the specific information order, in the video data file 251 in association with the video data ID (operation S142).

When determination is made that the verification data 60 does not match (NO in operation S139), the control unit 21 skips the processing in operations S141 and S142 and proceeds to operation S145, to obtain divided video data 50D from yet another tuner 2. The control unit 21 reads out the upper limit count stored in the storage unit 25. The control unit 21 counts the number of times when the verification data 60 does not match in operation S139 (operation S145). The control unit 21 determines whether or not the counted number of times is equal to or greater than the read upper limit count (operation S146).

This upper limit count may be set to ten times or the like, for example. Alternatively, an arrangement may be made wherein the upper limit time (e.g., 10 seconds) is stored beforehand, and determination is made whether or not the elapsed time since start of the processing in operation S111 and thereafter is equal to or greater than the upper limit time. Upon determining that the counted number of times is less than the upper limit count (NO in operation S146), the control unit 21 proceeds to operation S147. The control unit 21 transmits an obtaining request for the IP address of another tuner 2, the control unit 21's own IP address, the IP address of the other tuner 2 received in operation S131, and the video data ID to the server computer 3 (operation S147).

Subsequently, the processing proceeds to operation S127. The CPU 31 of the server computer 3 transmits the IP address of the tuner 2 of which the obtaining request was received, and an IP address other than the IP address that has already been transmitted. Thus, the server computer 3 transmits the IP address of a new tuner 2. Upon determining that the counted number of times is equal to or greater than the upper limit count (YES in operation S146), the control unit 21 regards this as timeout, and ends the processing. Thus, suitable video data 50 is obtained from the other tuner 2 without increasing the transmission load of the broadcast device 1. Also, with the server computer 3, a new IP address is transmitted so that the IP address to be transmitted is not duplicated, and also the upper limit count is provided, thereby realizing reduction in communication traffic within the communication network N.

Figure 15:
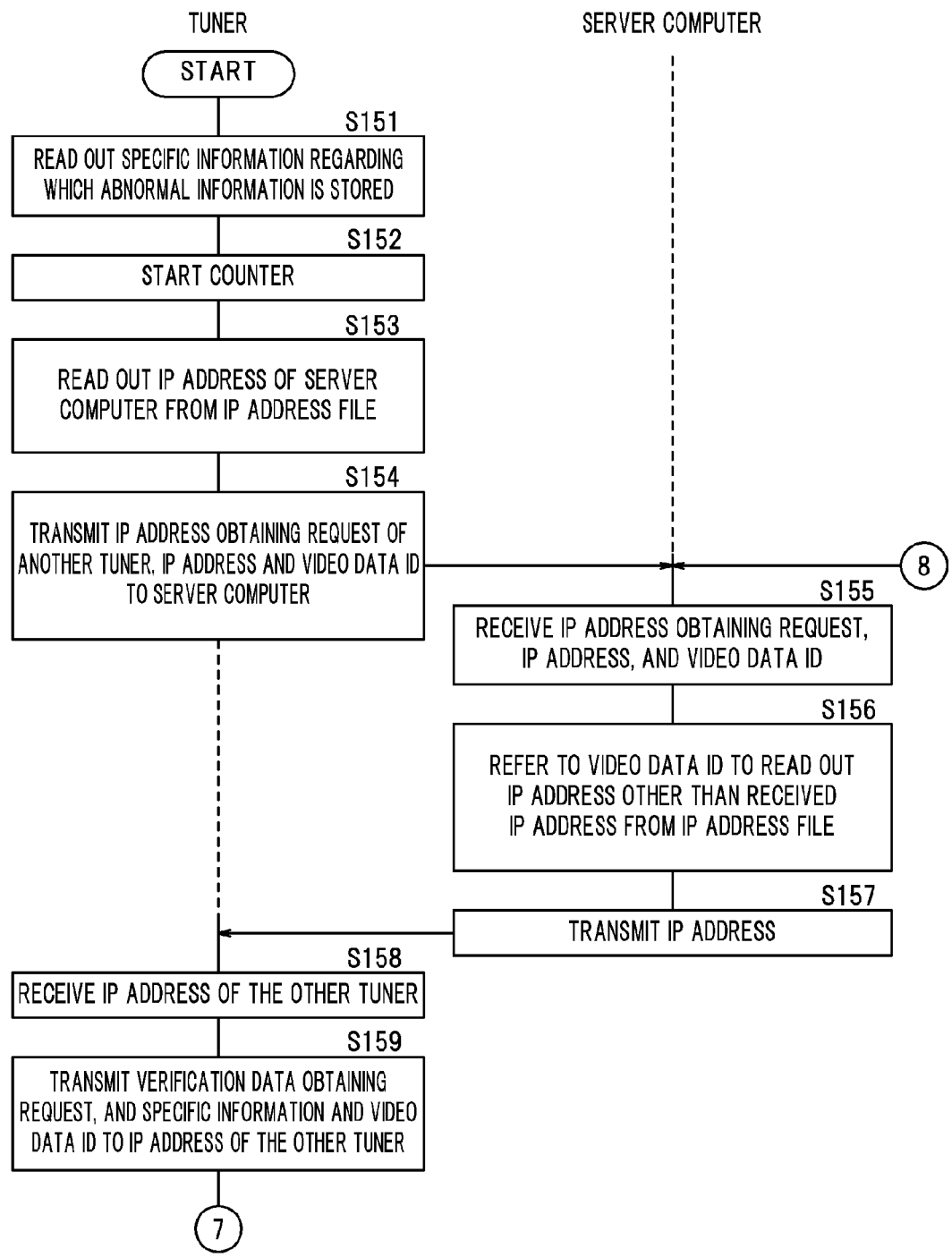
FIG. 15 is a flowchart illustrating the procedures of error correction processing.
Figure 16:
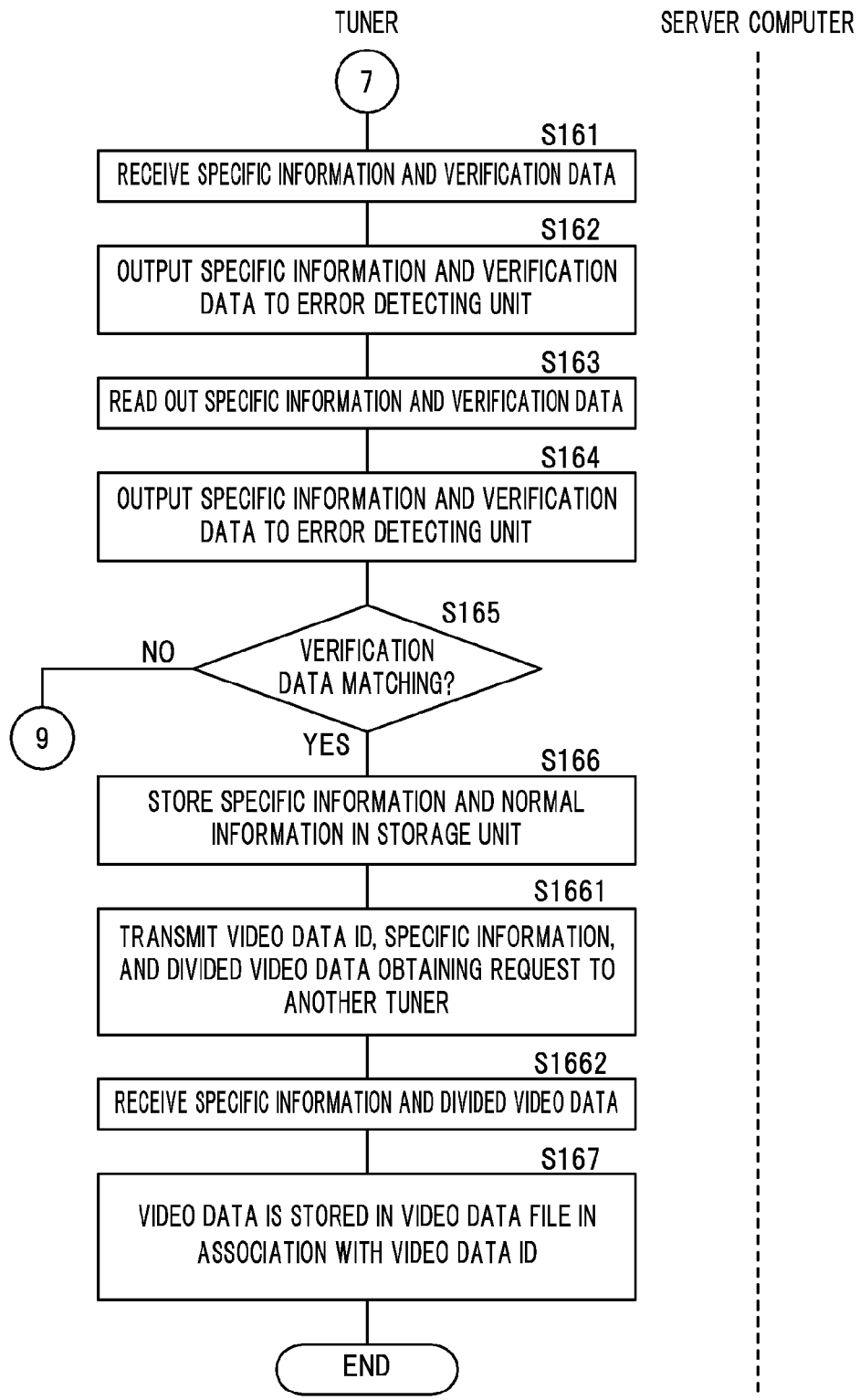
FIG. 16 is a flowchart illustrating the procedures of the error correction processing.
Figure 17:
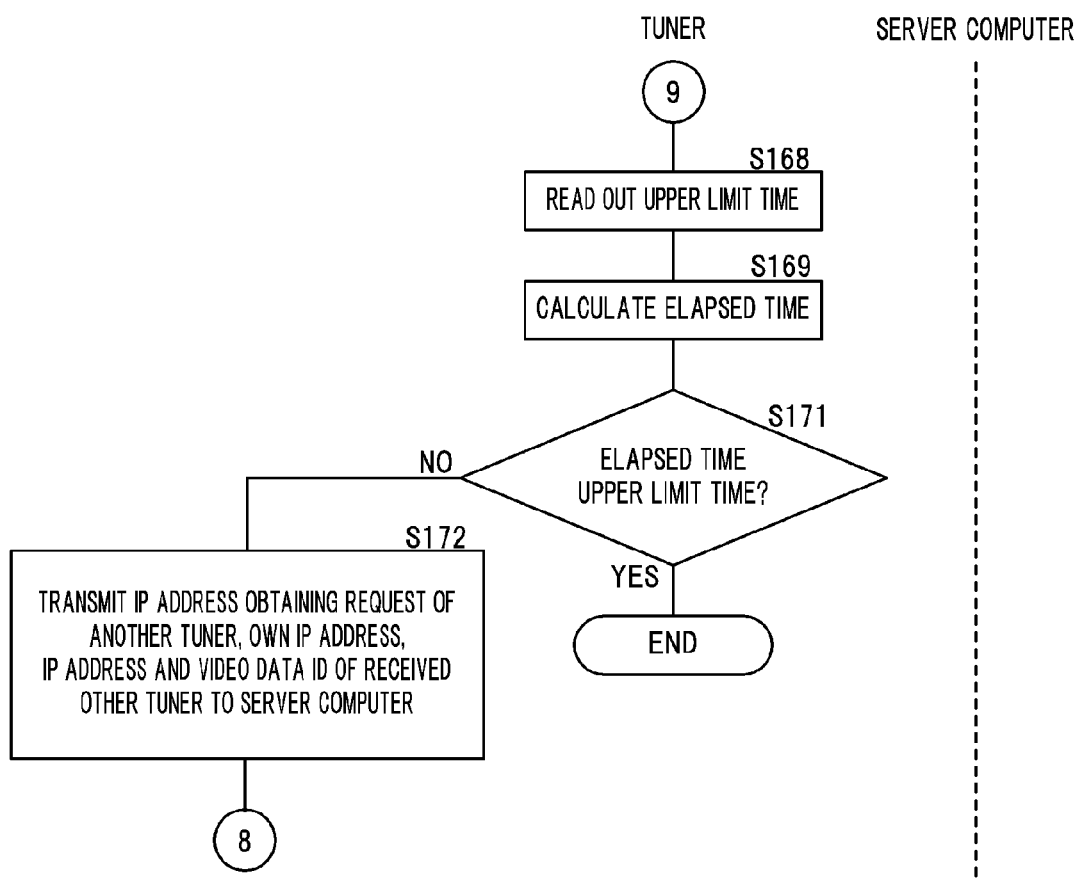
FIG. 17 is a flowchart illustrating the procedures of the error correction processing.

Another embodiment will be described. The present embodiment relates to an embodiment wherein the verification data 60 is obtained from another tuner 2. FIG. 15 through FIG. 17 are flowcharts illustrating the procedures of error correction processing. After the processing in NO in operation S122 in FIG. 12, the control unit 21 executes the following processing in accordance with the control program 25P. The control unit 25 reads out the specific information regarding which abnormal information is stored, from the storage unit 25 to execute error correction (operation S151). The control unit 21 refers to point-in-time information output from the timer unit 29 to start timekeeping (operation S152).

The control unit 21 reads out the IP address of the server computer 3 from the IP address file 252 (operation S153). The control unit 21 transmits an obtaining request for the IP address of another tuner 2, the IP address of the tuner 2 itself, and the video data ID to the server computer 3 addressed to the IP address read out via the communication unit 24 (operation S154). The CPU 31 of the server computer 3 receives the obtaining request for the IP address, the IP address, and the video data ID via the communication unit 36 (operation S155).

The CPU 31 refers to the video data ID to read out an IP address other than the received IP address from the IP address file 352 (operation S156). The CPU 31 transmits the IP address read out via the communication unit 36 to the tuner 2 (operation S157). The tuner 2 receives the IP address of another tuner 2 via the communication unit 24 (operation S158). The control unit 21 of the tuner 2 transmits an obtaining request for the verification data 60, the specific information read out in operation S151, and the video data ID to the IP address of the other tuner 2 (operation S159).

The control unit 21 of the other tuner 2 receives the obtaining request to read out the verification data 60 stored in the storage unit 15 in association with the video data ID. Subsequently, the control unit 21 of the other tuner 2 transmits the read verification data 60 and specific information to the tuner 2 which transmitted the obtaining request, via the communication unit 24. The control unit 21 of the tuner 2 receives the specific information and the verification data 60 transmitted from the other tuner 2 via the communication unit 24 (operation S161). The control unit 21 outputs the received specific information and the verification data 60 to the error detecting unit 23 (operation S162). The control unit 21 reads out the specific information and the verification data 60 after separation stored in the storage unit 25 (operation S163). The control unit 21 outputs the read specific information and the verification data 60 to the error detecting unit 23 (operation S164).

The error detecting unit 23 determines whether or not mutual verification data 60 match (operation S165). For example, the error detecting unit 23 determines whether or not the verification data 60 output in operation S162, and the verification data 60 output in operation S164 match. The verification data 60 output in operation S162 is the verification data 60 received from the other tuner 2. The verification data 60 output in operation S164 is the verification data 60 received from the broadcast device 1. That is to say, the error detecting unit 23 determines whether or not the verification data 60 received from the other tuner 2, and the verification data 60 received from the broadcast device 1 match. Upon determining that these match (YES in operation S165), the error detecting unit 23 outputs normal information indicating that the received divided video data 50D is normal, and the specific information to the control unit 21. The control unit 21 stores the specific information and the normal information in the storage unit 25 (operation S166).

The control unit 21 executes the following processing to obtain suitable divided video data 50D from the other tuner 2. The control unit 21 refers to the IP address received in operation S158 to transmit the video data ID, the specific information, and an obtaining request for divided video data 50D corresponding to this specific information to the other tuner 2 (operation S1661). The control unit 21 of the other tuner 2 receives the video data ID, the specific information, and the obtaining request for divided video data 50D corresponding to the specific information via the communication unit 24. The control unit 21 of the other tuner 2 refers to the video data ID and the specific information to read out the corresponding divided video data 50D from the video data file 251. The control unit 21 of the other tuner 2 transmits the read divided video data 50D and the specific information to the tuner 2 which transmitted the obtaining request.

The control unit 21 receives the specific information and error-free divided video data 50D via the communication unit 24 (operation S1662). Thus, upon obtaining all of the error-free divided video data 50D, the control unit 21 executes processing for connecting the divided video data 50D to generate video data 50. The control unit 21 stores the video data 50 in which all of the divided video data 50D is connected in the specific information order, in the video data file 251 in association with the video data ID (operation S167).

Upon determining that the verification data 60 does not match (NO in operation S165), the control unit 21 skips the processing in operations S166, S1661, S1662, and S167, and proceeds to operation S168 to obtain the verification data 60 from yet another tuner 2. The control unit 21 reads out the upper limit time stored in the storage unit 25 (operation S168). This upper limit time is stored in the storage unit 25 beforehand, and may be set to three seconds for example. Also, this upper limit time is set to an appropriate value and stored in the storage unit 25 by an operation button or a remote control operation button (not illustrated).

The control unit 21 refers to the output of the timer unit 29 to calculate the elapsed time since the start of timekeeping in operation S152 (operation S169). The control unit 21 determines whether or not the calculated elapsed time is equal to or greater than the upper limit time (operation S171). Note that, like the above embodiment, calculation at the control unit 21 may include counting of the number of times, or may include a combination between counting of the number of times, and calculation of the elapsed time. Upon determining that the elapsed time is equal to or greater than the upper limit time (YES in operation S171), the control unit 21 regards this as a timeout and ends the processing.

Upon determining that the elapsed time is less than the upper limit time (NO in operation S171), the control unit 21 proceeds to operation S172. The control unit 21 transmits an obtaining request for the IP address of yet another tuner 2, the control unit 21's own IP address, the IP address of the other tuner 2 already received in operation S131, and the video data ID to the server computer 3 (operation S172).

Subsequently, the processing proceeds to operation S155. The CPU 31 of the server computer 3 transmits the IP address of the tuner 2 corresponding to the obtaining request, and an IP address other than the already transmitted IP address. The above processing is executed, and accordingly, error-free divided video data 50D is obtained from the other tuner 2. Further, the data obtained at the first stage from the other tuner 2 is the verification data 60 of which the data size is small, and the divided video data 50D is obtained through confirmation of the verification data 60. Accordingly, a communication load is reduced, and error correction is executed earlier.

With the present embodiment, of portions of which the detailed descriptions were omitted, the portions corresponding to those in the above embodiment are denoted with the same reference numerals and description thereof will be omitted.

Figure 19:
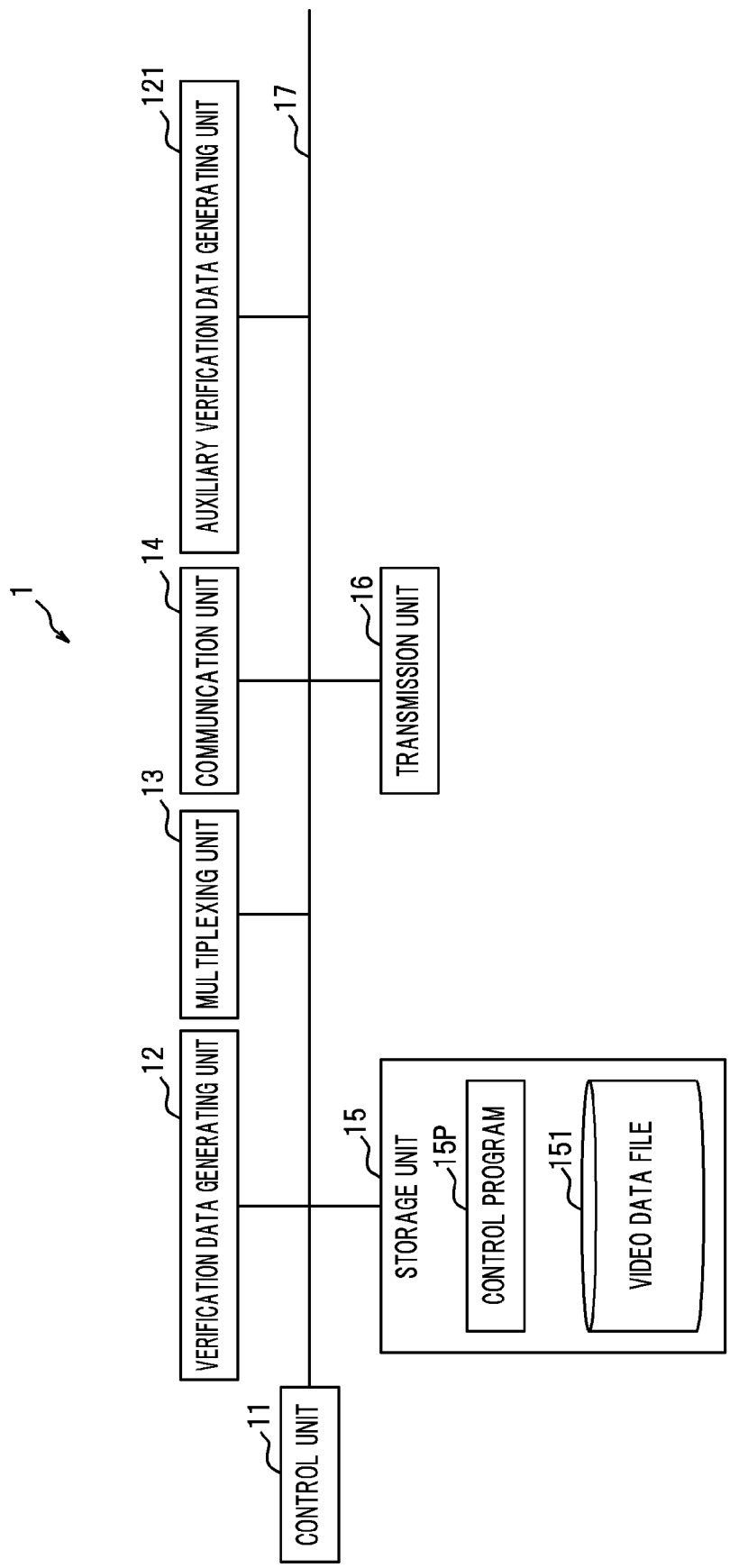
FIG. 19 is a block diagram illustrating the hardware of a broadcast device.

Yet another embodiment will be described. The present embodiment relates to an embodiment further using auxiliary verification data. FIG. 18 is an explanatory diagram illustrating the record layout of the verification data 60. FIG. 18 illustrates four of divided video data 51, 52, 53, and 54, and verification data 61, 62, 63, and 64 corresponding thereto respectively. Note that, as described above, the number of the verification data 60 is not restricted to this. The verification data 60 includes a video data ID field, a specific information field, a specific information total field, a verification data field, an auxiliary verification data field, and the like. FIG. 19 is a block diagram illustrating the hardware group of the broadcast device 1 according to the present embodiment. Further, an auxiliary verification data generating unit 121 is provided to the broadcast device 1.

The verification data generating unit 12 of the broadcast device 1 generates verification data 61, 62, 63, and 64. An ID for specifying video data 50 scheduled to be transmitted is described in the video data ID field. Specific information 51D, 52D, 53D, and 54D for specifying a plurality of divided video data 51, 52, 53, and 54 are described respectively in the specific information field. With the present example, specific information 51D is described in the packet of the verification data 61. The total number of the specific information is described in the specific information total field. With the present example, 4 is described as the specific information total. Verification data 60 calculated with the hash function is described in the verification data field.

Auxiliary verification data generated by the auxiliary verification data generating unit 121 is described in the auxiliary verification data field. The auxiliary verification data generating unit 121 calculates auxiliary verification data based on at least the verification data 60. For example, the auxiliary verification data generating unit 121 calculates a hash value based on the verification data 60 as auxiliary verification data. In addition, the auxiliary verification data generating unit 121 may employ a generating method different from the generating method employed by the verification data generating unit 22. For example, the auxiliary verification data generating unit 121 may use a CRC code based on the verification data 60 as auxiliary verification data. Further, in addition to the verification data 60, auxiliary verification data may be generated based on the video data ID, the specific information, or the specific information total, or any combination of these. For example, a CRC code based on the verification data 60, specific information, and video data ID may be generated. With the present embodiment, in order to facilitate explanation, an example will be described wherein the verification data 60 alone is used, and a CRC code different from a hash value is used.

Figure 20:
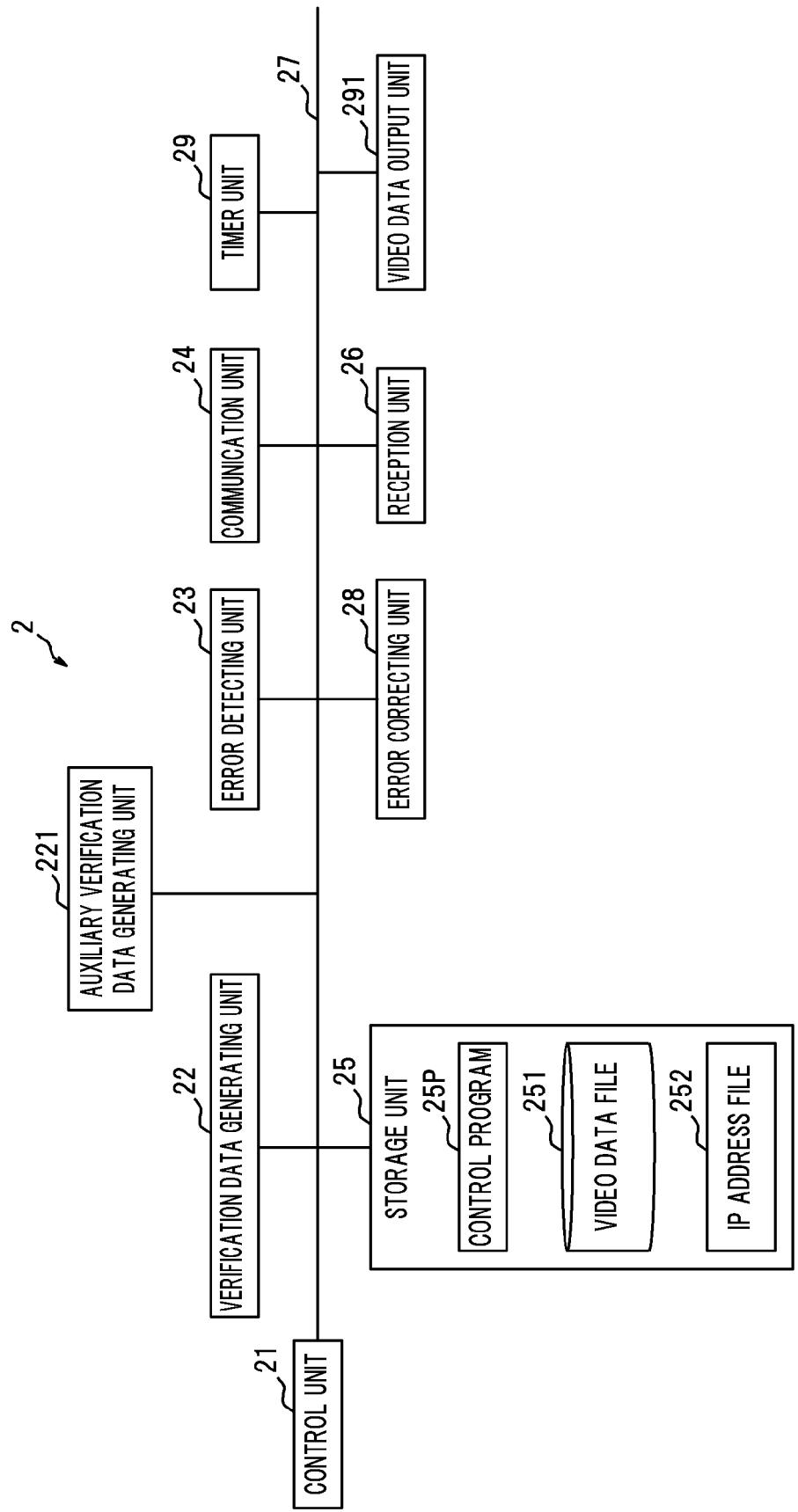
FIG. 20 is a block diagram illustrating the hardware of a tuner.
Figure 21:
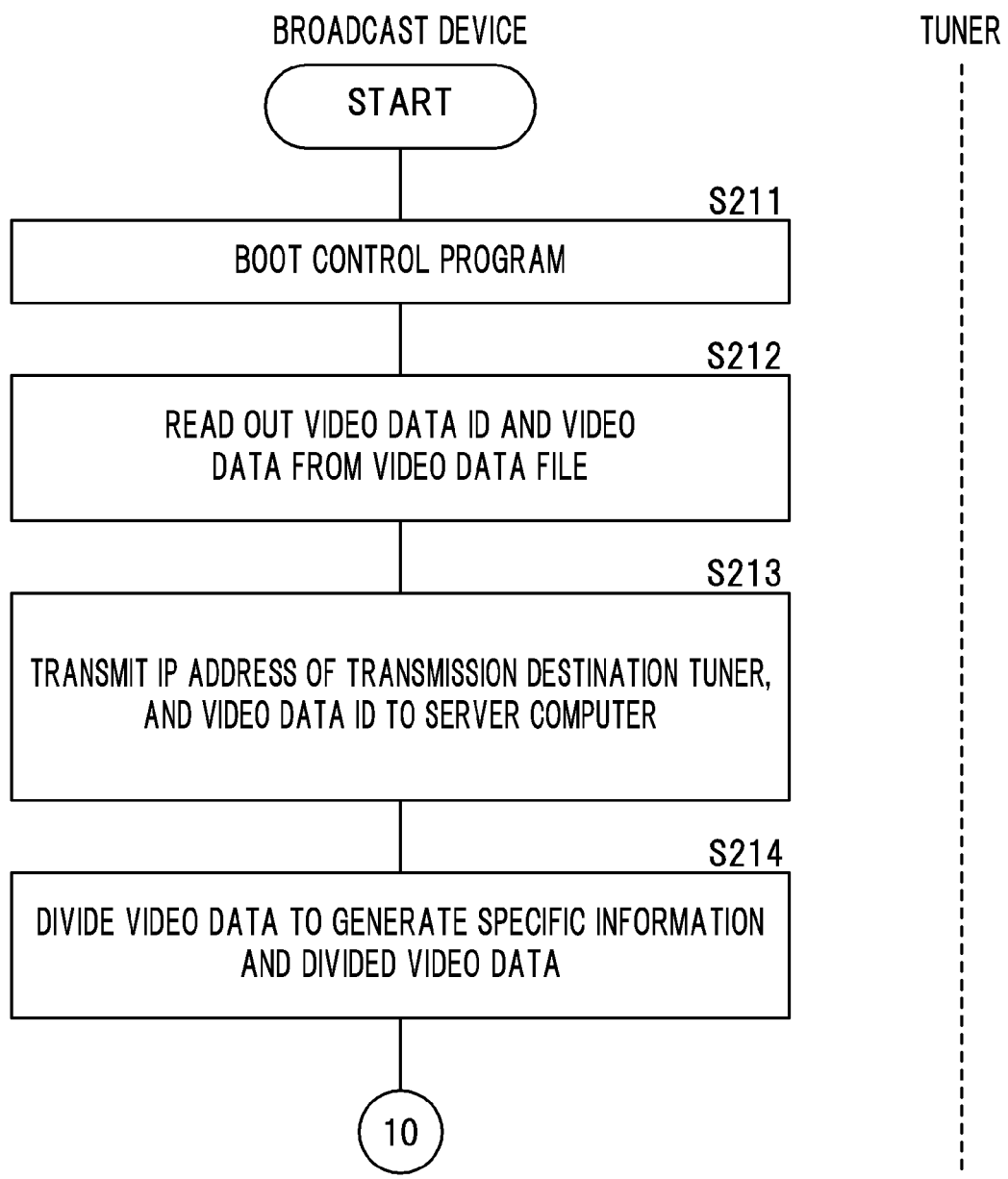
FIG. 21 is a flowchart illustrating the procedures of error correction processing.
Figure 22:
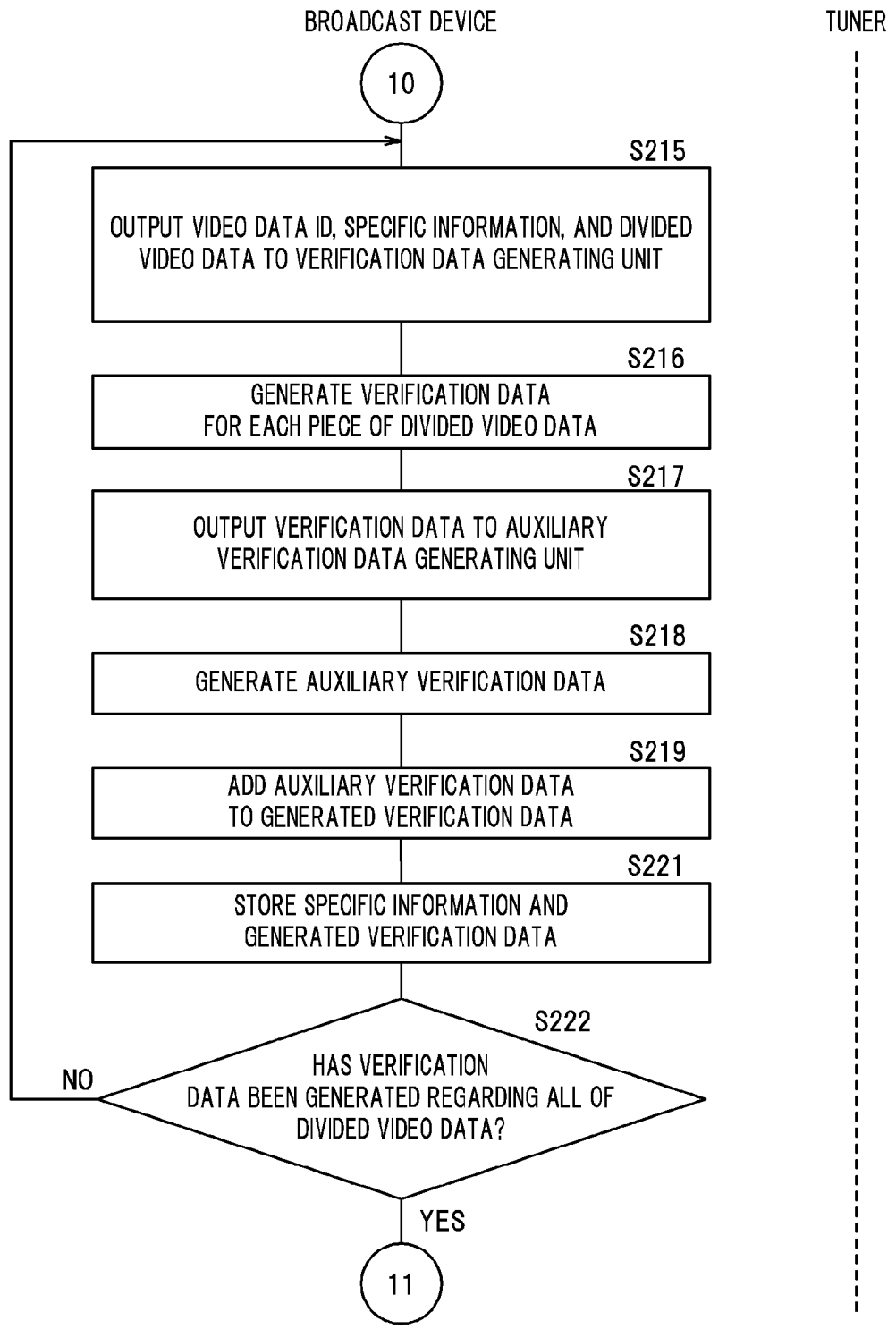
FIG. 22 is a flowchart illustrating the procedures of the error correction processing.
Figure 23:
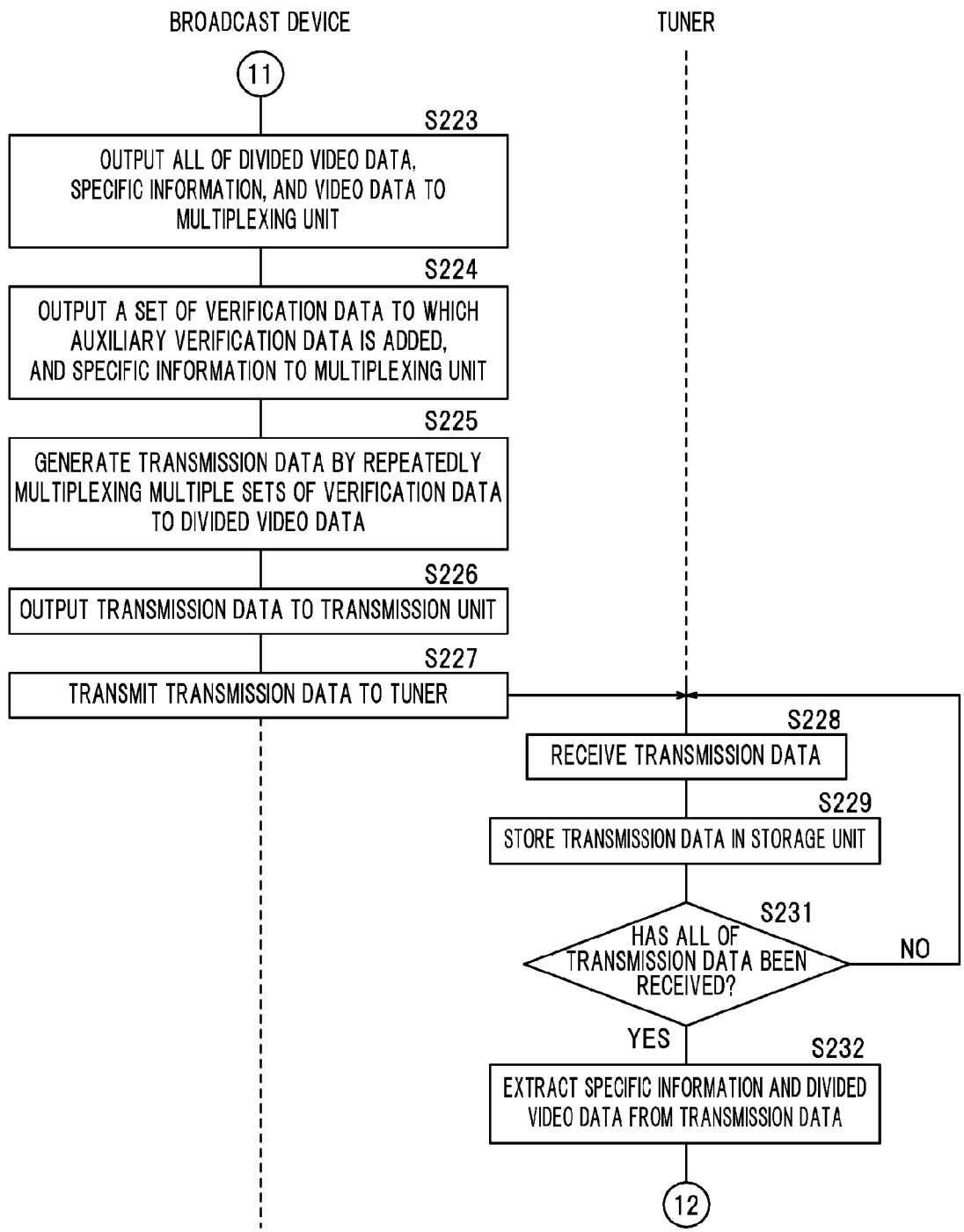
FIG. 23 is a flowchart illustrating the procedures of the error correction processing.
Figure 24:
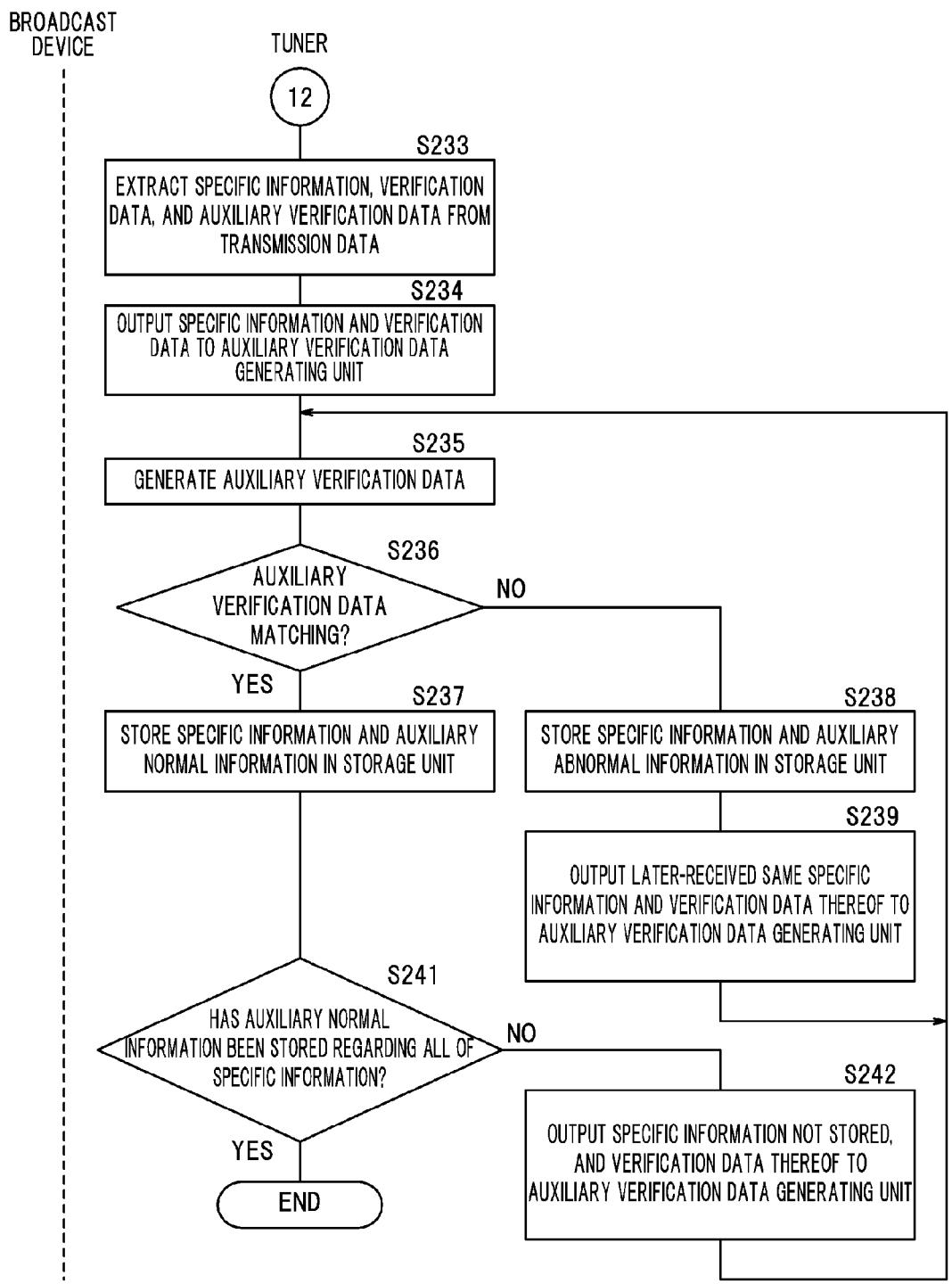
FIG. 24 is a flowchart illustrating the procedures of the error correction processing.

FIG. 20 is a block diagram illustrating a hardware group of a tuner 2 according to the present embodiment. Further, an auxiliary verification data generating unit 221 is provided. The auxiliary verification data generating unit 221 generates auxiliary verification data using the same algorithm as with the auxiliary verification data generating unit 121 of the broadcast device 1. With the above hardware, the procedures of error correction processing will be described using a flowchart. FIG. 21 through FIG. 24 are flowcharts illustrating the procedures of the error correction processing. The control unit 11 of the broadcast device 1 boots the control program 15P (operation S211). The control unit 11 reads out the video data ID and video data 50 of a transmission object from the video data file 151 (operation S212). The control unit 11 reads out the IP addresses of transmission destination tuners 2, stored in the storage unit 15 beforehand. The control unit 11 transmits the read IP addresses and video data ID to the server computer 3 via the communication unit 14 (operation S213).

The control unit 11 divides the read video data 50 in accordance with the number of divisions stored in the storage unit 15 beforehand to generate specific information and divided video data 50D (operation S214). The control unit 11 outputs the video data ID, the specific information, and the divided video data 50D to the verification data generating unit 12 (operation S215). The verification data generating unit 12 generates the verification data 60 for each of the divided video data 50D (operation S216). The verification data generating unit 12 uses the hash function to generate the verification data 60 of the divided video data 50D according to each piece of specific information.

The control unit 11 outputs the verification data 60 to the auxiliary verification data generating unit 121 (operation S217). The auxiliary verification data generating unit 121 generates auxiliary verification data based on the cyclic redundancy checksum function according to CRC (operation S218). The auxiliary verification data generating unit 121 outputs the generated auxiliary verification data to the control unit 11. The control unit 11 adds the auxiliary verification data to a part of the packet of the verification data 60 (operation S219). The control unit 11 stores the specific information and the verification data 60 to which the auxiliary verification data is added, in the storage unit 15 (operation S221).

The control unit 11 determines whether or not the verification data 60 has been generated regarding all of the divided video data 50D (operation S222). The control unit 11 refers to the storage unit 15 to determine whether or not the verification data 60 to which the auxiliary verification data is added, and the specific information are additionally stored. Upon determining that the verification data 60 has not been generated regarding all of the divided video data 50D (NO in operation S222), the control unit 11 returns the processing to operation S215. The verification data 60 with the auxiliary verification data corresponding to all of the specific information is generated by repeating the above processing.

Upon determining that the verification data 60 has been generated regarding all of the divided video data 50D (YES in operation S222), the control unit 11 outputs all of the divided video data 50D and specific information, and the video data 50 to the multiplexing unit 13 (operation S223). The control unit 11 outputs a set of the verification data 60 to which auxiliary verification data is added, and the specific information, stored in the storage unit 15 to the multiplexing unit 13 (operation S224). The multiplexing unit 13 repeatedly multiplexes the verification data 60 to the divided video data 50D, to which multiple sets of auxiliary verification data are added, to generate transmission data 70 (operation S225).

The multiplexing unit 13 outputs the transmission data 70 thus generated to the transmission unit 16 (operation S226). The transmission unit 16 subjects the transmission data 70 to modulation and the like, and transmits the transmission data 70 after modulation to the tuner 2 (operation S227). The tuner 2 receives the transmitted transmission data 70 at the reception unit 26 (operation S228). The reception unit 26 subjects the transmission data 70 to demodulation and the like, and sequentially outputs the transmission data 70 after demodulation to the control unit 21. The control unit 21 successively stores the received transmission data 70 in the storage unit 25 (operation S229).

The control unit 21 determines whether or not all of the transmission data 70 scheduled to be transmitted has been received (operation S231). Upon determining that all of the transmission data 70 has not been received (NO in operation S231), the control unit 21 proceeds to operation S228, and subsequently performs reception. On the other hand, upon determining that all of the transmission data 70 has been received (YES in operation S231), the control unit 21 extracts, from the storage unit 25, the specific information and divided video data 50D from the transmission data 70 (operation S232).

The control unit 21 extracts the specific information, the verification data 60, and the auxiliary verification data from the transmission data 70 (operation S233). The control unit 21 outputs the extracted specific information and verification data 60 to the auxiliary verification data generating unit 221 (operation S234). The auxiliary verification data generating unit 221 generates auxiliary verification data based on the verification data 60 and the function according to CRC (operation S235). The auxiliary verification data generating unit 221 outputs the generated auxiliary verification data to the error detecting unit 23. The control unit 21 outputs the auxiliary verification data corresponding to the specific information extracted in operation S233 to the error detecting unit 23.

The error detecting unit 23 determines whether or not the extracted auxiliary verification data, and the auxiliary verification data generated at the tuner 2 match (operation S236). Upon determining that these match (YES in operation S236), the error detecting unit 23 stores the specific information, and auxiliary normal information indicating that the auxiliary verification data is normal to the storage unit 25 (operation S237). On the other hand, upon determining that these do not match (NO in operation S236), the error detecting unit 23 stores the specific information, and auxiliary abnormal information indicating that the auxiliary verification data is abnormal to the storage unit 25 (operation S238). In this case, the verification data 60 itself includes an error due to radio disturbance or the like, and accordingly, the verification data 60 according to the same specific information after repeatedly receiving the verification data 60 is employed.

The control unit 21 reads out the specific information corresponding to abnormal information stored in the storage unit 25. The control unit 21 refers to the specific information to read out the verification data 60 according to the same specific information received later in time, from the storage unit 25. For example, let us say that an error has been detected from the verification data 62 of the specific information 52D having an earlier reception date and time or packet number. In this case, the verification data 62 of the specific information 52D having a later reception date and time or packet number is read out from the storage unit 25. The control unit 21 outputs the later-received specific information and the verification data 60 of the specific information to the auxiliary verification data generating unit 221 again (operation S239). Thereafter, the control unit 21 returns the processing to operation S235. Thus, abnormality due to an error of the verification data 60 itself may be reduced if not prevented beforehand by using the verification data 60 after repetitive reception.

After the processing in operation S237, the control unit 21 proceeds to operation S241. The control unit 21 determines whether or not auxiliary normal information has been stored regarding all of the specific information (operation S241). The control unit 21 refers to the storage unit 25, and upon determining that the auxiliary normal information has not been stored regarding all of the specific information (NO in operation S241), proceeds to operation S242. The control unit 21 reads out specific information not stored in operation S241 and the verification data 60 of the specific information from the storage unit 25, and outputs these to the auxiliary verification data generating unit 221 (operation S242). The control unit 21 returns the processing to operation S235.

The above processing is repeated, and accordingly, verification using the verification data 60 regarding all of the specific information is completed. Upon determining that the auxiliary normal information has been stored in the storage unit 25 regarding all of the specific information (YES in operation S241), the control unit 21 ends the processing, and proceeds to operation S111. Thus, after an error of the verification data 60 itself has been detected beforehand, error detection of the divided video data 50D is executed in operation S111 and thereafter. Also, even in the event that an error of the verification data 60 itself has been detected, the verification data 60 after repetitive reception is used, thereby rapidly performing error correction without requesting another device for data for error correction.

With the present embodiment, of portions of which the detailed descriptions were omitted, the portions corresponding to those in the above embodiment are denoted with the same reference numerals and description thereof will be omitted.

Figure 25:
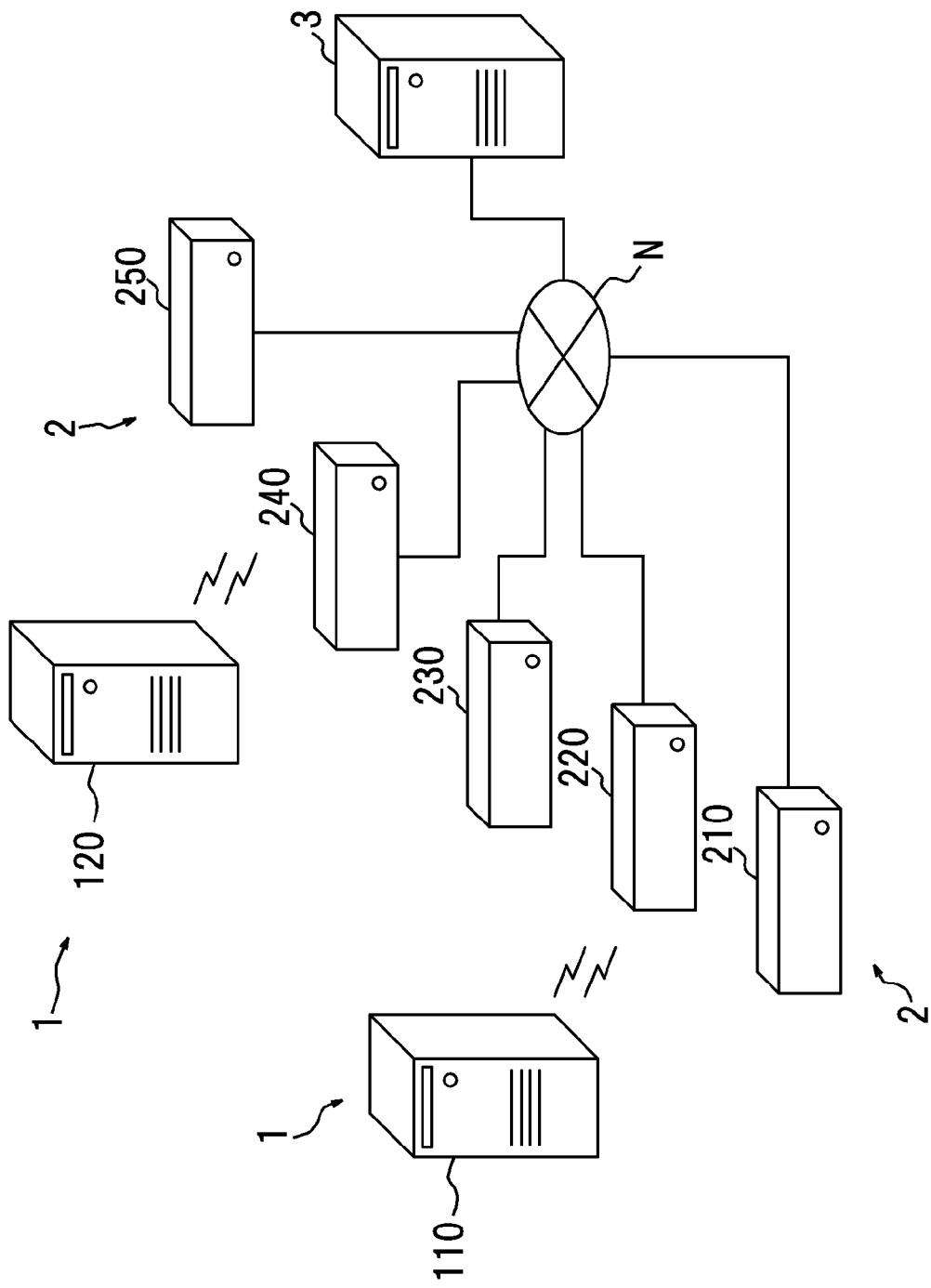
FIG. 25 is a diagram illustrating a content processing system.

Yet another embodiment will be described. The present embodiment relates to an embodiment using a tuner 2 which receives transmission from another broadcast device 1. FIG. 25 is an explanatory diagram illustrating the outline of a content processing system according to the present embodiment. The content processing system includes broadcast devices 110, 120, and so on (hereafter, represented with 1 in some situations), tuners 210, 220, 230, 240, 250, and so on (hereafter, represented with 2 in some situations), a server computer 3, and the like. The broadcast device 110 transmits video data 50 to the tuners 210, 220, and 230. Also, another broadcast 120 different from the broadcast device 110 transmits the same video data 50 to the tuners 240 and 250 at the same time or a different time.

The outline of the present embodiment will be described. When an error has occurred regarding video data 50 due to radio disturbance caused from a thunderstorm or the like, the tuner 210 which receives the video data 50 from the broadcast device 1 performs an obtaining request for divided video data 50D for the other tuners 220 and 230. Also, the other tuners 220 and 230 may not obtain the correct divided video data 50D due to a similar radio disturbance. In this case, an obtaining request for the IP addresses of the tuners 240 and 250 is performed from the server computer 3 based on related information indicating a relationship between the video data 50 transmitted by the broadcast device 110, and the video data 50 transmitted by another broadcast device 120. Subsequently, the tuner 210 receives divided video data 50D from the tuner 240 or tuner 250. The details will be described below.

FIG. 26 is an explanatory diagram illustrating a record layout of the IP address file 352. The IP address file 352 includes a broadcast device ID field, a video data ID field, a related information field, an IP address field, and the like. The broadcast device ID is identification information for identifying the broadcast device 1. For example, broadcast device ID "110" is assigned to the broadcast device 110, and broadcast device ID "120" is assigned to the broadcast device 120. The video data ID field stores the video data ID that is identification information to be assigned to video data 50 that each broadcasting station transmits. Note that unique identification information is assigned as the video data ID so as not to be duplicated between broadcast stations.

Related information for associating the video data 50 transmitted by one broadcast device 1 with the video data 50 transmitted by another broadcast device 1 is stored in the related information field regarding the same video data 50. For example, another broadcast station name and broadcast date and time, the video data ID for the video data 50 provided by another broadcast station, G code, or, program name, or a combination of these, or the like may be used as this related information. With the present embodiment, in order to facilitate explanation, an example will be described wherein the video data ID provided by another broadcast station for management at another broadcast device 1 is used as related information regarding the same video data 50.

For example, the video data 50 transmitted by the broadcast device 110 is video data ID "1101", and "1201" is stored as related information thereof. The related information "1201" is correlated with video data ID "1201" wherein the broadcast device 120 transmitted the same video data 50 on a different date for example. The IP address field stores the IP address of the transmission destination of the video data 50. In the case of receiving an obtaining request for the video data ID and IP address, the server computer 3 transmits the IP address corresponding to the video data 50 to the tuner 210. With the example in FIG. 26, IP address " . . . 22" or IP address " . . . 23" is transmitted corresponding to video data ID "1101". Note that, with the present example, IP address " . . . 22" corresponds to the tuner 220, and IP address " . . . 23" corresponds to the tuner 230.

In a regular case, the CPU 31 of the server computer 3 refers to related information to read out the IP address corresponding to the same video data ID as this related information. With the example in FIG. 26, IP addresses " . . . 24" and " . . . 25" corresponding to broadcast device ID "120" and video data ID "1201" are read out. The CPU 31 transmits the read IP addresses to the tuner 210. The tuner 210 obtains divided video data 50D from the tuner 240 corresponding to IP address " . . . 24", or the tuner 250 corresponding to IP address " . . . 25".

Figure 27:
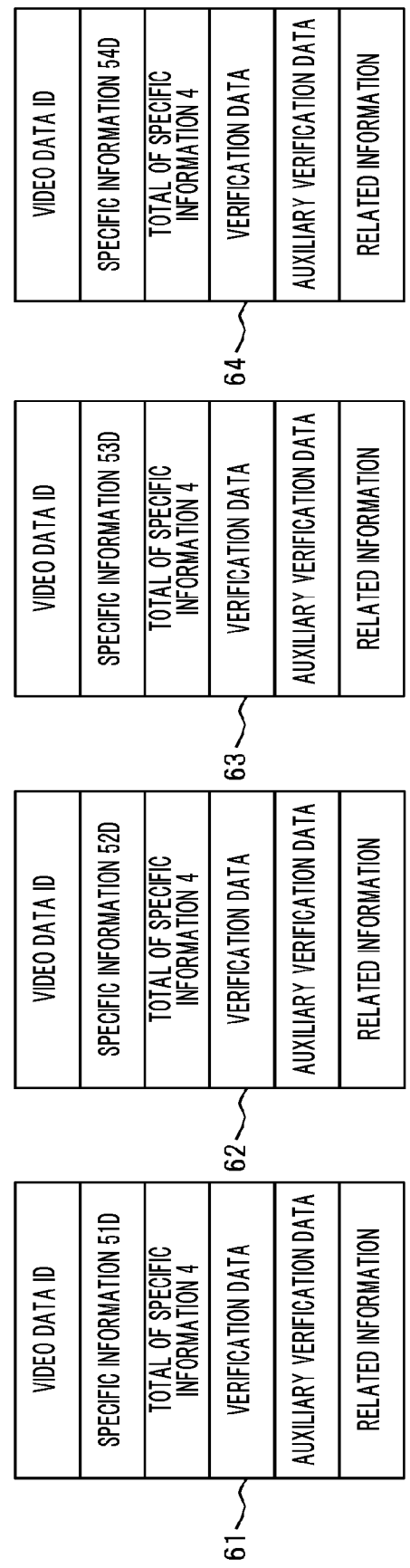
FIG. 27 is a diagram illustrating the record layout of verification data.

FIG. 27 is an explanatory diagram illustrating the record layout of the verification data 60. Further, a related information field is provided, and related information is added to the verification data 60. Note that in the case that related information is stored at the server computer 3 beforehand, related information may not be added to the verification data 60. With the present embodiment, an example will be described wherein related information is added. Also, in order to facilitate explanation, description regarding auxiliary verification data will be omitted.

Figure 28:
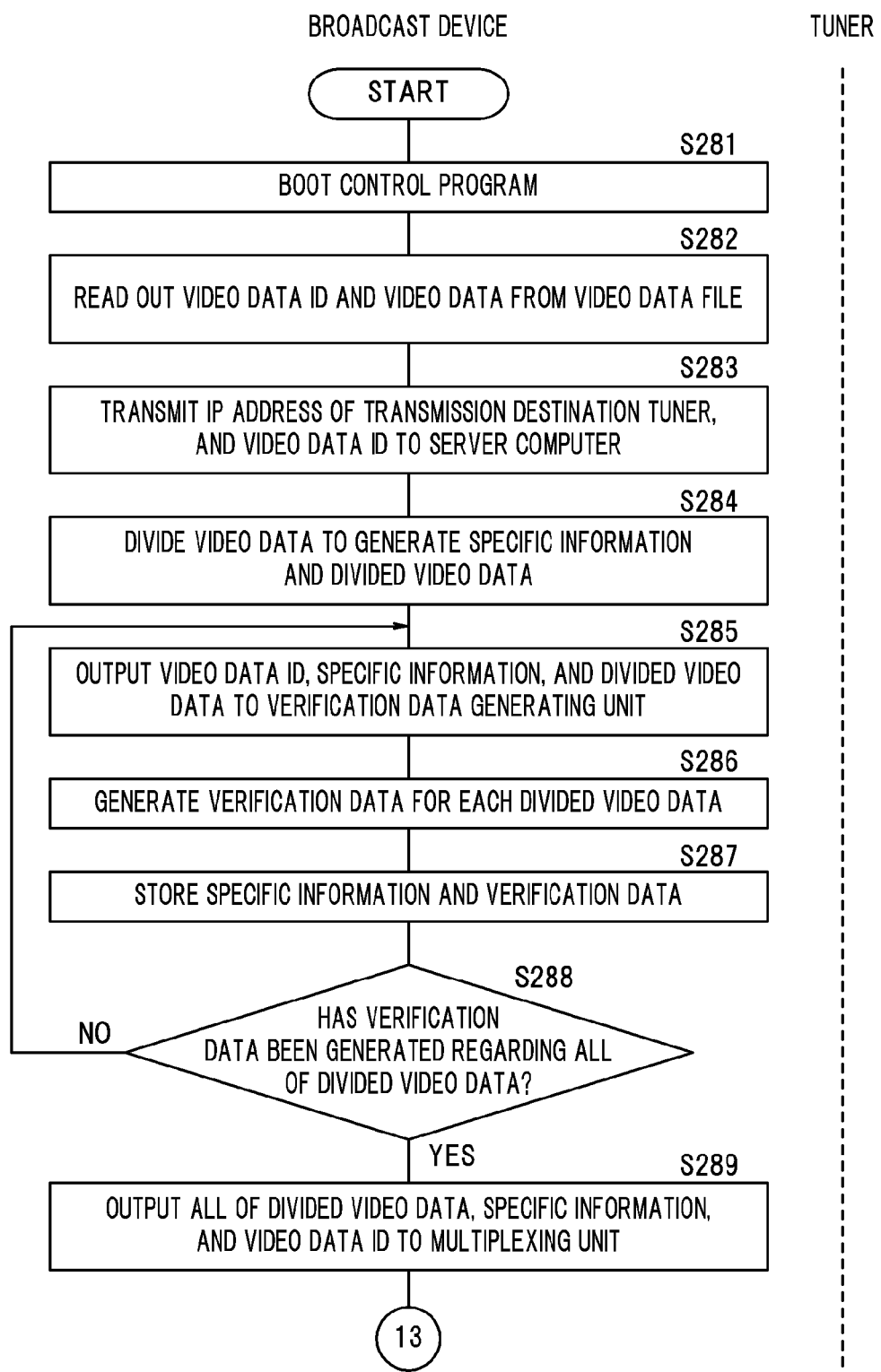
FIG. 28 is a flowchart illustrating the procedures of transmission processing of divided video data.
Figure 29:
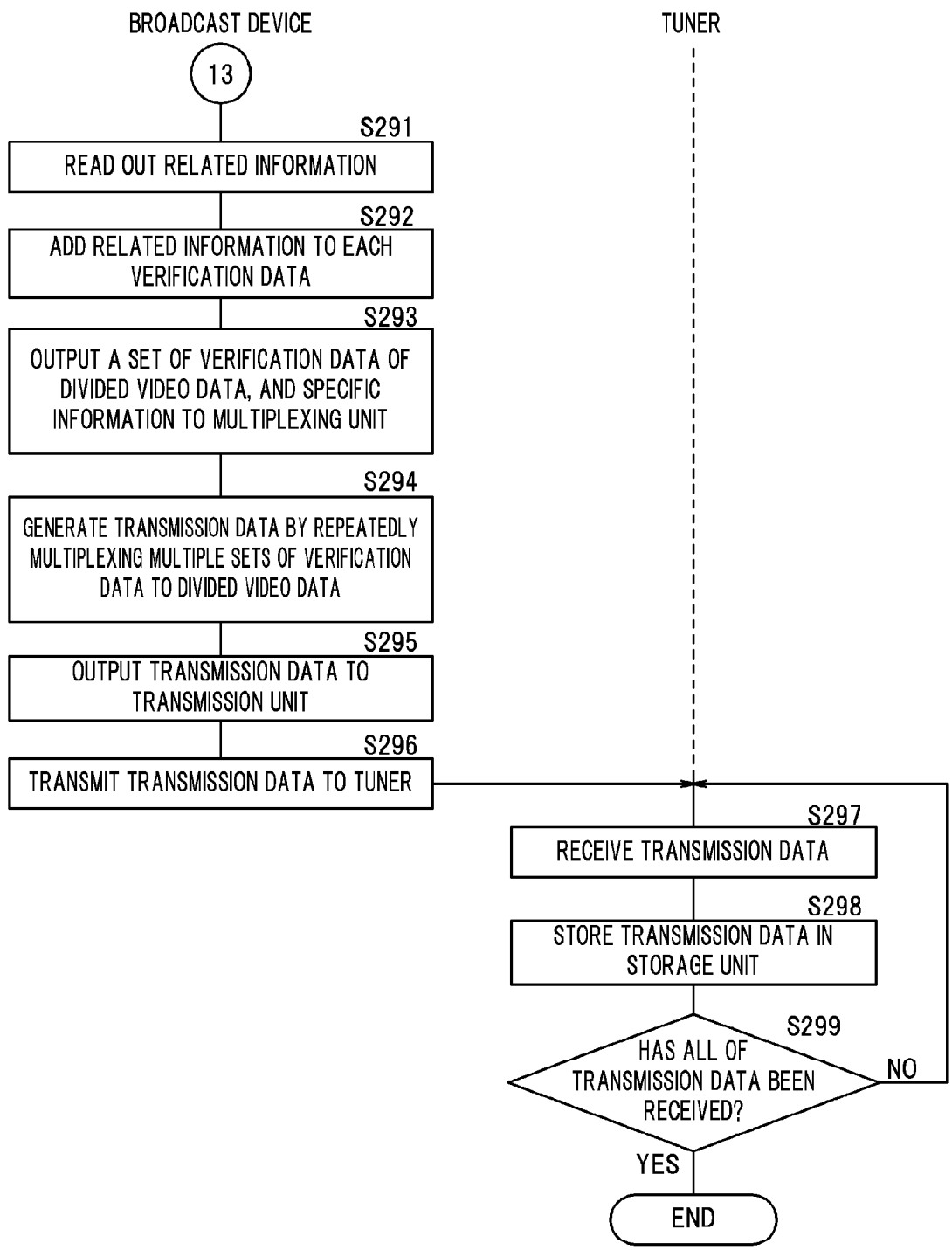
FIG. 29 is a flowchart illustrating the procedures of the transmission processing of divided video data.
Figure 30:
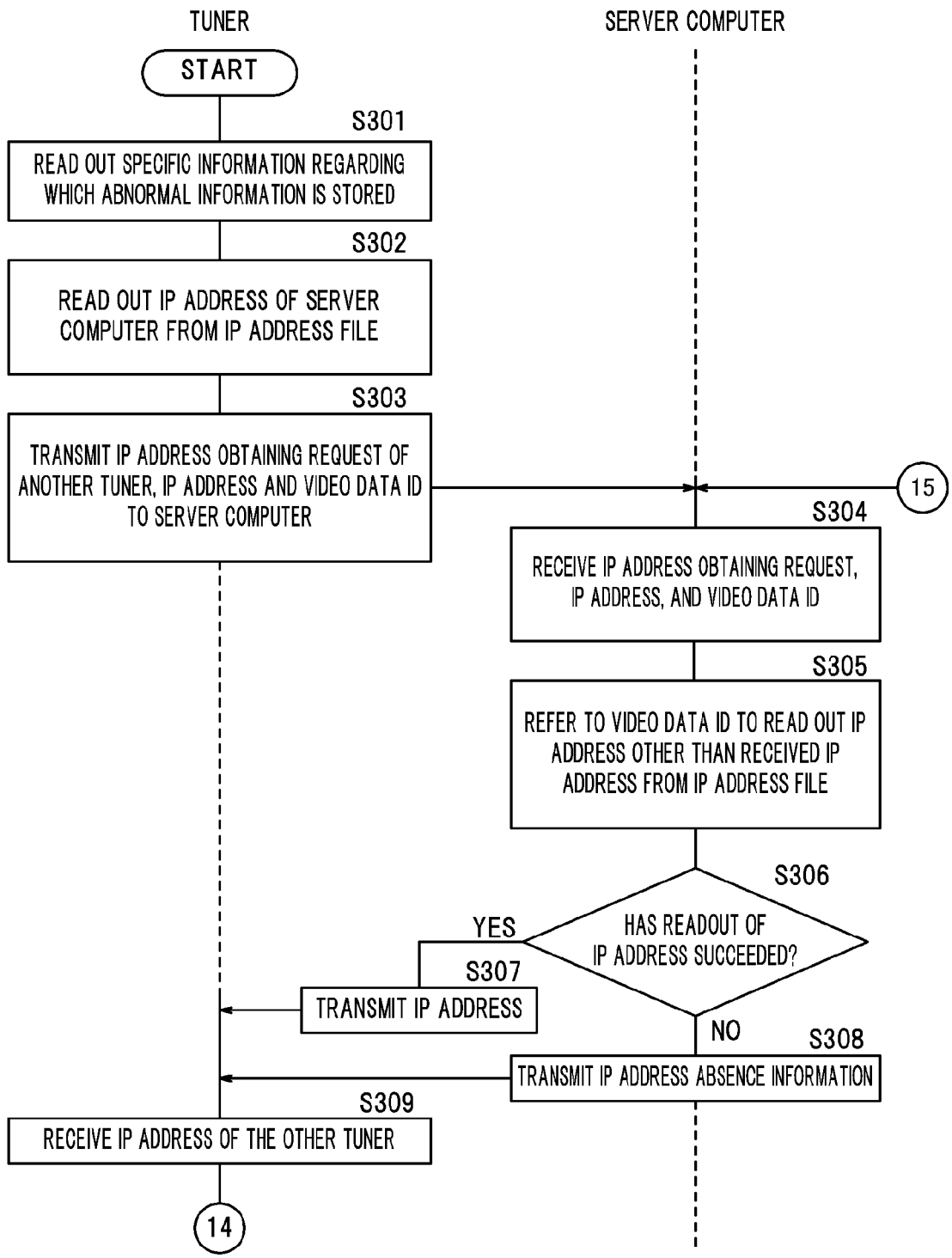
FIG. 30 is a flowchart illustrating the procedures of error correction processing.
Figure 31:
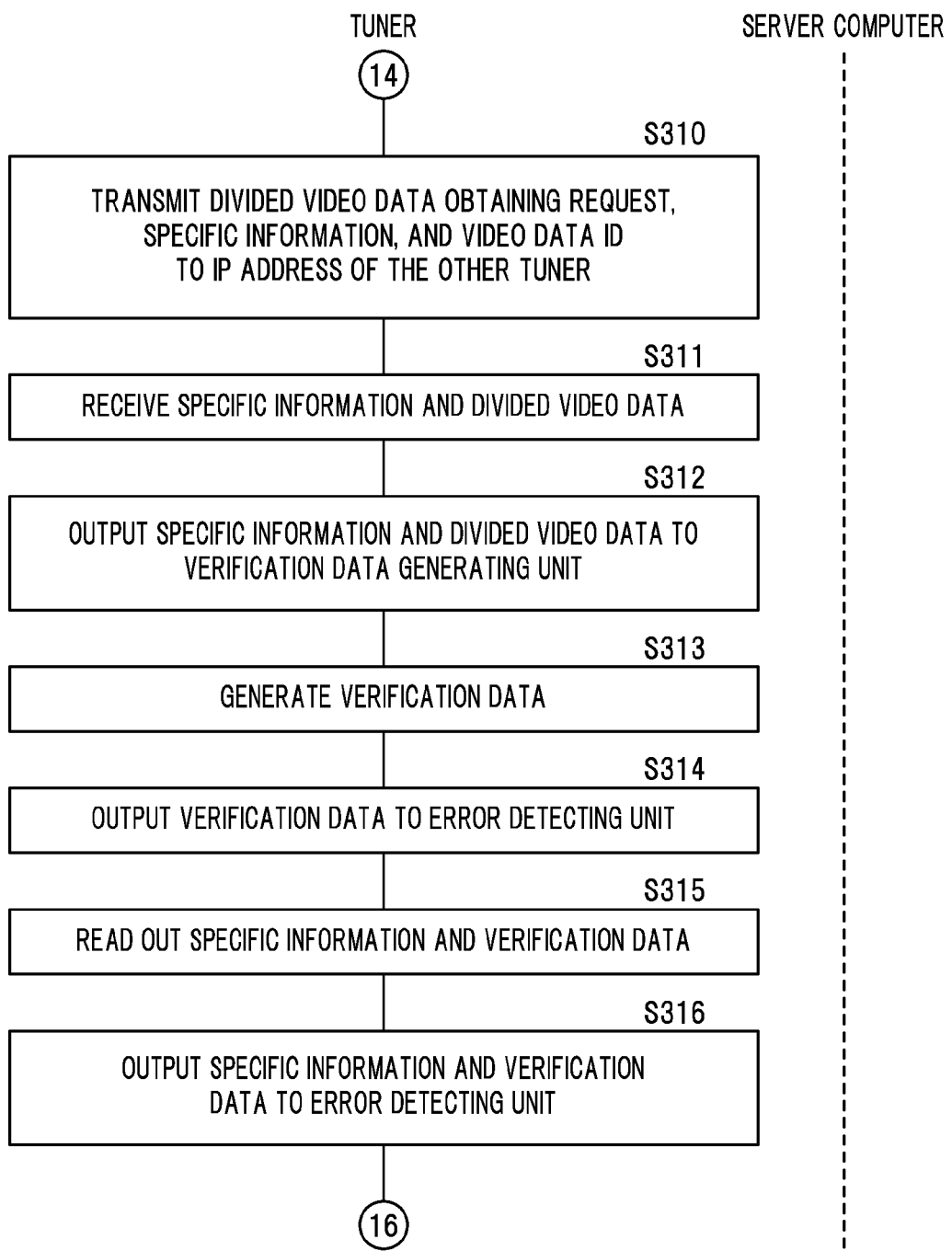
FIG. 31 is a flowchart illustrating the procedures of the error correction processing.
Figure 32:
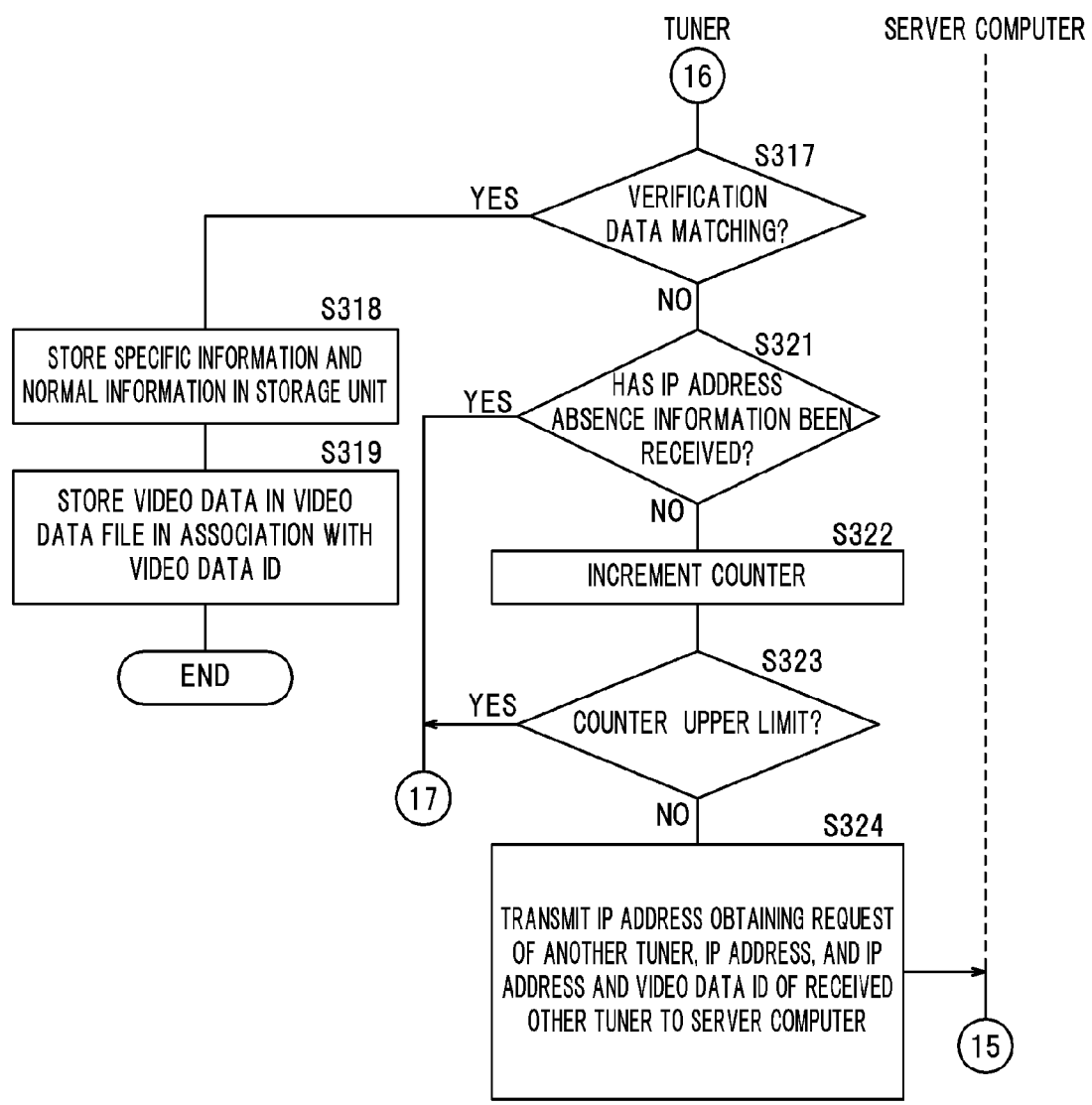
FIG. 32 is a flowchart illustrating the procedures of the error correction processing.
Figure 33:
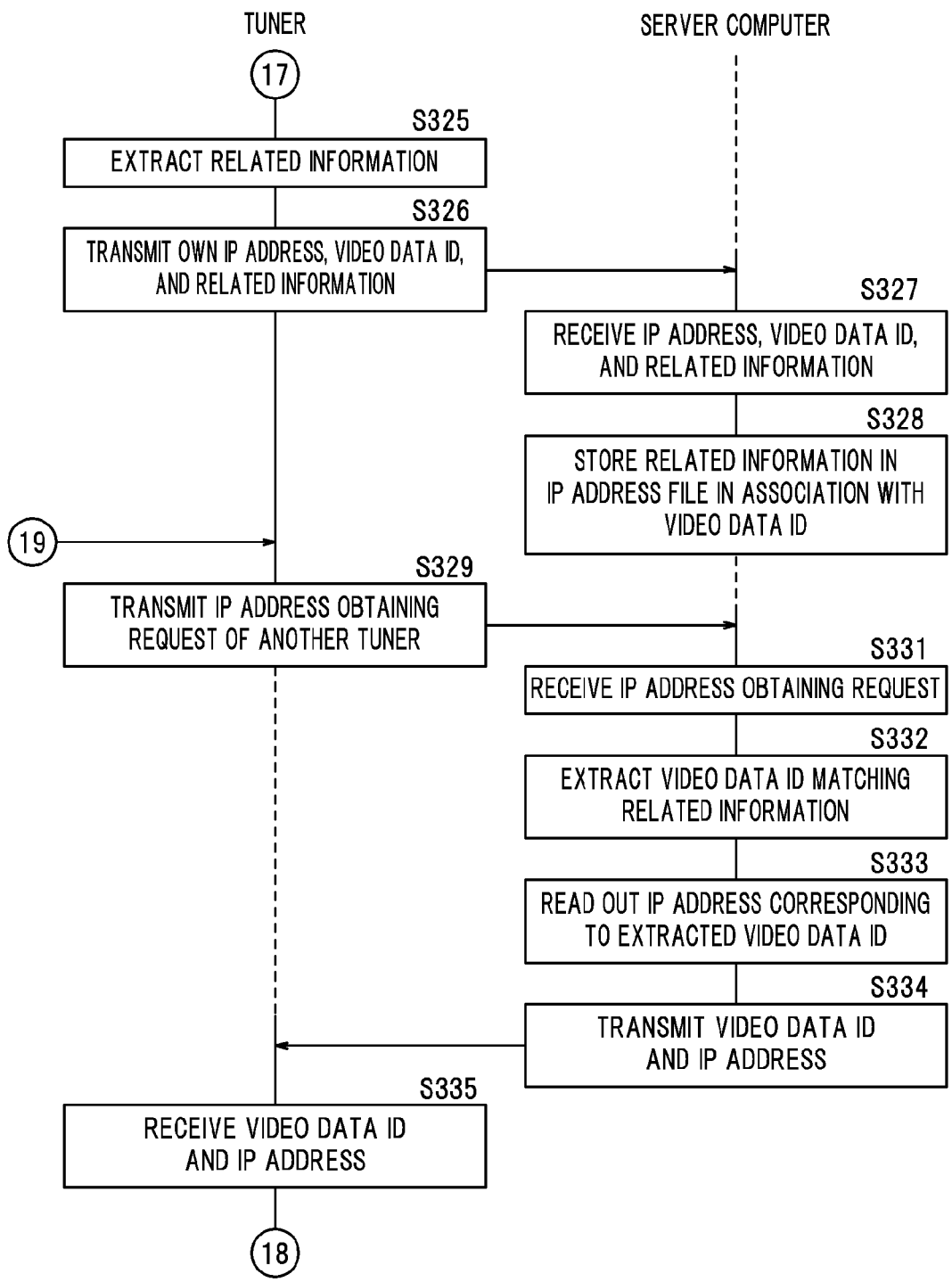
FIG. 33 is a flowchart illustrating the procedures of the error correction processing.
Figure 34:
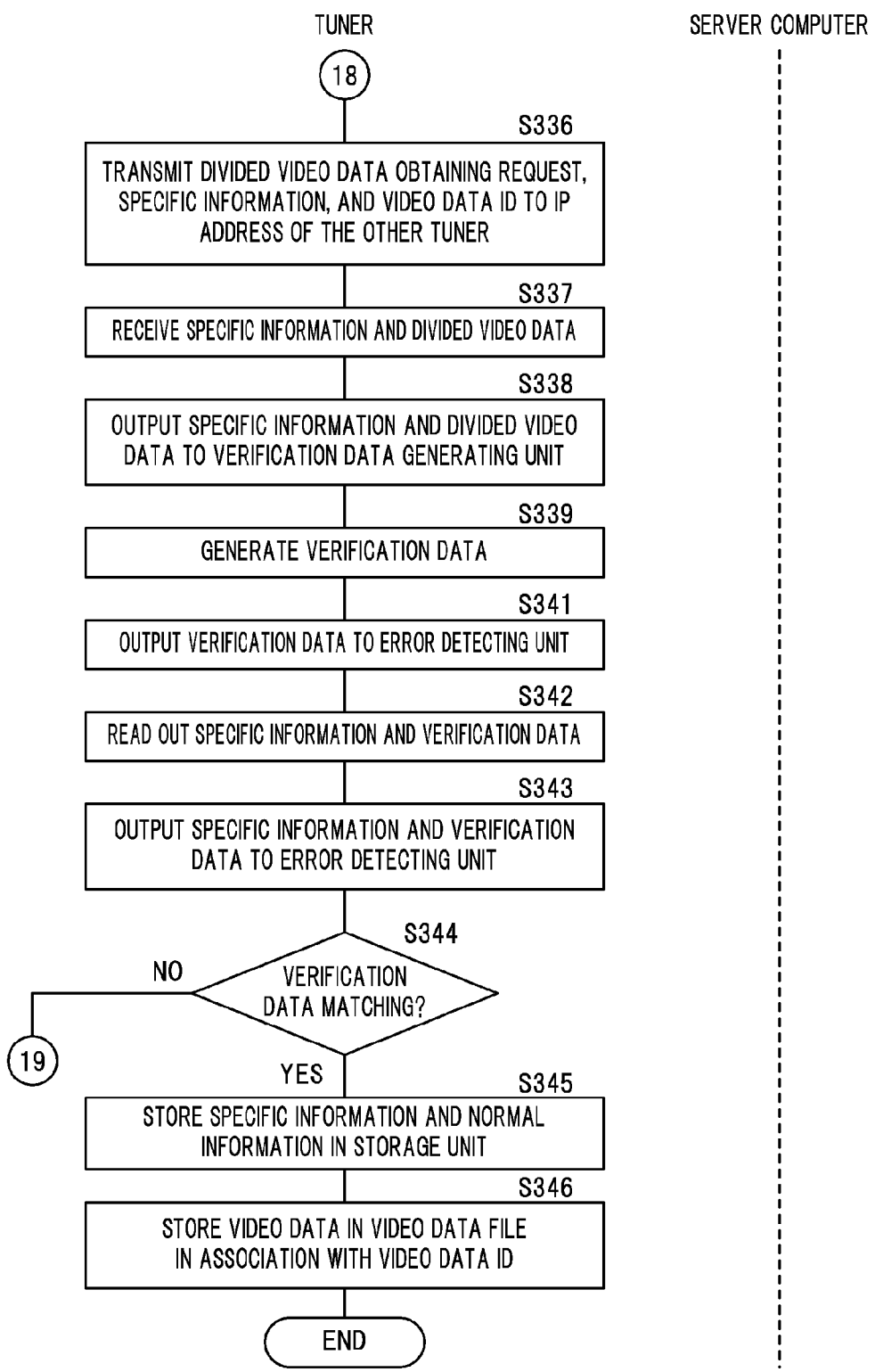
FIG. 34 is a flowchart illustrating the procedures of the error correction processing.

FIG. 28 and FIG. 29 are flowcharts illustrating the procedures of transmission processing of divided video data 50D. The control unit 11 of the broadcast device 1 boots the control program 15P (operation S281). The control unit 11 reads out the video data ID and video data 50 to be transmitted, from the video data file 151 (operation S282). The control unit 11 reads out the IP addresses of the transmission destination tuners 2, stored in the storage unit 15 beforehand. The control unit 11 transmits the read IP addresses and the video data ID to the server computer 3 via the communication unit 14 (operation S283). The CPU 31 of the server computer 3 receives the IP addresses and the video data ID from the broadcast device 1. As illustrated in FIG. 26, the CPU 31 stores the video data ID and the IP addresses in the IP address file 352 in association with the broadcast device ID of the broadcast device 1. Note that an embodiment will be described later wherein related information is transmitted along therewith.

The control unit 11 divides the read video data 50 in accordance with the number of divisions stored in the storage unit 15 beforehand to generate specific information and divided video data 50D (operation S284). The control unit 11 outputs the video data ID, the specific information, and the divided video data 50D to the verification data generating unit 12 (operation S285). The verification data generating unit 12 generates verification data 60 for each of the divided video data 50D (operation S286). The control unit 11 stores the generated verification data 60 in the storage unit 15 in association with the specific information (operation S287). The control unit 11 determines whether or not the verification data 60 has been generated regarding all of the divided video data 50D (operation S288).

Upon determining that generating of the verification data 60 has not ended regarding all of the divided video data 50D (NO in operation S288), the control unit 11 proceeds to operation S285, and executes processing for generating the verification data 60 of the divided video data 50D according to another specific information. Upon determining that the verification data 60 has been generated regarding all of the divided video data 50D (YES in operation S288), the control unit 11 outputs all of the divided video data 50D and the specific information, and all the video data ID stored in the storage unit 15 to the multiplexing unit 13 (operation S289).

The control unit 11 reads out the related information stored beforehand in the storage unit 15 in association with the video data ID (operation S291). With regard to this related information, an operator may input the video data ID according to another broadcast station notified from the other broadcast station from an input unit (not illustrated) or the like, as suitable. The control unit 11 adds the read related information to the header or the like of the packet of the verification data 60 (operation S292). The control unit 11 outputs a set of each of the verification data 60 to which the related information of the divided video data 50D is added, and the specific information to the multiplexing unit 13 (operation S293). The multiplexing unit 13 repeatedly multiplexes multiple sets of the verification data 60 with the divided video data 50D to generate transmission data 70 (operation S294).

The multiplexing unit 13 outputs the generated transmission data 70 to the transmission unit 16 (operation S295). The transmission unit 16 subjects the transmission data 70 to modulation and the like, and transmits the transmission data 70 after modulation to the tuner 2 (operation S296). The tuner 2 receives the transmitted transmission data 70 at the reception unit 26 (operation S297). The reception unit 26 subjects the transmission data 70 to demodulation and the like, and sequentially outputs the transmission data 70 after demodulation to the control unit 21. The control unit 21 successively stores the received transmission data 70 in the storage unit 25 (operation S298).

The control unit 21 determines whether or not all of the transmission data 70 scheduled to be transmitted has been received (operation S299). Upon determining that all of the transmission data 70 have not been received (NO in operation S299), the control unit 21 proceeds to operation S297, and subsequently performs reception. On the other hand, upon determining that all of the transmission data 70 has been received (YES in operation S299), the control unit 21 ends the processing.

FIG. 30 through FIG. 34 are flowcharts illustrating the procedures of error correction processing. The following processing is executed after NO in operation S122. The control unit 21 reads out the specific information regarding which abnormal information is stored, from the storage unit 25 to execute error correction (operation S301). The control unit 21 reads out the IP address of the server computer 3 from the IP address file 252 (operation S302). The control unit 21 transmits an obtaining request for the IP address of another tuner 2, the IP address of the tuner 2 itself, and the video data ID to the server computer 3 addressed to the IP address read out via the communication unit 24 (operation S303). The CPU 31 of the server computer 3 receives the obtaining request for the IP address, the IP address, and the video data ID via the communication unit 36 (operation S304).

The CPU 31 refers to the video data ID to read out an IP address other than the received IP address from the IP address file 352 (operation S305). The CPU 31 determines whether or not readout of the IP address in operation S305 has succeeded (operation S306). Upon determining that readout of the IP address has succeeded (YES in operation S306), the CPU 31 transmits the read IP address of the other tuner 2 to the tuner 2 (operation S307). On the other hand, upon determining that readout of the IP address has not succeeded (NO in operation S306), the CPU 31 transmits absence information indicating that there is no IP address to the tuner 2 (operation S308). The subsequent processing proceeds to operation S321. As illustrated in FIG. 26, the number of the IP addresses corresponding to the video data ID is limited, and in the case of continuously transmitting the IP address of another tuner 2 excluding the IP address of the tuner 2 itself so as not to be duplicated, ultimately no IP address to be transmitted remains. In this case, the CPU 31 transmits IP address absence information.

The tuner 2 receives the IP address of the other tuner 2 via the communication unit 24 (operation S309). The control unit 21 of the tuner 2 transmits an obtaining request for the divided video data 50D, the specific information read out in operation S301, and the video data ID to the IP address of the other tuner 2 (operation S310). The control unit 21 receives the specific information and the divided video data 50D transmitted from the other tuner 2 via the communication unit 24 (operation S311). The control unit 21 outputs the received specific information and the divided video data 50D to the verification data generating unit 22 (operation S312). The verification data generating unit 22 uses the hash function to generate the verification data 60 (operation S313). The verification data generating unit 22 outputs the specific information, and the calculated verification data 60 to the error detecting unit 23 (operation S314). The control unit 21 reads out the specific information and the verification data 60 after separation stored in the storage unit 25 (operation S315). The control unit 21 outputs the read specific information and the verification data 60 to the error detecting unit 23 (operation S316).

The error detecting unit 23 determines whether or not the mutual verification data 60 match (operation S317). Upon determining that these match (YES in operation S317), the error detecting unit 23 outputs normal information indicating that the received divided video data 50D is normal, and the specific information to the control unit 21. The control unit 21 stores the specific information and the normal information in the storage unit 25 (operation S318). The control unit 21 stores video data 50 in which all of the divided video data 50D are connected in the specific information order in the video data file 251 in association with the video data ID (operation S319).

Upon determining that the verification data 60 does not match (NO in operation S317), the control unit 21 skips the processing in operations S318 and S319 and proceeds to operation S321. The control unit 21 determines whether or not the IP address absence information has been received (operation S321). Upon determining that the IP address absence information has not been received (NO in operation S321), the control unit 21 counts the number of times when the verification data 60 does not match in operation S317 (operation S322). The control unit 21 determines whether or not the counted number of times is equal to or greater than the upper limit count (operation S323).

Upon determining that the counted number of times is less than the upper limit count (NO in operation S323), the control unit 21 proceeds to operation S324. The control unit 21 transmits an obtaining request for the IP address of another tuner 2, the control unit 21's own IP address, the IP address of the other tuner 2 received in operation S309, and the video data ID to the server computer 3 (operation S324). Note that in the case that multiple IP addresses have been received in operation S309, all of the IP addresses may be transmitted. Also, in order to prevent redundant transmission, an arrangement may be made wherein the CPU 31 of the server computer 3 sets a flag to a transmitted IP address, and an IP address to which the flag is not set, which has not been transmitted is transmitted.

Subsequently, the processing proceeds to operation S304. The CPU 31 of the server computer 3 transmits the IP address of the tuner 2 of which the obtaining request was received, and an IP address other than the IP address that has already been transmitted. Upon determining that the counted number of times is equal to or greater than the upper limit count (YES in operation S323), or upon determining that the IP address absence information has been received in operation S321 (YES in operation S321), the control unit 21 proceeds to operation S325. The tuner 2 performs the following processing to obtain the IP address of the tuner 2 which received the divided video data 50D transmitted from the other broadcast device 1. The control unit 21 extracts the related information included in the transmission data 70 received in operation S297 (operation S325). For example, the control unit 21 extracts the related information included in the header or the like of the verification data 60. The control unit 21 transmits the own IP address, the video data ID, and the related information to the server computer 3 (operation S326). Note that an arrangement may be made wherein the IP address of yet another different server computer 3 is read out, and the processing in operation S303 is performed.

The CPU 31 of the server computer 3 receives the IP address of the tuner 2, video data ID, and related information (operation S327). The CPU 31 searches the IP address file 352 based on the received video data ID and IP address, and stores the received related information in association with the video data ID (operation S328). Note that the related information corresponding to the video data ID may be received from the broadcast device 1 beforehand.

Subsequently, the control unit 21 of the tuner 2 performs an obtaining request for the IP address of another tuner 2 (operation S329). The CPU 31 of the server computer 3 receives the obtaining request (operation S331). The CPU 31 refers to the IP address file 352 to extract the video data ID matching the related information (operation S332). The CPU 31 reads out the IP address corresponding to the extracted video data ID (operation S333). The CPU 31 transmits the video data ID given at another broadcast device 1, and the read IP address to the tuner 2 (operation S334).

The tuner 2 receives the video data ID and IP address (operation S335). The control unit 21 of the tuner 2 transmits an obtaining request for the divided video data 50D, the specific information read out in operation S301, and the video data ID to the IP address of the other tuner 2 (operation S336). The other tuner 2 refers to the video data ID and the specific information to read out the corresponding divided video data 50D from the video data file 251. Subsequently, the other tuner 2 transmits the read divided video data 50D and the specific information to the tuner 2 which performed the obtaining request. The control unit 21 receives the specific information and divided video data 50D transmitted from the other tuner 2 via the communication unit 24 (operation S337). The control unit 21 outputs the received specific information and divided video data 50D to the verification data generating unit 22 (operation S338). The verification data generating unit 22 uses the hash function to generate verification data 60 (operation S339). The verification data generating unit 22 outputs the specific information and the calculated verification data 60 to the error detecting unit 23 (operation S341). The control unit 21 reads out the specific information and the verification data 60 after separation stored in the storage unit 25 (operation S342). The control unit 21 outputs the read specific information and the verification data 60 to the error detecting unit 23 (operation S343).

The error detecting unit 23 determines whether or not the mutual verification data 60 match (operation S344). Upon determining that the verification data 60 match (YES in operation S344), the error detecting unit 23 outputs normal information indicating that the received divided video data 50D is normal, and the specific information to the control unit 21. The control unit 21 stores the specific information and the normal information in the storage unit 25 (operation S345). The control unit 21 stores the video data 50 in which all of the divided video data 50D are connected in the specific information order, in the video data file 251 in association with the video data ID (operation S346).

Upon determining that the verification data 60 does not match (NO in operation S344), the control unit 21 proceeds to operation S329, and performs an obtaining request for the IP address of yet another tuner 2. In this case, the CPU 31 of the server computer 3 transmits an IP address that has not been transmitted so that IP addresses to be transmitted are not duplicated. Thus, even in the event that the tuner 2 which receives the divided video data 50D transmitted from the same broadcast device 1 receives a similar radio disturbance, the divided video data 50D is obtained from the other tuner 2 by referring to another related information as appropriate. Another broadcast device 1 may exist in an area different from a broadcast device 1, and accordingly, a communication network N such as the Internet or the like which does not receive the influence of that area is put to efficient use.

With the present embodiment, of portions of which the detailed descriptions were omitted, the portions corresponding to those in the above embodiment are denoted with the same reference numerals and description thereof will be omitted.

Figure 35:
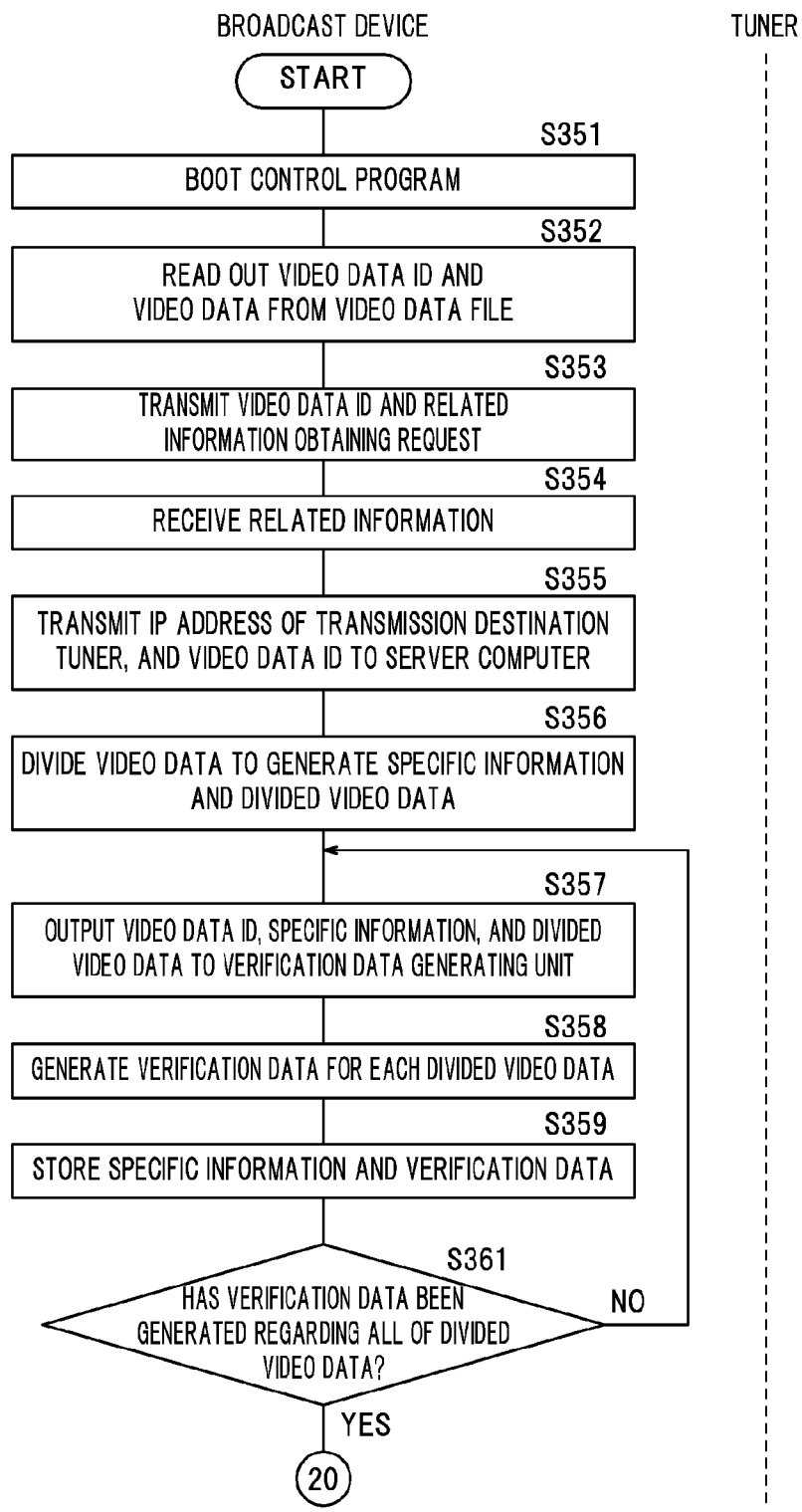
FIG. 35 is a flowchart illustrating the procedures of transmission processing of divided video data.
Figure 36:
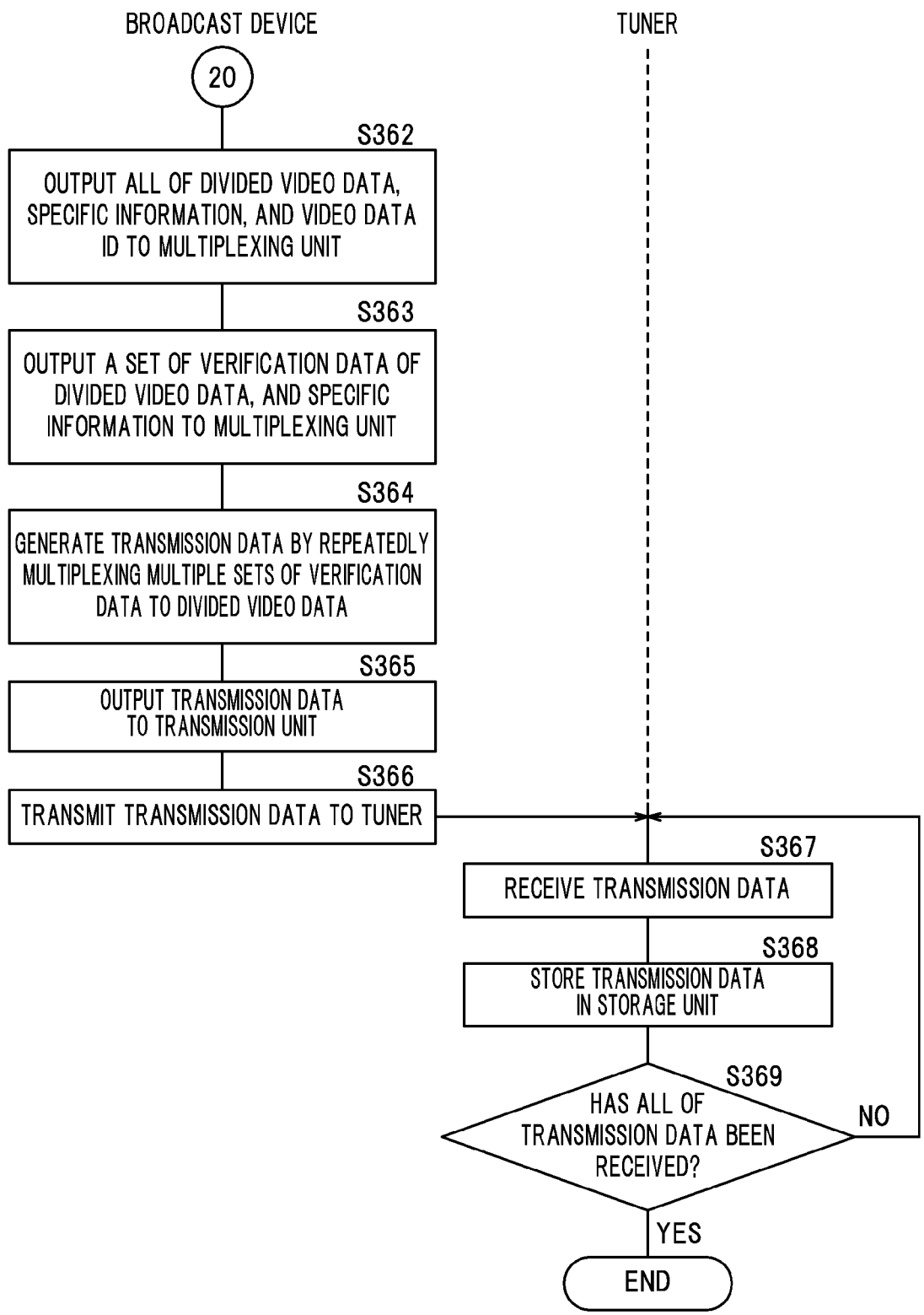
FIG. 36 is a flowchart illustrating the procedures of the transmission processing of divided video data.
Figure 37:
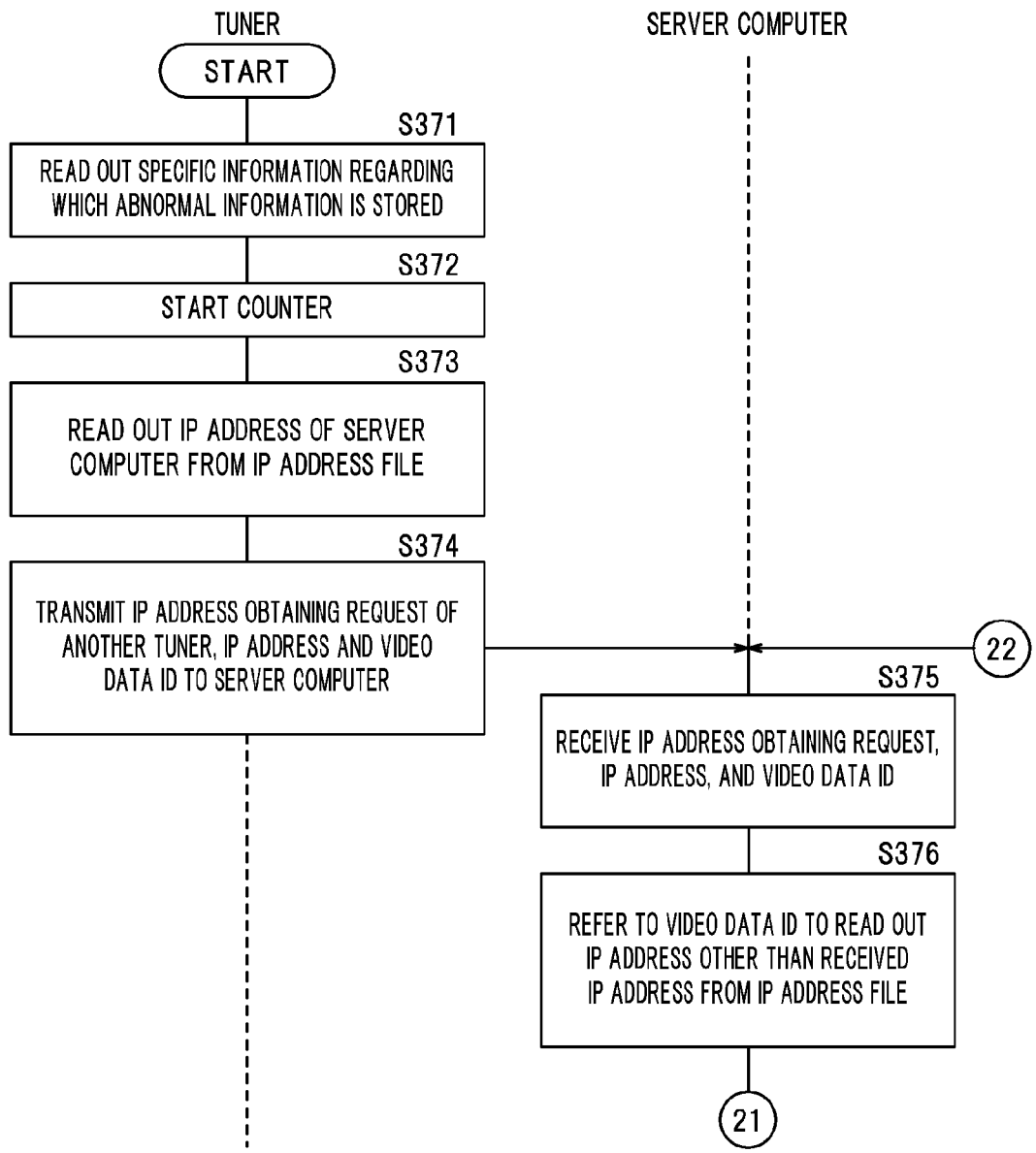
FIG. 37 is a flowchart illustrating the procedures of error correction processing.
Figure 38:
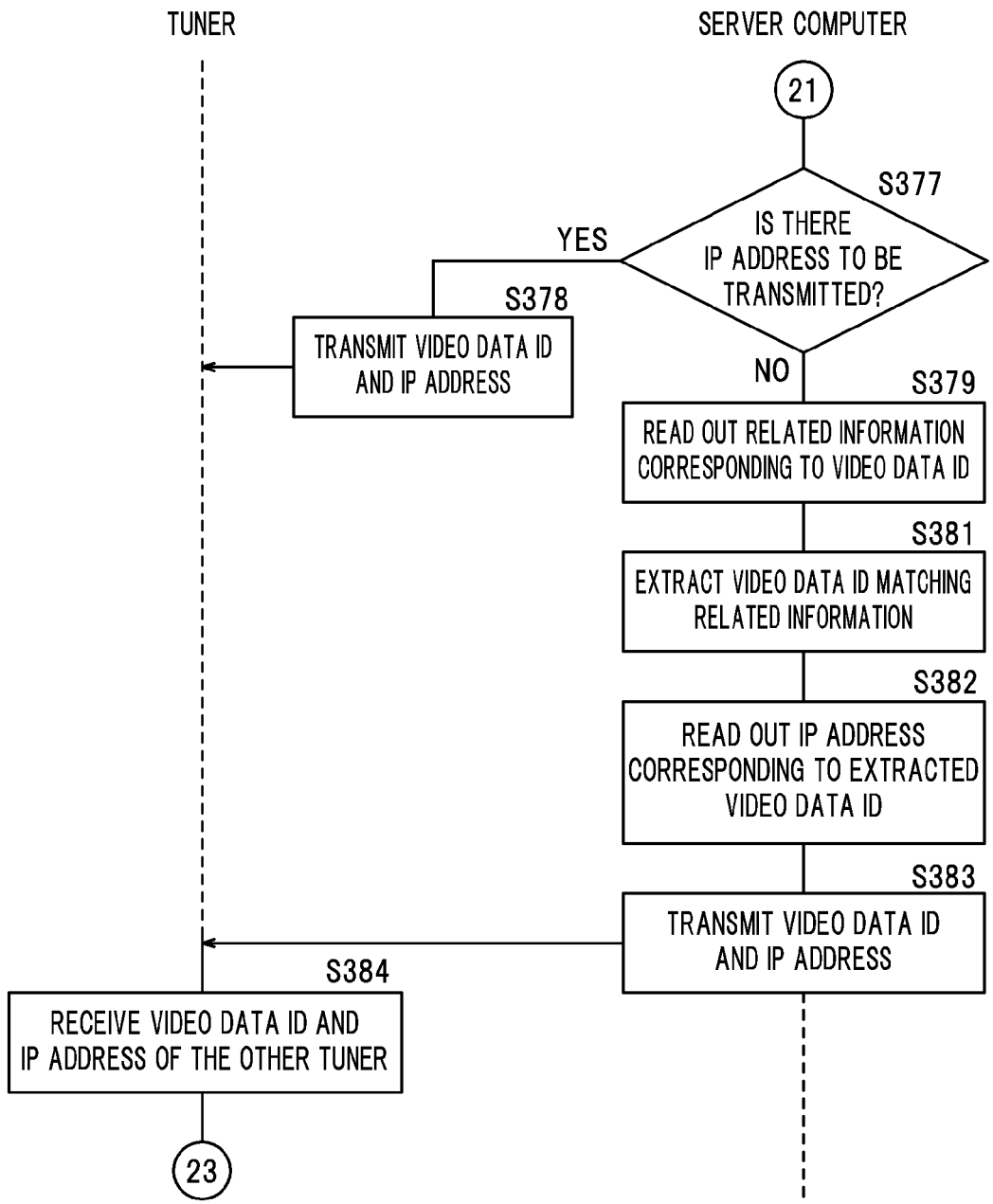
FIG. 38 is a flowchart illustrating the procedures of the error correction processing.
Figure 39:
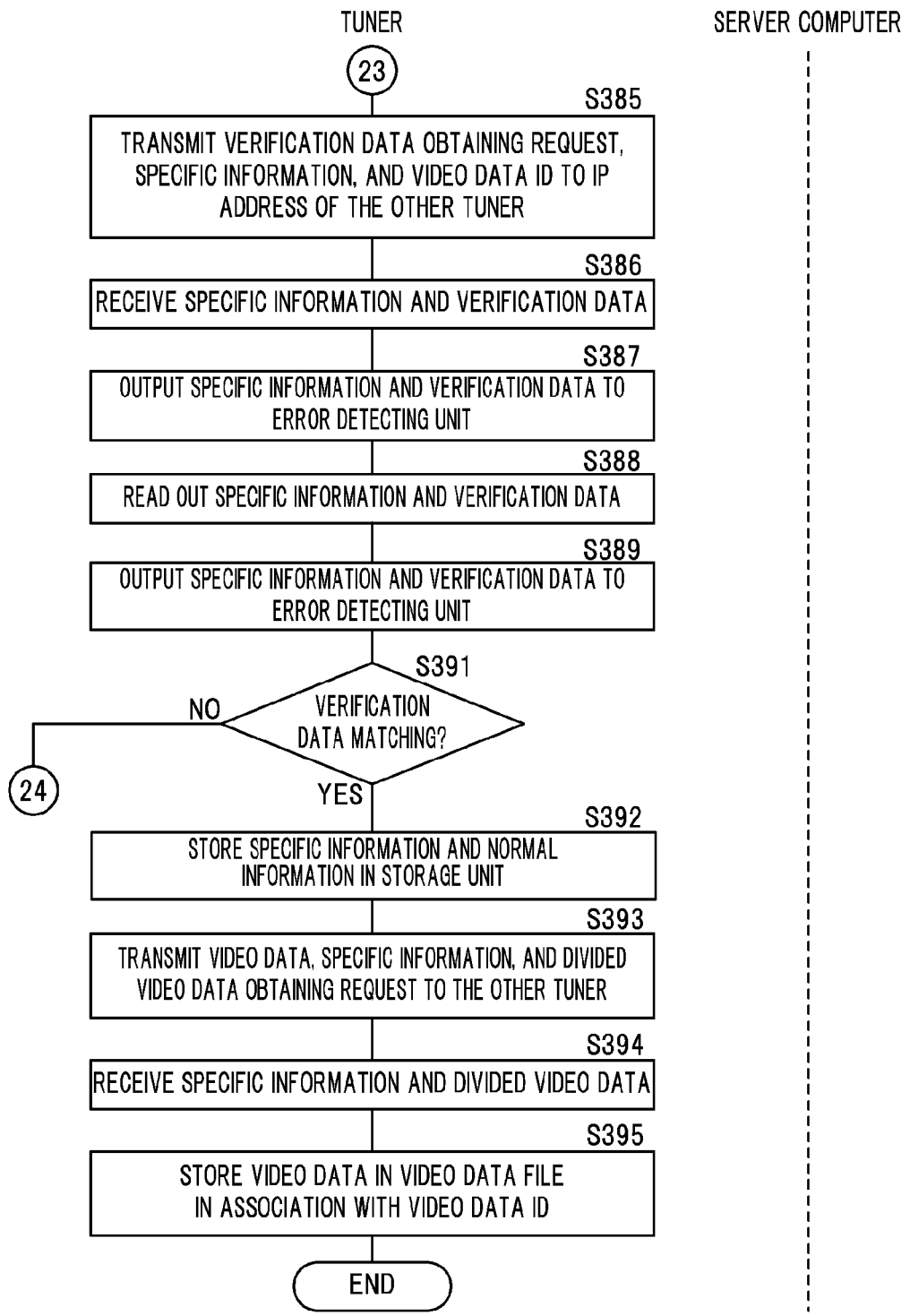
FIG. 39 is a flowchart illustrating the procedures of the error correction processing.
Figure 40:
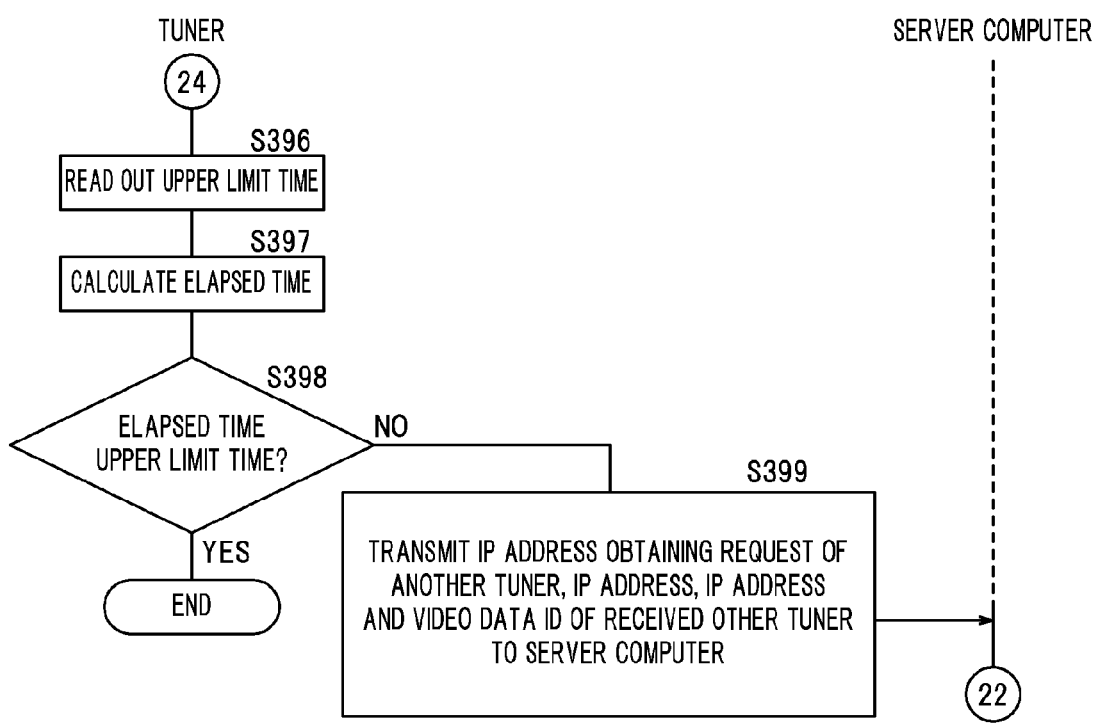
FIG. 40 is a flowchart illustrating the procedures of the error correction processing.

Yet another embodiment will be described. The present embodiment relates to an embodiment wherein no related information is transmitted to the tuner 2. FIG. 35 and FIG. 36 are flowcharts illustrating the procedures of transmission processing of divided video data 50D. The control unit 11 of the broadcast device 1 boots the control program 15P (operation S351). The control unit 11 reads out the video data ID and the video data 50 of a transmission object from the video data file 151 (operation S352). The control unit 11 transmits an obtaining request for the video data ID and related information to an external web server (not illustrated) via the communication unit 14 (operation S353). The external web server stores correspondence between the video data ID and the related information between broadcast devices 1. The web server transmits the related information corresponding to the video data ID to the broadcast device 1.

The control unit 11 of the broadcast device 1 receives the related information (operation S354). The control unit 11 reads out the IP addresses of the transmission destination tuners 2, stored beforehand in the storage unit 15. The control unit 11 transmits the read IP addresses, the video data ID, and the related information to the server computer 3 via the communication unit 14 (operation S355). In this case, the control unit 11 transmits the broadcast device ID to the server computer 3 along therewith. The CPU 31 of the server computer 3 receives the IP addresses, video data ID, and related information from the broadcast device 1. As illustrated in FIG. 26, the CPU 31 stores the video data ID, the related information, and the IP addresses in the IP address file 352 in association with the broadcast device ID of the broadcast device 1.

The control unit 11 divides the read video data 50 in accordance with the number of divisions stored in the storage unit 15 beforehand to generate the specific information and the divided video data 50D (operation S356). The control unit 11 outputs the video data ID, specific information, and divided video data 50D to the verification data generating unit 12 (operation S357). The verification data generating unit 12 generates the verification data 60 for each of the divided video data 50D (operation S358). The control unit 11 stores the generated verification data 60 in the storage unit 15 in association with the specific information (operation S359). The control unit 11 determines whether or not the verification data 60 has been generated regarding all of the divided video data 50D (operation S361).

Upon determining that the verification data 60 has not been generated regarding all of the divided video data 50D (NO in operation S361), the control unit 11 proceeds to operation S357, and executes processing for generating the verification data 60 of the divided video data 50D according to other specific information. Upon determining that the verification data 60 has been generated regarding all of the divided video data 50D (YES in operation S361), the control unit 11 outputs all of the divided video data 50D and the specific information, and the video data ID, stored in the storage unit 15, to the multiplexing unit 13 (operation S362).

The control unit 11 outputs a set of each of the verification data 60 of the divided video data 50D, and the specific information to the multiplexing unit 13 (operation S363). The multiplexing unit 13 repeatedly multiplexes multiple sets of the verification data 60 with the divided video data 50D to generate transmission data 70 (operation S364).

The multiplexing unit 13 outputs the generated transmission data 70 to the transmission unit 16 (operation S365). The transmission unit 16 subjects the transmission data 70 to modulation and the like, and transmits the transmission data 70 after modulation to the tuner 2 (operation S366). The tuner 2 receives the transmitted transmission data 70 at the reception unit 26 (operation S367). The reception unit 26 subjects the transmission data 70 to demodulation and the like, and sequentially outputs the transmission data 70 after demodulation to the control unit 21. The control unit 21 successively stores the received transmission data 70 in the storage unit 25 (operation S368).

The control unit 21 determines whether or not all of the transmission data 70 scheduled to be transmitted has been received (operation S369). Upon determining that all of the transmission data 70 has not been received (NO in operation S369), the control unit 21 proceeds to operation S367, and subsequently performs reception. On the other hand, upon determining that all of the transmission data 70 has been received (YES in operation S369), the control unit 21 ends the processing.

FIG. 37 through FIG. 40 are flowcharts illustrating the procedures of error correction processing. The following processing is executed after NO in operation S122 in FIG. 12. The control unit 21 reads out specific information regarding which abnormal information is stored, from the storage unit 25 to execute error correction (operation S371). The control unit 21 refers to the output of the timer unit 29 to start timekeeping (operation S372). The control unit 21 reads out the IP address of the server computer 3 from the IP address file 252 (operation S373). The control unit 21 transmits an obtaining request for the IP address of another tuner 2, the IP address of the tuner 2 of the control unit 21, and the video data ID to the server computer 3 addressed to the IP address read out via the communication unit 24 (operation S374). The CPU 31 of the server computer 3 receives the obtaining request for the IP address, the IP address, and the video data ID via the communication unit 36 (operation S375).

The CPU 31 refers to the video data ID to read out an IP address other than the received IP address from the IP address file 352 (operation S376). The CPU 31 determines whether or not readout of the IP address in operation S376 has succeeded (operation in S377). Upon determining that readout of the IP address has succeeded (YES in operation S377), the CPU 31 transmits the video data ID, and the read IP address of the other tuner 2 to the tuner 2 (operation S378). On the other hand, upon determining that readout of the IP address has not succeeded (NO in operation S377), the CPU 31 reads out the related information corresponding to the video data ID from the IP address file 352 (operation S379).

The CPU 31 refers to the IP address file 352 to extract the video data ID matching the related information (operation S381). The CPU 31 reads out the IP address corresponding to the extracted video data ID (operation S382). The CPU 31 transmits the video data ID given at another broadcast device 1, and the read IP address to the tuner 2 (operation S383). Note that when the IP address corresponding to the video data ID is not stored in operation S382, the CPU 31 performs an obtaining request or a transmission request for the IP address from another server computer 3 not illustrated. For example, the CPU 31 reads out the IP address of the other server computer 3 from the storage unit 35. Subsequently, the CPU 31 performs an obtaining request for the IP address corresponding to the video data ID to the read IP address, and the processing advances to operation S383. In addition, the CPU 31 outputs a request for ordering the tuner 2 to transmit the IP address corresponding to the video data ID to the read IP address. In this case, the other server computer 3 transmits the IP address corresponding to the video data ID to the tuner 2 in the same way as operation S383.

The tuner 2 receives the video data ID and the IP address of the other tuner 2 (operation S384). The video data ID transmitted in operation S378 is the video data ID according to the broadcast device 1 which transmitted the video data 50, and the video data ID transmitted by operation S383 is the video data ID according to the other broadcast device 1. The control unit 21 of the tuner 2 transmits an obtaining request for the verification data 60, the specific information read out in operation S151, and the video data ID to the IP address of the other tuner 2 (operation S385).

The control unit 21 of the other tuner 2 receives the obtaining request to read out the verification data 60 stored in the storage unit 25 in association with the video data ID. Subsequently, the control unit 21 of the other tuner 2 transmits the read verification data 60 and the specific information to the tuner 2 which performed the obtaining request, via the communication unit 24. The control unit 21 of the tuner 2 receives the specific information and the verification data 60 transmitted from the other tuner 2, via the communication unit 24 (operation S386). The control unit 21 outputs the received specific information and the verification data 60 to the error detecting unit 23 (operation S387). The control unit 21 reads out the specific information and the verification data 60 after separation stored in the storage unit 25 (operation S388). The control unit 21 outputs the read specific information and the verification data 60 to the error detecting unit 23 (operation S389).

The error detecting unit 23 determines whether or not the mutual verification data 60 match (operation S391). Upon determining that the mutual verification data 60 matches (YES in operation S391), the error detecting unit 23 outputs normal information indicating that the received divided video data 50D is normal, and the specific information to the control unit 21. The control unit 21 stores the specific information and the normal information in the storage unit 25 (operation S392).

The control unit 21 executes the following processing to obtain suitable divided video data 50D from the other tuner 2. The control unit 21 refers to the video data ID and the IP address transmitted in operation S378 or S383 to transmit the video data ID, the specific information, and an obtaining request for the divided video data 50D corresponding to the specific information to the other tuner 2 (operation S393).

The control unit 21 of the other tuner 2 receives the video data ID, the specific information, and the obtaining request for the divided video data 50D corresponding to the specific information via the communication unit 24. The control unit 21 of the other tuner 2 refers to the video data ID and the specific information to read out the corresponding divided video data 50D from the video data file 251. The control unit 21 of the other tuner 2 transmits the read divided video data 50D and the specific information to the tuner 2 which transmitted the obtaining request.

The control unit 21 receives the specific information and the error-free divided video data 50D via the communication unit 24 (operation S394). Thus, upon obtaining all of the error-free divided video data 50D, the control unit 21 executes processing for connecting the divided video data 50D to generate the video data 50. The control unit 21 stores the video data 50 in which all of the divided video data 50D are connected in the specific information order, in the video data file 251 in association with the video data ID (operation S395).

Upon determining that the verification data 60 does not match (NO in operation S391), the control unit 21 skips the processing in operations S392 through S395, and proceeds to operation S396 to obtain the verification data 60 from yet another tuner 2. The control unit 21 reads out the upper limit time stored in the storage unit 25 (operation S396). The control unit 21 refers to the output of the timer unit 29 to calculate the elapsed time since start of timekeeping in operation S372 (operation S397). The control unit 21 determines whether or not the calculated elapsed time is equal to or greater than the upper limit time (operation S398). Upon determining that the elapsed time is equal to or greater than the upper limit time (YES in operation S398), the control unit 21 regards this as timeout and ends the processing.

Upon determining that the elapsed time is less than the upper limit time (NO in operation S398), the control unit 21 proceeds to operation S399. The control unit 21 transmits an obtaining request for the IP address of yet another tuner 2, the own IP address of the control unit 21, the IP address of the other tuner 2 already received in operation S384, and the video data ID to the server computer 3 (operation S399). Subsequently, the processing proceeds to operation S375. The CPU 31 of the server computer 3 repeats the processing in operation S375 and thereafter. Thus, the verification data 60 of the tuners 2 which received the same video data 50 through the other broadcast device 1 may be used effectively.

With the present embodiment, of portions of which the detailed descriptions were omitted, the portions corresponding to those in the above embodiment are denoted with the same reference numerals and description thereof will be omitted.

Figure 41:
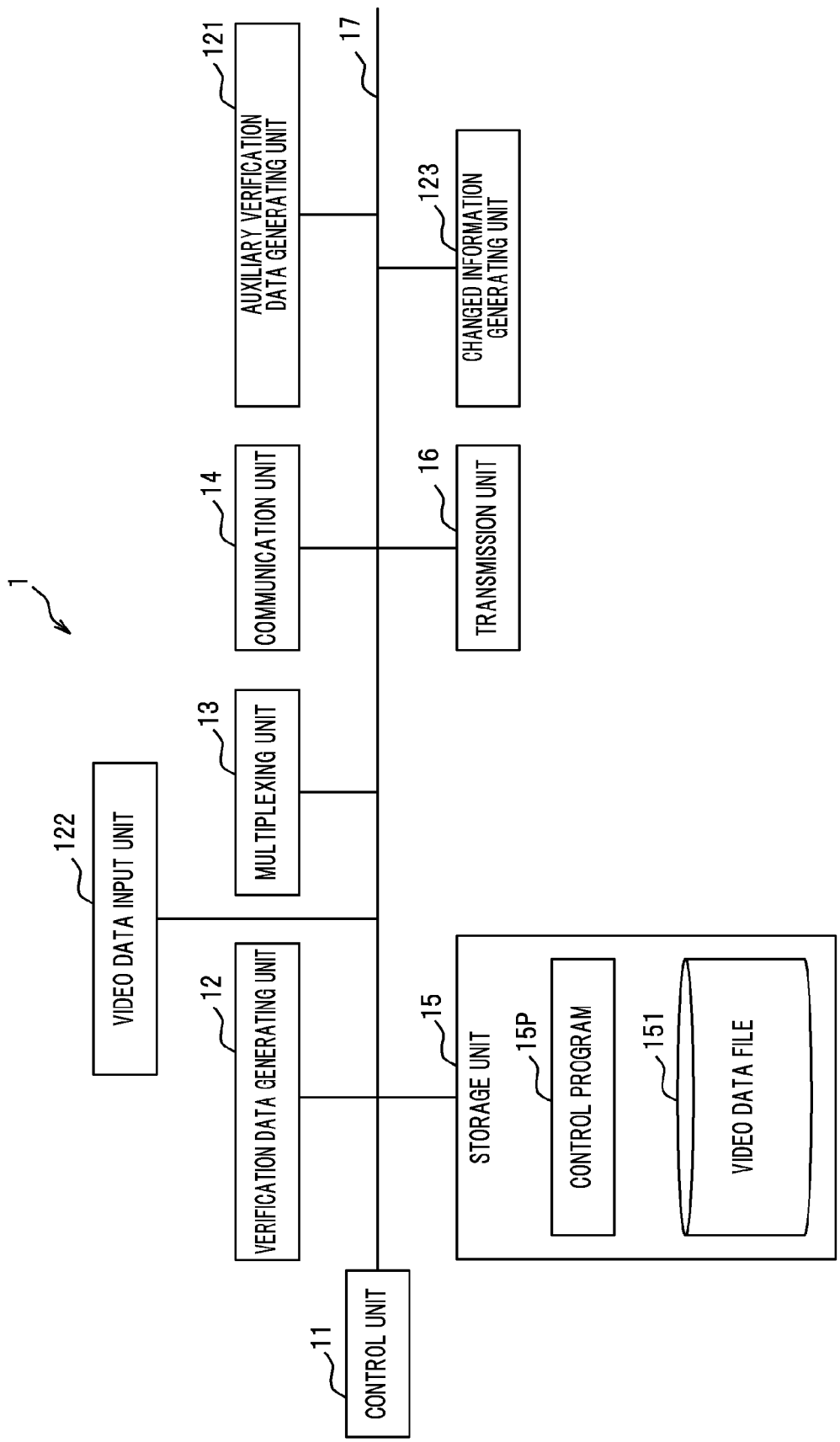
FIG. 41 is a block diagram illustrating the hardware of a broadcast device.

Yet another embodiment will be described. The present embodiment relates to processing when video data 50 is changed while transmitting the video data 50. FIG. 41 is a block diagram illustrating the hardware group of a broadcast device 1 according to the present embodiment. A video data input unit 122 and a changed information generating unit 123 are further provided. The video data input unit 122 is, for example, an input device such as a keyboard, mouse, or the like. For example, in the case of urgent earthquake news flash, information relating to the earthquake is superimposed in part of the video data 50. In this case, an operator inputs text data using a keyboard which is the video data input unit 122. Alternatively, the video data input unit 122 may be a recording medium or the like such as USB (Universal Serial Bus) memory, a hard disk, DVD (Digital Versatile Disc), or the like.

The control unit 11 outputs the text data to the multiplexing unit 13. The multiplexing unit 13 multiplexes the text data to the divided video data 50D being transmitted. Alternatively, instead of the input of text data, text data stored in a recording medium or different video data 50 may be output to the control unit 11. With the present embodiment, in order to facilitate explanation, description will be made regarding an example wherein text data input by a keyboard (hereafter, changed data) is multiplexed with the divided video data 50D. The changed information generating unit 123 refers to the output of additional data of the video data input unit 122, and the output of the multiplexing unit 13 to output changed information to the multiplexing unit 13.

Figure 42:
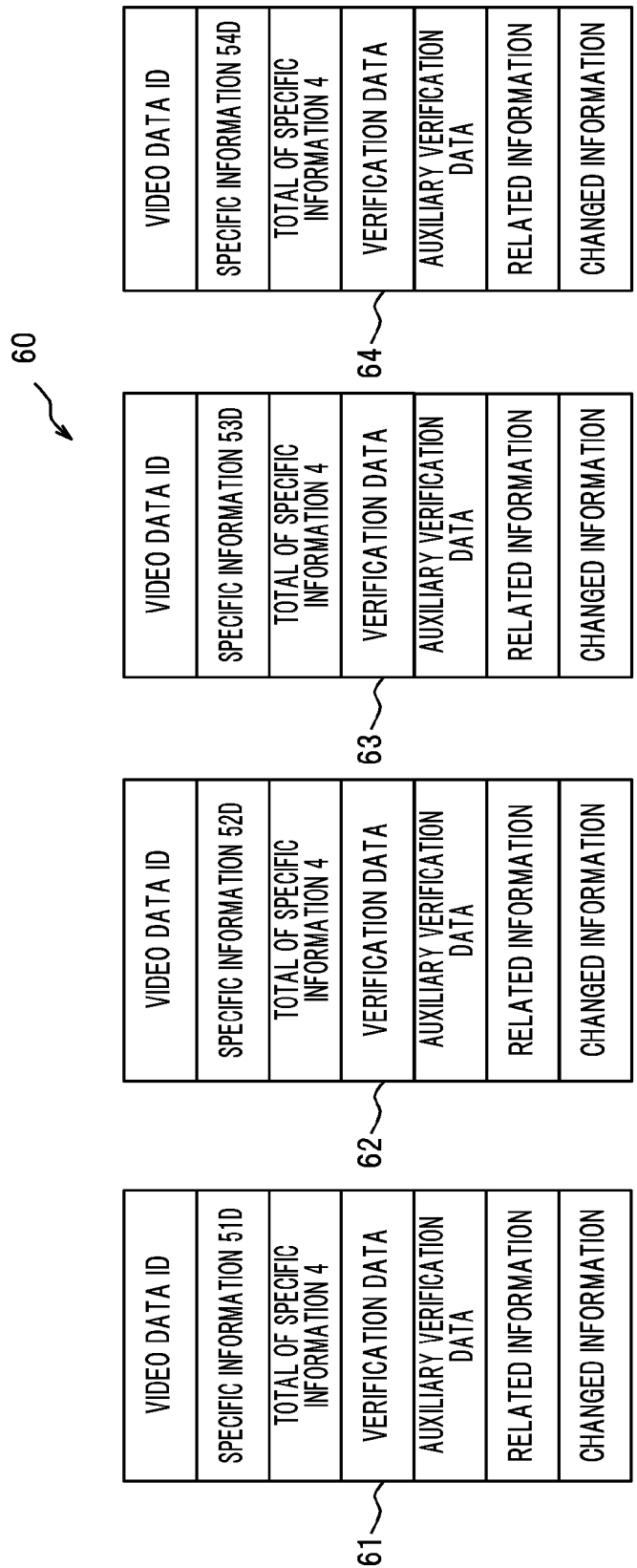
FIG. 42 is a diagram illustrating the record layout of verification data.

Changed information is information indicating that one of the divided video data 50D has been changed. With the present embodiment, changed information that is changed into three stages will be described as an example. FIG. 42 is an explanatory diagram illustrating a record layout of verification data 60. Further, a changed information field is provided in the verification data 60. Changed information is described in the header or the like of the verification data 60. Changed information includes an unchanged state indicating that the divided video data 50D may be changed during transmission (hereafter, denoted with state "0" depending on situations). Changed information includes a non-changed state indicating that transmission of the divided video data 50D has been completed without being changed during transmission (hereafter, denoted with state "1" depending on situations). Further, changed information includes a changed state indicating that the divided video data 50D has been changed during transmission (hereafter, denoted with state "2" depending on situations).

FIGS. 43A and 43B are explanatory diagrams illustrating a transition of changed information. FIG. 43A illustrates the transition of changed information to be transmitted from the transmission unit 16 of the broadcast device 1. Note that, in FIG. 43A, an example will be described wherein the changed data is not output. A set of verification data 61, 62, 63, and 64 is repeatedly transmitted in accordance with the transmission of the divided video data 51, 52, 53, and 54. Similarly, a set of changed information 71, 72, 73, and 74 (hereafter, represented with 700 depending on situations) is repeatedly transmitted along with the verification data 60. Upon starting transmission of the divided video data 51, the control unit 11 outputs the verification data 61 and specific information generated at the verification data generating unit 12 to the multiplexing unit 13. Also, the changed information generating unit 123 outputs the state "0" that is the changed information 700 to the multiplexing unit 13 since changed data was not output.

As illustrated in FIG. 43A, changed information 71, 72, 73, and 74 to be added to the verification data 61, 62, 63, and 64 become "0", "0", "0", and "0" respectively. Upon determining that the divided video data 51 has been transmitted from the transmission unit 16 without being changed, the changed information generating unit 123 outputs the specific information and the non-changed state (state "1") to the multiplexing unit 13. Thus, after transmission of the divided video data 51, the changed information 71, 72, 73, and 74 to be added to the verification data 61, 62, 63, and 64 become "1", "0", "0", and "0" respectively. Similarly, upon determining that the divided video data 52 has been transmitted from the transmission unit 16 without being changed, the changed information generating unit 123 outputs the specific information and the non-changed state (state "1") to the multiplexing unit 13. Thus, after transmission of the divided video data 52, the changed information 71, 72, 73, and 74 to be added to the verification data 61, 62, 63, and 64 become "1", "1", "0", and "0" respectively.

Next, upon determining that the divided video data 53 has been transmitted from the transmission unit 16 without being changed, the changed information generating unit 123 outputs the specific information and the non-changed state (state "1") to the multiplexing unit 13. After transmission of the divided video data 53, the changed information 71, 72, 73, and 74 to be added to the verification data 61, 62, 63, and 64 become "1", "1", "1", and "0" respectively. Even when determining that the divided video data 54 has been transmitted from the transmission unit 16 without being changed by the changed information generating unit 123, all of the video data 50 has already been transmitted. Accordingly, at the transmission end stage of the divided video data 54, the changed information 71, 72, 73, and 74 to be added to the verification data 61, 62, 63, and 64 are still "1", "1", "1", and "0" respectively. FIG. 43B is an explanatory diagram illustrating the changed information 700 of the tuner 2. Upon receiving the transmission data 70 via the reception unit 26, the control unit 21 of the tuner 2 separates the changed information 700 to be repeatedly transmitted. As illustrated in FIG. 43A, the changed information 700 successively changes in time series. The control unit 21 overwrites the separated changed information 700 to the latest changed information 700.

With the example in FIGS. 43A and 43B, the ultimately received changed information 71, 72, 73, and 74 are "1", "1", "1", and "0" respectively. In the case that the changed information 74 is "0", the control unit 21 regards this as having no additional changed data to rewrite the changed information 74 to "1". Thus, such as illustrated in FIG. 43B, the changed information 71, 72, 73, and 74 of the tuner 2 become "1", "1", "1", and "1" respectively.

Figure 44A:
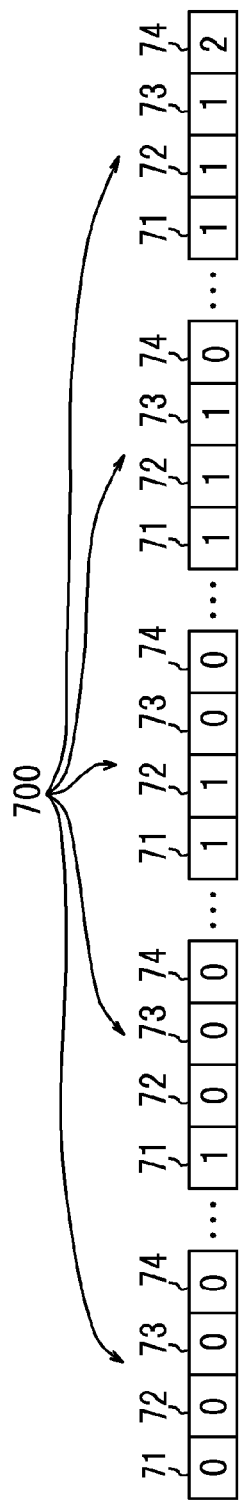
FIGS. 44A through 44C are diagrams illustrating the transition of changed information in the case of changed data being added.
Figure 44B:
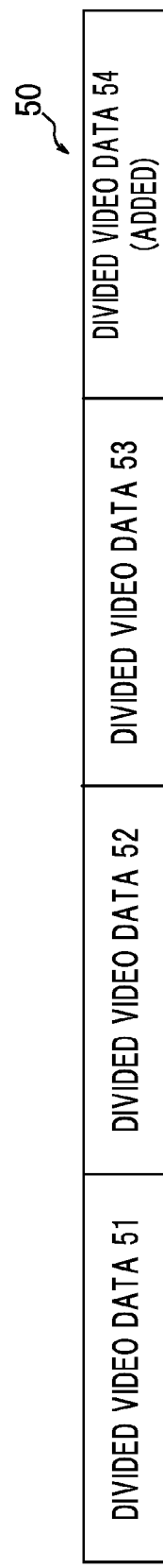
Figure 44C:
Figure 45:
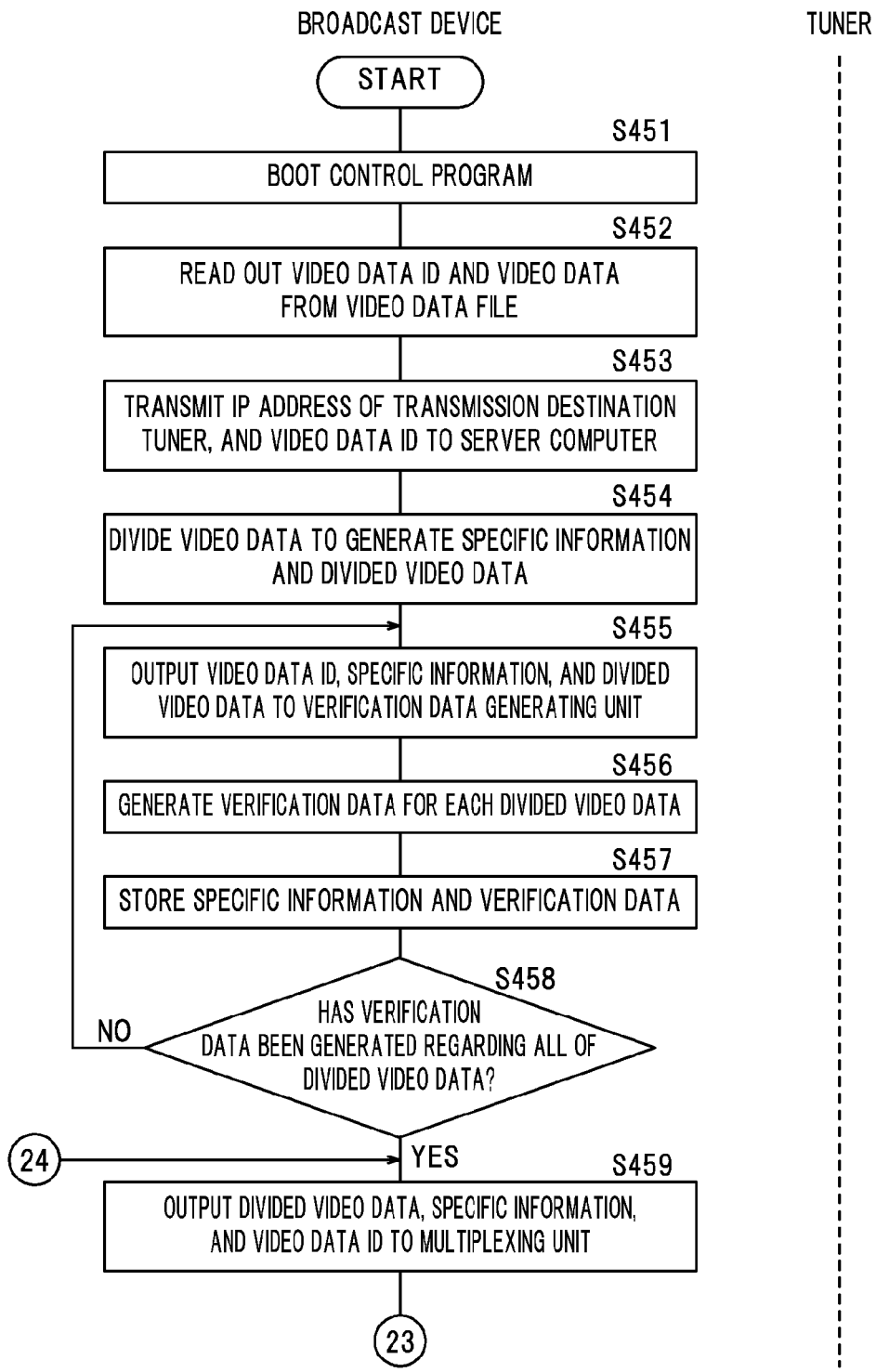
FIG. 45 is a flowchart illustrating the procedures of additional processing.
Figure 46:
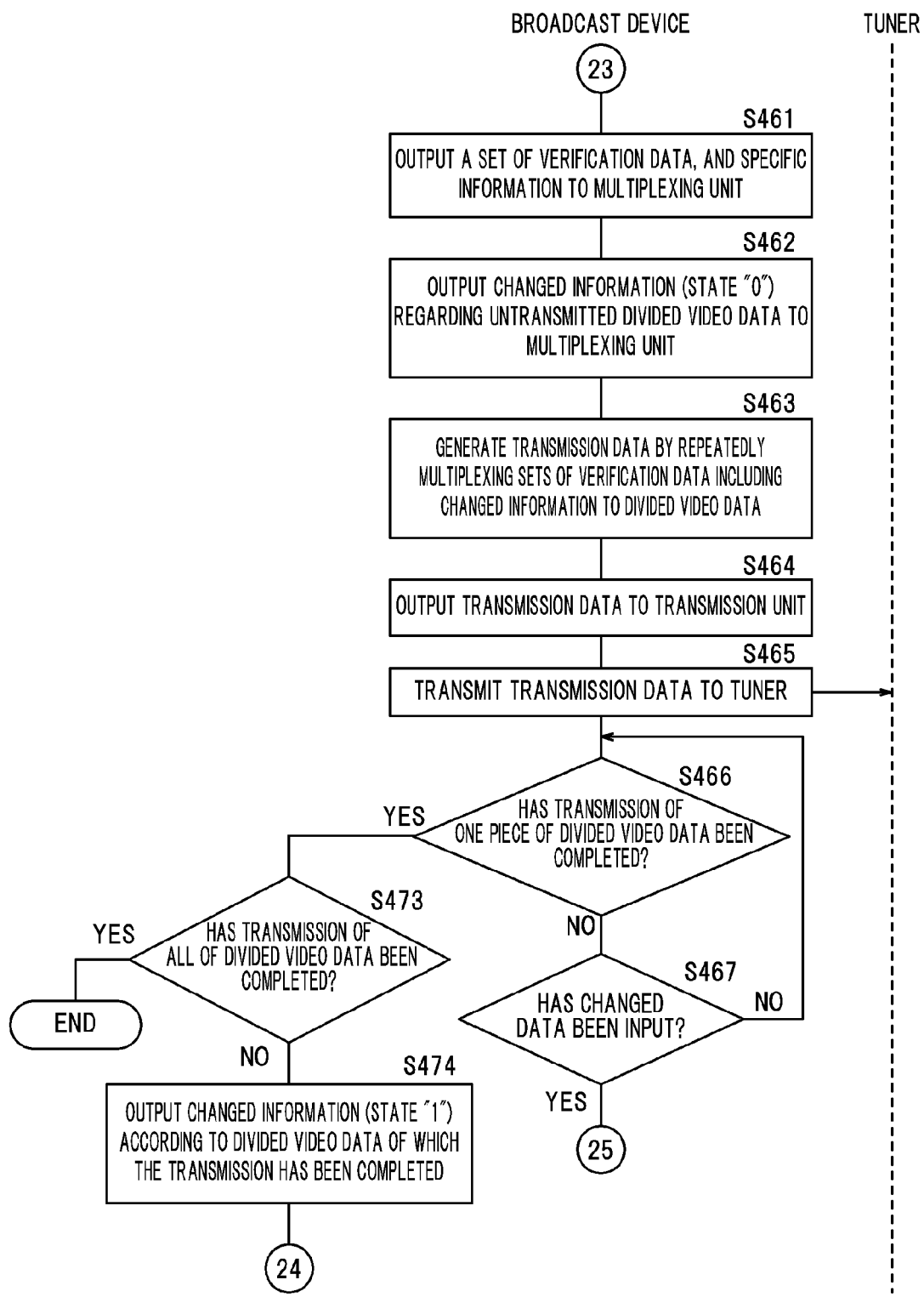
FIG. 46 is a flowchart illustrating the procedures of the additional processing.
Figure 47:
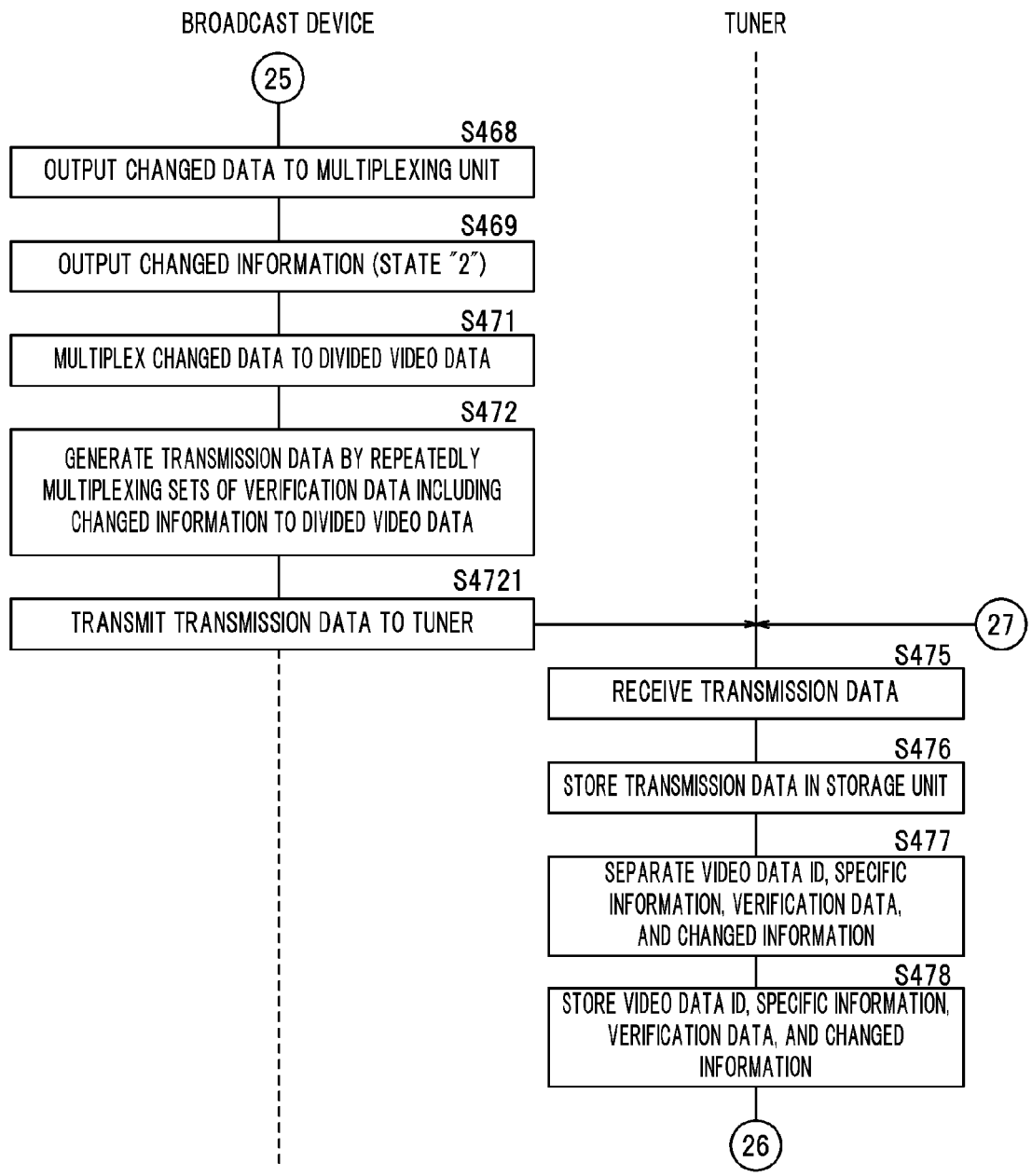
FIG. 47 is a flowchart illustrating the procedures of the additional processing.
Figure 48:
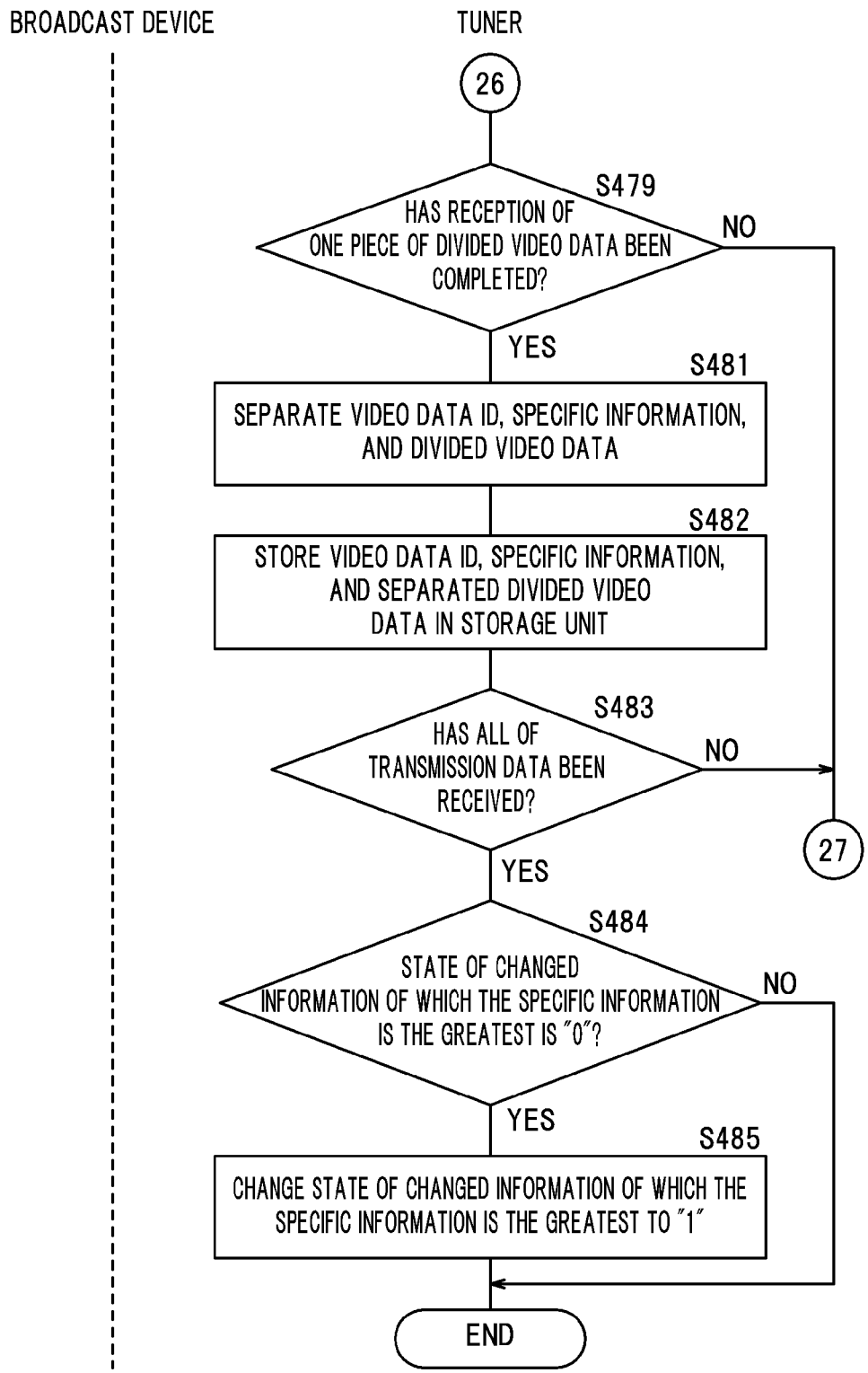
FIG. 48 is a flowchart illustrating the procedures of the additional processing.

FIGS. 44A through 44C are explanatory diagrams illustrating transition of the changed information 700 when changed data is added. In FIGS. 44A through 44C, description will be made regarding an example wherein changed data is added while transmitting the divided video data 54. Changed data input at the video data input unit 122 is output to the control unit 11. The control unit 11 outputs the changed data to the multiplexing unit 13. The multiplexing unit 13 multiplexes the changed data to the divided video data 54 being transmitted. The changed information generating unit 123 outputs the changed state (state "2") that is the changed information 700 to the multiplexing unit 13 since the changed data was output from the video data input unit 122. The multiplexing unit 13 multiplexes the changed information 700 to the verification data 64 corresponding to the divided video data 54 being transmitted.

FIG. 44A is an explanatory diagram illustrating transition of the changed information 700. As illustrated in FIG. 44A, the changed information 74 is changed from "0" to "2" along with the change after transmission of the divided video data 54. FIG. 44B is an explanatory diagram illustrating the divided video data 50D to be transmitted from the transmission unit 16. Changed data such as a caption or the like is added to the divided video data 54. FIG. 44C is an explanatory diagram illustrating verification data 60. The verification data 64 is a cache value calculated before changed data is added, and is repeatedly transmitted to the tuner 2 as is.

The error detecting unit 23 of the tuner 2 performs error detection by processing described below since the divided video data 54 after the change and the verification data 64 do not match. The control unit 21 of the tuner 2 performs the obtaining request for the verification data 64 for the other tuner 2, and when these verification data 64 match, regards as a low probability that the divided video data 54 after the change may include an error. In the case that these do not match, the control unit 21 obtains the verification data 64 from a plurality of other tuners 2, and obtains error-free divided video data 54 from a tuner 2 which transmits matching verification data 60.

FIG. 45 through FIG. 48 are flowcharts illustrating the procedures of additional processing. The control unit 11 of the broadcast device 1 boots the control program 15P (operation S451). The control unit 11 reads out the video data ID and the video data 50 of a transmission object from the video data file 151 (operation S452). The control unit 11 reads out the IP addresses of the transmission destination tuners 2, stored beforehand in the storage unit 15. The control unit 11 transmits the read IP addresses and the video data ID to the server computer 3 via the communication unit 14 (operation S453).

The control unit 11 divides the read video data 50 in accordance with the number of divisions stored in the storage unit 15 beforehand to generate the specific information and the divided video data 50D (operation S454). The control unit 11 outputs the video data ID, the specific information, and the divided video data 50D to the verification data generating unit 12 (operation S455).

The verification data generating unit 12 generates verification data 60 for each of the divided video data 50D (operation S456). The verification data generating unit 12 uses the hash function to generate the verification data 60 of the divided video data 50D according to each piece of specific information. The control unit 11 stores the generated verification data 60 in the storage unit 15 in association with the specific information (operation S457). The control unit 11 determines whether or not the verification data 60 has been generated regarding all of the divided video data 50D (operation S458).

Upon determining that generating of the verification data 60 has not ended regarding all of the divided video data 50D (NO in operation S458), the control unit 11 proceeds to operation S455, and executes processing for generating the verification data 60 of the divided video data 50D according to another specific information. Upon determining that the verification data 60 has been generated regarding all of the divided video data 50D (YES in operation S458), the control unit 11 outputs the divided video data 50D and the specific information, and the video data ID, stored in the storage unit 15, to the multiplexing unit 13 (operation S459).

The control unit 11 outputs a set of the verification data 60, and the specific information stored in the storage unit 15 to the multiplexing unit 13 (operation S461). The changed information generating unit 123 outputs the changed information 700 (state "0") to the multiplexing unit 13 regarding the divided video data 50D not transmitted (operation S462). At a stage for transmitting the divided video data 51, the changed information 71, 72, 73, and 74 become "0", "0", "0", and "0" respectively. The multiplexing unit 13 repeatedly multiplexes the verification data 60 including the changed information 700 to the divided video data 50D to generate transmission data 70 (operation S463).

The multiplexing unit 13 outputs the transmission data 70 thus generated to the transmission unit 16 (operation S464). The transmission unit 16 subjects the transmission data 70 to modulation and the like, and transmits the transmission data 70 after modulation to the tuner 2 (operation S465). The control unit 11 monitors the transmission situation of the transmission unit 16 to determine whether or not transmission of one of the divided video data 50D has been completed (operation S466). In the case that transmission of the divided video data 50D has been completed (YES in operation S466), the control unit 11 proceeds to operation S473. For example, in the case that the changed data has not been input from the video data input unit 122 while transmitting the divided video data 51, and transmission of the divided video data 51 has been completed, the control unit 11 proceeds to operation S473.

The control unit 11 determines whether or not transmission has been completed regarding all of the divided video data 51, 52, 53, and 54 (operation S473). Upon determining that transmission of all of the divided video data 50D has not been completed (NO in operation S473), the control unit 11 proceeds to operation S474. The changed information generating unit 123 outputs the changed information 700 (state "1") according to the divided video data 50D regarding which transmission has been completed at the determination in operation S466 to the multiplexing unit 13 (operation S474). Subsequently, the processing returns to operation S459. Transmission of all of the divided video data 50D is completed by repeatedly performing this loop. Also, when changed data has not been transmitted, the changed information 700 is changed from "0" to "1" each time a transmission is completed. When determining that transmission of all of the divided video data 50D has been completed (YES in operation S473), the control unit 11 ends the processing.

When determination is made in operation S466 that transmission of one of the divided video data 50D has not been completed (NO in operation S466), the control unit 11 determines whether or not the changed data has been input from the video data input unit 122 (operation S467). Upon determining that the changed data has not been input (accepted) (NO in operation S467), the control unit 11 returns the processing to operation S466. When determination is made in operation S467 that the changed data has been input from the video data input unit 122 (YES in operation S467), the control unit 11 outputs the changed data to the multiplexing unit 13 (operation S468). The changed information generating unit 123 outputs the changed information 700 (state "2") to the multiplexing unit 13 (operation S469). The multiplexing unit 13 multiplexes the changed data to the divided video data 50D (operation S471). The multiplexing unit 13 repeatedly multiplexes a plurality of sets of the verification data 60 including the changed information 700 output in operation S469 to the divided video data 50D to generate transmission data 70 (operation S472). The control unit 11 outputs the generated transmission data 70 to the transmission unit 16. The transmission unit 16 transmits the transmission data 70 to the tuner 2 (operation S4721). In this case, the multiplexing unit 13 multiplexes the state "2" of the changed information 700 to the verification data 60 corresponding to the divided video data 50D being transmitted. The divided video data 50D including the changed data after multiplexing, and the changed information 700 (state "2") are transmitted.

For example, when the changed data is multiplexed to the divided video data 51, the changed information 71 (state "2") is multiplexed to the verification data 61. Also, the changed information 72, 73, and 74 (state "0", "0", and "0") are added to the other verification data 62, 63, and 64 of the divide video data 52, 53, and 54 respectively that are not transmitted. Subsequently, the processing is returned to operation S459, where the processing of the divided video data 50D to be transmitted next is performed. When determination is made in operation S473 that transmission has been completed regarding all of the divided video data 50D (YES in operation S473), the control unit 11 ends the processing. Ultimately, the verification data 60 to which the divide video data 54 and the changed information 700 (state "0", "1", or "2") are added is transmitted.

The tuner 2 receives the transmission data 70 transmitted in operation S465 or operation S4721 at the reception unit 26 (operation S475). The reception unit 26 subjects the transmission data 70 to demodulation and the like, and sequentially outputs the transmission data 70 after demodulation to the control unit 21. The control unit 21 successively stores the received transmission data 70 in the storage unit 25 (operation S476). The control unit 21 separates the video data ID, the specific information, the verification data 60, and the changed information 700 (operation S477). Subsequently, the control unit 21 stores the video data ID, the specific information, the verification data 60, and the changed information 700 after separation (operation S478). Note that the changed information 700 changes according to transmission situations and change situations as appropriate, but such changes may be stored as histories. In addition, the changed information 700 may be overwrite-saved. With the present embodiment, description will be made regarding an example wherein when no change occurs on the changed information 700, the control unit 21 overwrite-saves the changed information 700, otherwise the control unit 21 stores all of the changed information 700 as histories.

The control unit 21 determines whether or not reception of one of the divided video data 50D has been completed (operation S479). Upon determining that reception of one of the divided video data 50D has not been completed (NO in operation S479), the control unit 21 proceeds to operation S475, and subsequently performs reception of one of the divided video data 50D. On the other hand, upon determining that reception of one of the divided video data 50D has been completed (YES in operation S479), the control unit 21 reads out the video data ID, the specific information, and the divided video data 50D from the storage unit 25, and separates the divided video data 50D (operation S481). The control unit 21 stores the video data ID, the specific information, and the separated divided video data 50D in the storage unit 25 (operation S482).

The control unit 21 determines whether or not all of the divided video data 50D has been received (operation S483). Upon determining that all of the divided video data 50D has not been received (NO in operation S483), the control unit 21 proceeds to operation S475 to repeat the above processing. Upon determining that all of the divided video data 50D has been received (YES in operation S483), the control unit 21 determines whether or not the state of the changed information 700 of which the specific information is the greatest is "0" (operation S484). That is to say, the control unit 21 determines whether the changed information 700 of the divided video data 54 to be transmitted last is "0" or "2" due to the change.

Upon determining that the changed information 700 is not "0" (NO in operation S484), the control unit 21 ends the processing to maintain the state "2" indicating that change has been performed. On the other hand, upon determining that the changed state is "0" (YES in operation S484), the control unit 21 changes the state of the changed information 700 of which the specific information is the greatest to "1" to indicate that all of the divided video data 50D has been received without change, and stores the changed state in the storage unit 25 (operation S485).

Figure 49:
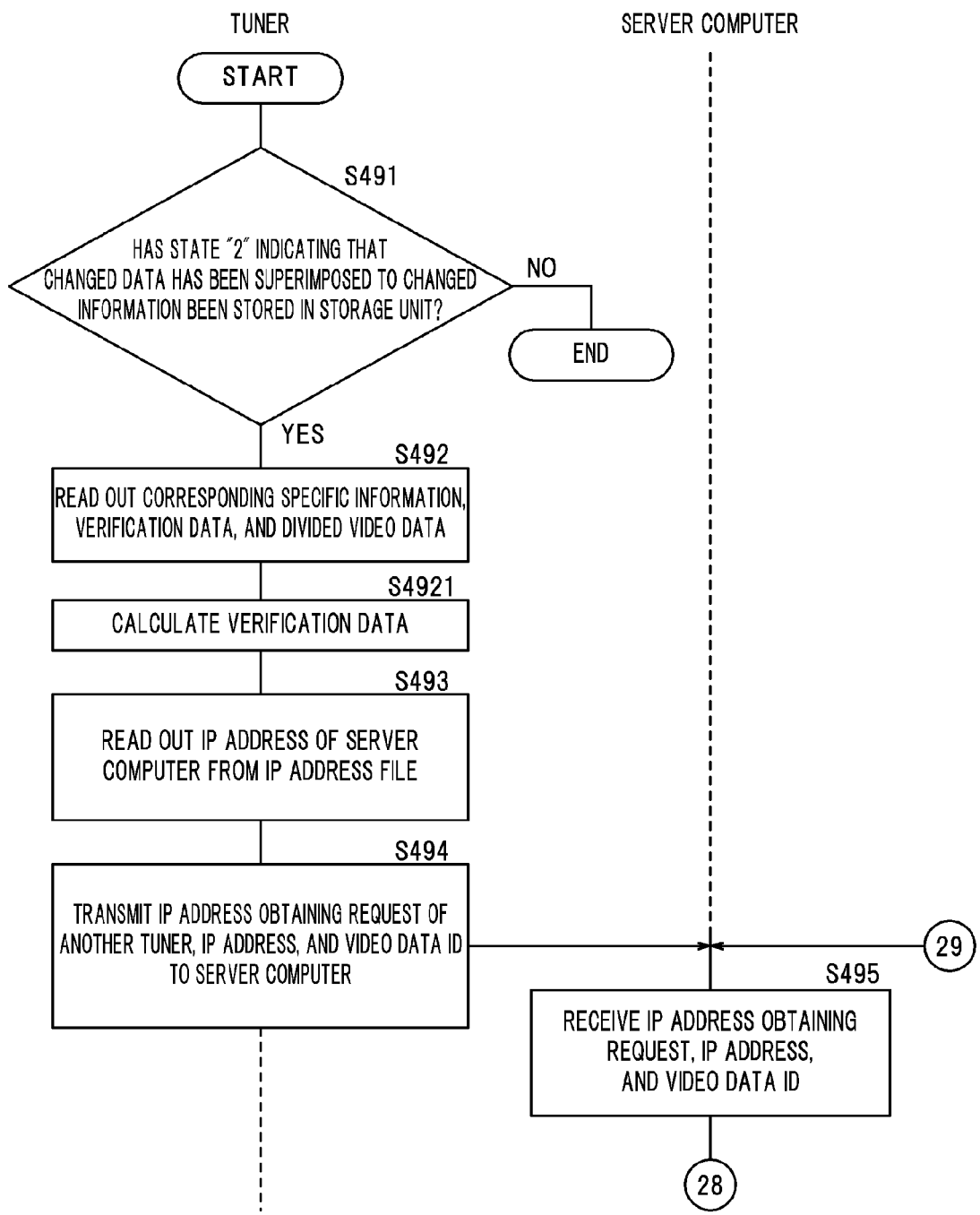
FIG. 49 is a flowchart illustrating the procedures of error correction processing.
Figure 50:
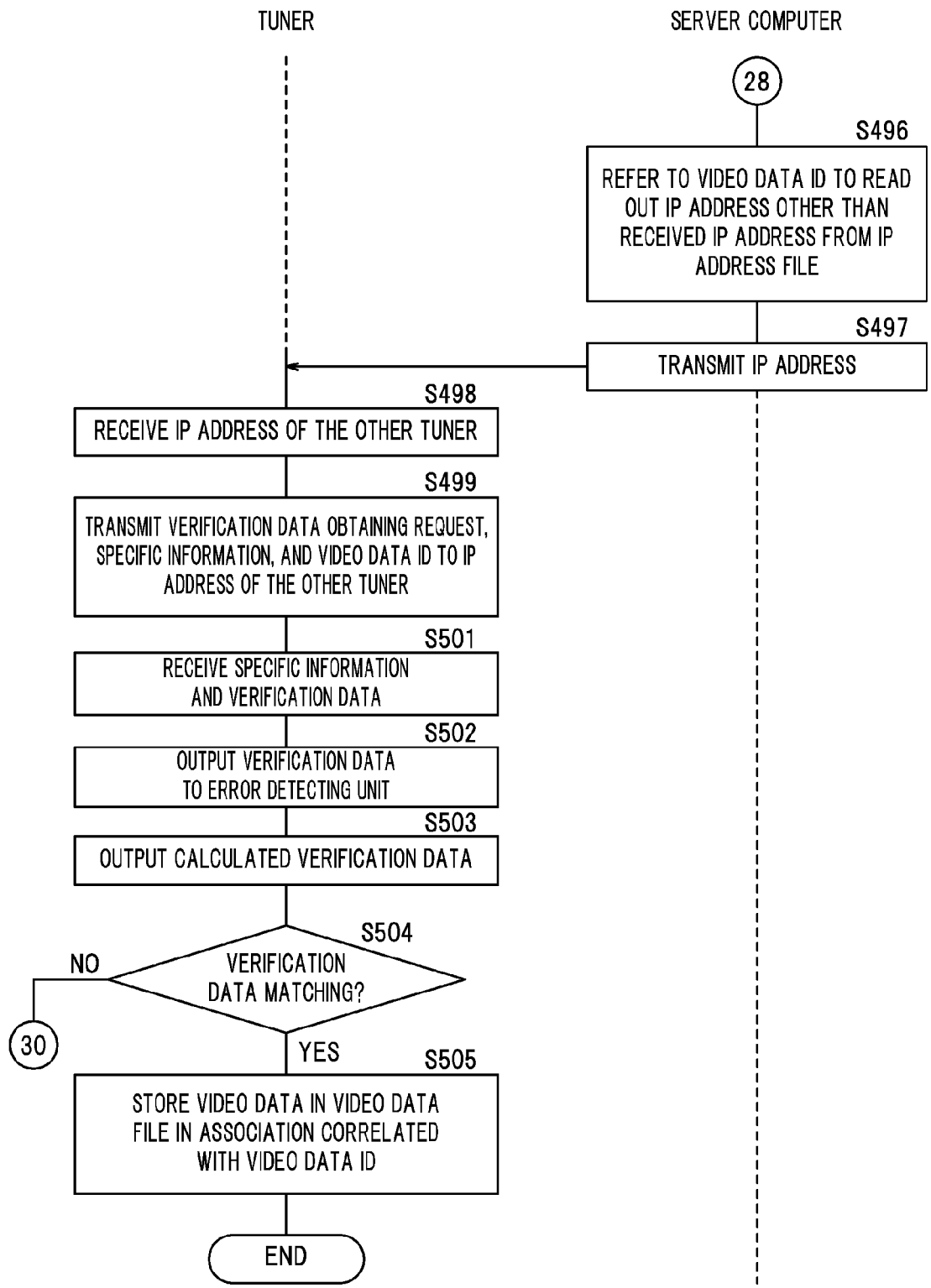
FIG. 50 is a flowchart illustrating the procedures of the error correction processing.
Figure 51:
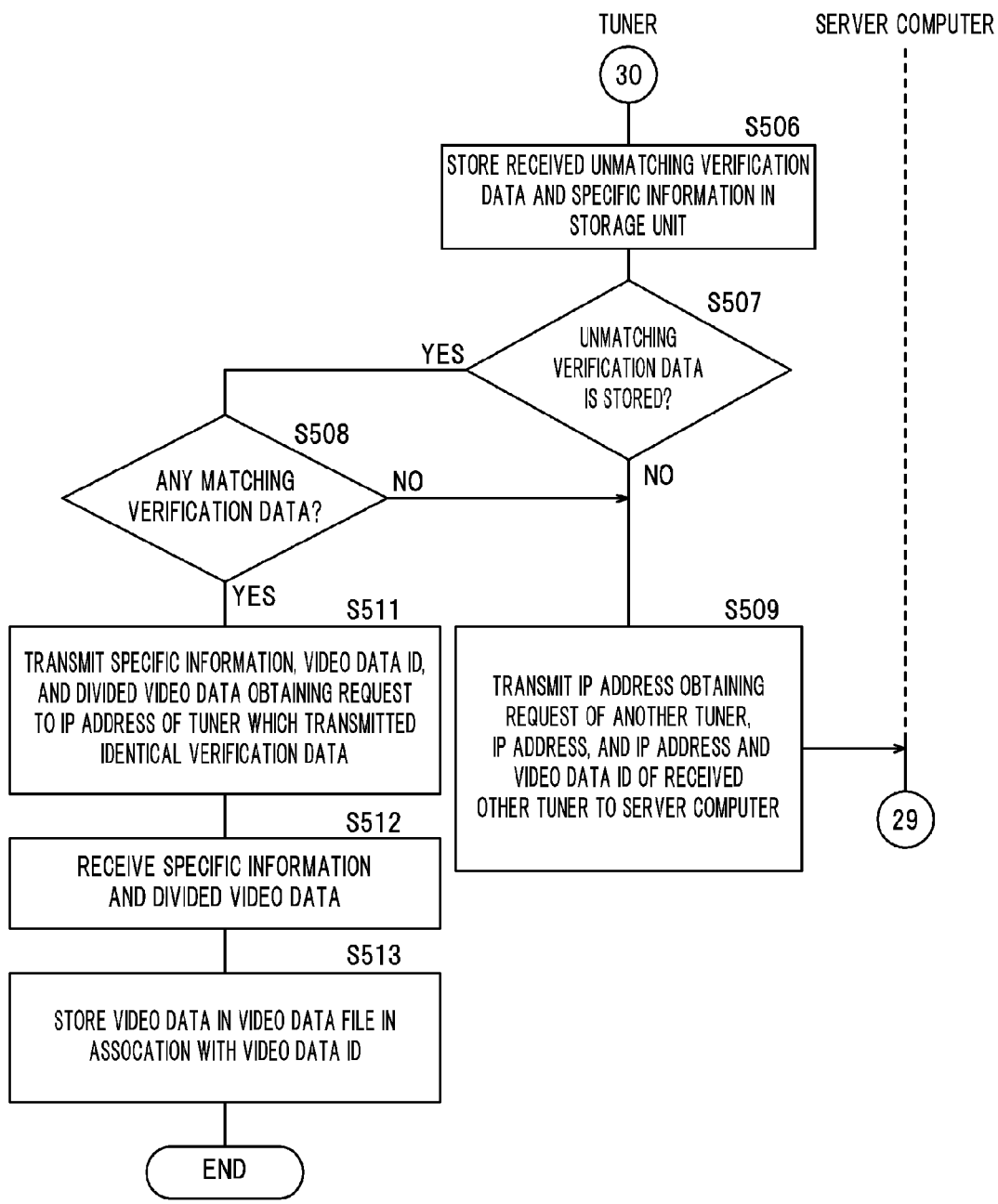
FIG. 51 is a flowchart illustrating the procedures of the error correction processing.

FIG. 49 through FIG. 51 are flowcharts illustrating the procedures of the error correction processing. The control unit 21 of the tuner 2 performs the following processing in parallel with the processing in operation S111 and thereafter in FIG. 11. The control unit 21 determines whether or not the state "2" indicating that the changed data has been superimposed upon the changed information 700 is stored in the storage unit 25 (operation S491). For example, the control unit 21 determines this with reference to the changed information 700 stored in the storage unit 25 in operation S478. Upon determining that the state "2" is not stored (NO in operation S491), the control unit 21 ends the processing.

Upon determining that the state "2" is stored (YES in operation S491), the control unit 21 reads out the specific information, the verification data 60, and the divided video data 50D corresponding to the state "2" from the storage unit 25 (operation S492). With the above example, the specific information 54D, the verification data 64, and the divided video data 54 are read out. The control unit 21 outputs the read divided video data 50D to the verification data generating unit 22. The verification data generating unit 22 calculates the verification data 60 of the divided video data 50D to which the changed data is added (operation S4921). The control unit 21 reads out the IP address of the server computer 3 from the IP address file 252 (operation S493). The control unit 21 transmits an obtaining request for the IP address of another tuner 2, the IP address of the tuner 2 itself, and the video data ID to the server computer 3 addressed to the IP address read out via the communication unit 24 (operation S494). The CPU 31 of the server computer 3 receives the obtaining request for the IP address, the IP address, and the video data ID via the communication unit 36 (operation S495).

The CPU 31 refers to the video data ID to read out an IP address other than the received IP address from the IP address file 352 (operation S496). The CPU 31 transmits the IP address read out via the communication unit 36 to the tuner 2 (operation S497).

Thus, the tuner 2 receives (obtains) the IP address of the other tuner 2 via the communication unit 24 (operation S498). The control unit 21 of the tuner 2 transmits an obtaining request for the verification data 60, the specific information read out in operation S492, and the video data ID to the IP address of the other tuner 2 (operation S499). The control unit 21 of the other tuner 2 refers to the video data ID and the specific information to read out the divided video data 50D from the video data file 251. The control unit 21 outputs the read divided video data 50D to the verification data generating unit 22. The verification data generating unit 22 calculates the verification data 60, and outputs the calculated verification data 60 to the control unit 21. The control unit 21 of the other tuner 2 transmits the calculated verification data 60 to the tuner 2 which transmitted the obtaining request. The control unit 21 receives the specific information and the verification data 60 transmitted from the other tuner 2 via the communication unit 24 (operation S501).

The control unit 21 outputs the verification data 60 received from the other tuner 2 to the error detecting unit 23 (operation S502). The control unit 21 outputs the verification data 60 calculated in operation S4921 to the error detecting unit 23 (operation S503). The error detecting unit 23 determines whether or not the verification data 60 match each other (operation S504). Upon determining that the verification data 60 match each other (YES in operation S504), the control unit 21 regards the divided video data 50D to which the changed data is multiplexed as error-free, and proceeds to operation S505. The control unit 21 reads out specific information and divided video data 50D from the storage unit 25. The control unit 21 connects the divided video data 50D read out in the specific information order, and stores the connected video data 50 in the video data file 251 in association with the video data ID (operation S505).

Upon determining that the verification data 60 do not match each other (NO in operation S504), the error detecting unit 23 stores the unmatching verification data 60 and the specific information according to the other tuner 2 received in operation S501 in the storage unit 25 (operation S506). The control unit 21 determines whether or not the unmatching verification data 60 is stored (operation S507). Upon determining that the unmatching verification data 60 is not stored (NO in operation S507), the control unit 21 proceeds to operation S509.

The control unit 21 transmits an obtaining request for the IP address of another tuner 2, the own IP address, the received IP address received in operation S498, and the video data ID to the server computer 3 (operation S509). Subsequently, the processing proceeds to operation S495. The verification data 60 is accumulated from the plurality of other tuners 2 by repeating the above processing.

Upon determining that the verification data 60 is stored (YES in operation S507), the control unit 21 determines whether or not there is any matching verification data 60 (operation S508). Upon determining that there is no matching verification data 60 (NO in operation 508), the control unit 21 advances the processing to operation S509. Upon determining that there is matching verification data 60 (YES in operation 508), the control unit 21 transmits the specific information, the video data ID, and an obtaining request for divided video data 50D to the IP address of the tuner 2 which transmitted the matching verification data 60 (operation S511). Note that, with regard to the IP address of the other tuner 2, the IP address corresponding to the unmatching verification data 60 stored in operation S506 may be referenced.

The control unit 21 of the tuner 2 receives the specific information and the divided video data 50D transmitted from the other tuner 2 (operation S512). The control unit 21 reads out the divided video data 50D of specific information other than the received specific information from the storage unit 15. The control unit 21 connects the divided video data 50D in the specific information order to generate video data 50. The control unit 21 stores the generated video data 50 in the video data file 251 in association with the video data ID (operation S513). Thus, even in the case that the video data 50 is changed during transmission, an error may be corrected while reducing communication load.

With the present embodiment, of portions of which the detailed descriptions were omitted, the portions corresponding to those in the above embodiment are denoted with the same reference numerals and description thereof will be omitted.

Figure 52:
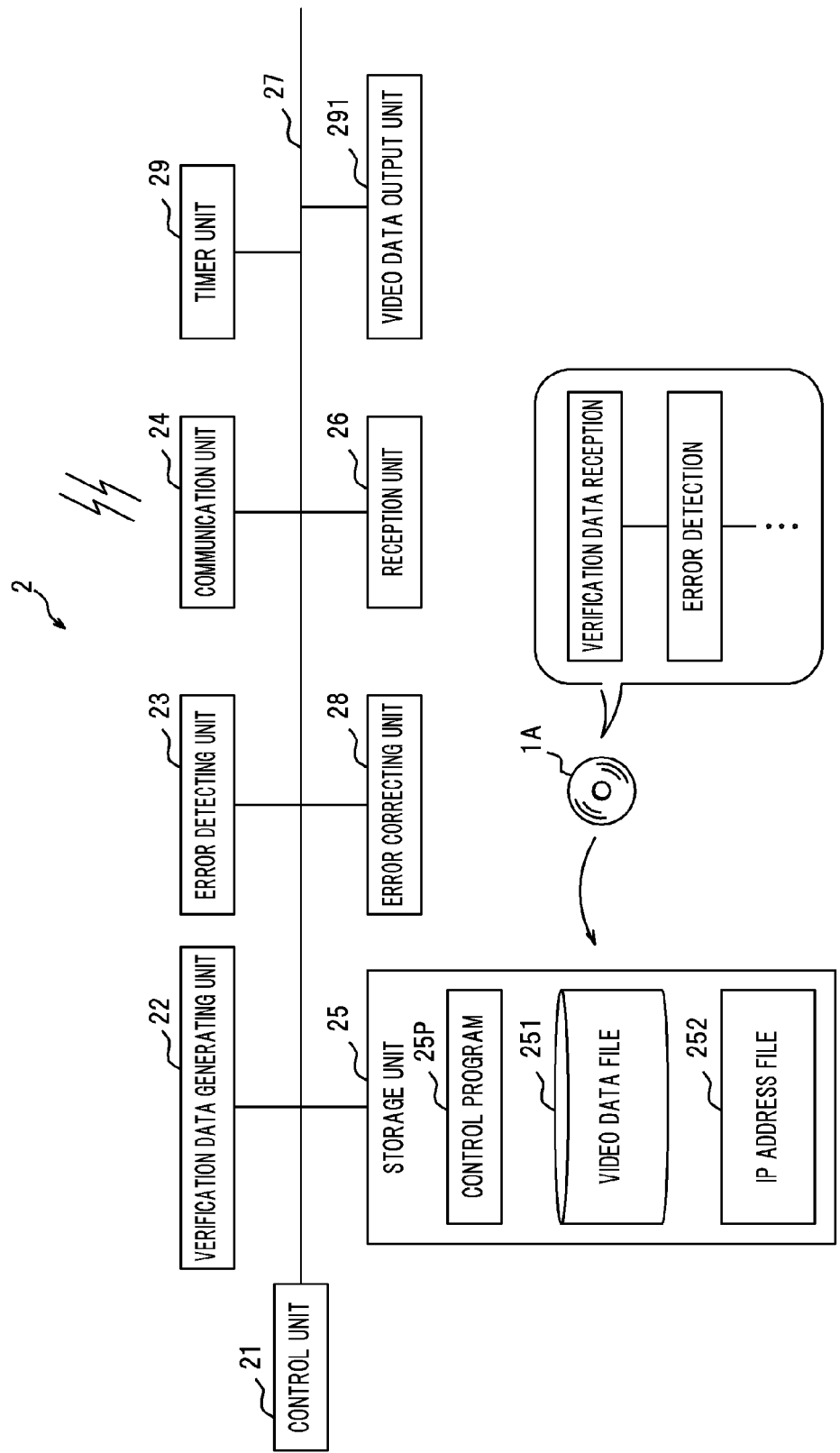
FIG. 52 is a block diagram illustrating the hardware of a tuner.

Yet another embodiment will be described. FIG. 52 is a block diagram illustrating the hardware group of a tuner 2 according to the present embodiment. A program causing the tuner 2 according to the above embodiment to operate may be stored in the storage unit 25 like the present embodiment by causing a reading unit (not illustrated) to read a transportable recording medium 1A such as CD-ROM or the like. Hereafter, such a recording medium will be referred to as a transportable recording medium. Also, the program may be downloadable via the communication unit 24 from another server computer (not illustrated) to be connected via the communication network N such as the Internet or the like. Hereafter, such a recording medium will be referred to as a network recording medium. Note that the network recording medium is neither a carrier itself used for a wireless network nor a transmission path itself such as an optical cable used for a cable network, but a recording medium to be accessed via a transmission path. The transportable and network recording media are not restricted to the above recording media, and rather a hard disk or another recording medium may be used. Also, the transportable recording medium is not restricted to CD-ROM, and rather another medium such as flash memory or the like may be used. Also, the network recording medium is not restricted to a hard disk to be built in a server computer connected to a communication network, and rather another recording medium may be used. The content thereof will be described below.

A tuner 2 illustrated in FIG. 52 downloads a program for receiving verification data 60 to detect an error, or the like, from another server computer (not illustrated) by a transportable recording medium 1A or via the communication network N. The program is installed as the control program 25P, loaded, and executed. Thus, the program serves as the control unit 21 of the above tuner 2.

With the present embodiment, of portions of which the detailed descriptions were omitted, the portions corresponding to those in the above embodiment are denoted with the same reference numerals and description thereof will be omitted.

Figure 53:
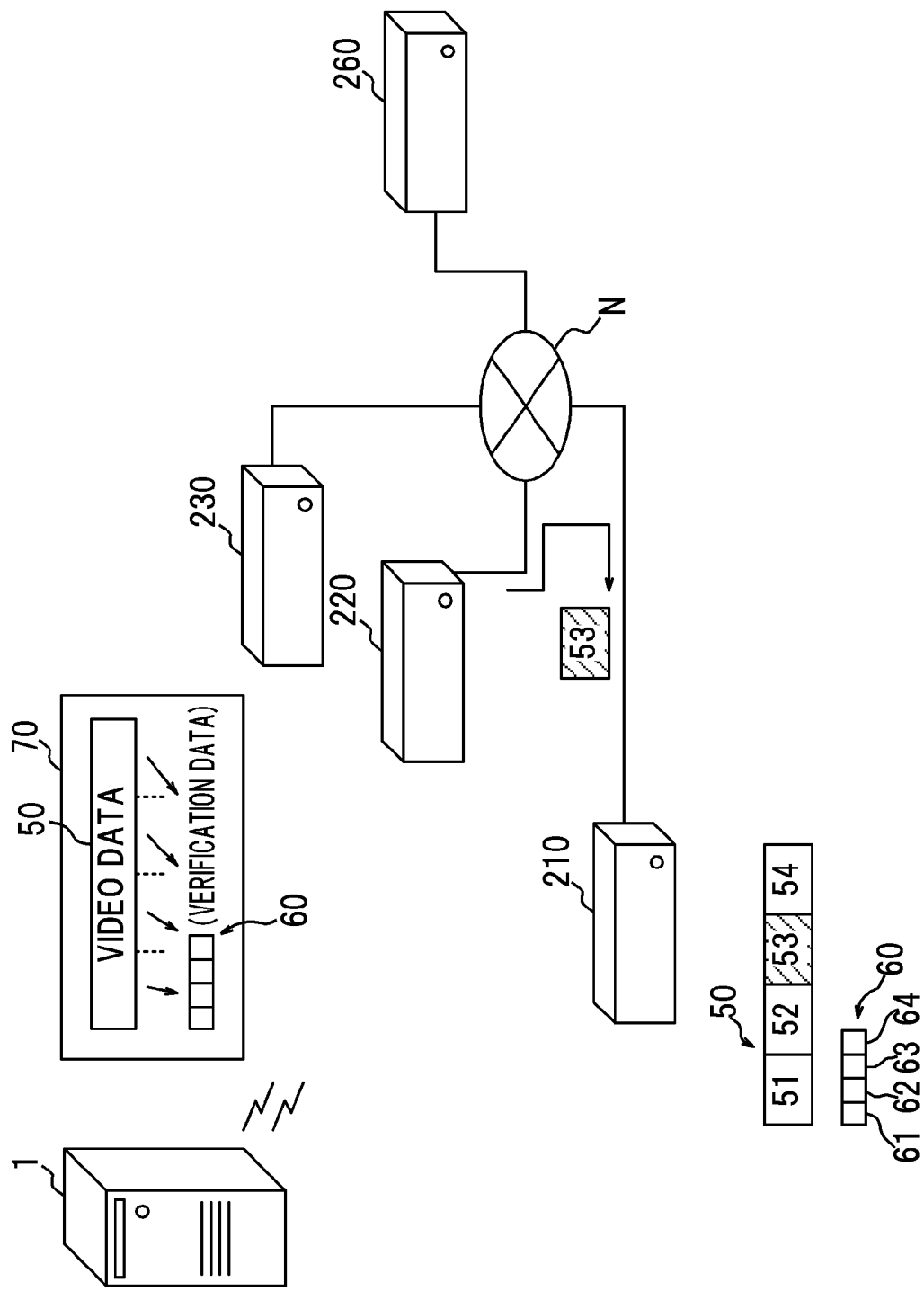
FIG. 53 is a diagram illustrating a content processing system.
Figure 54:
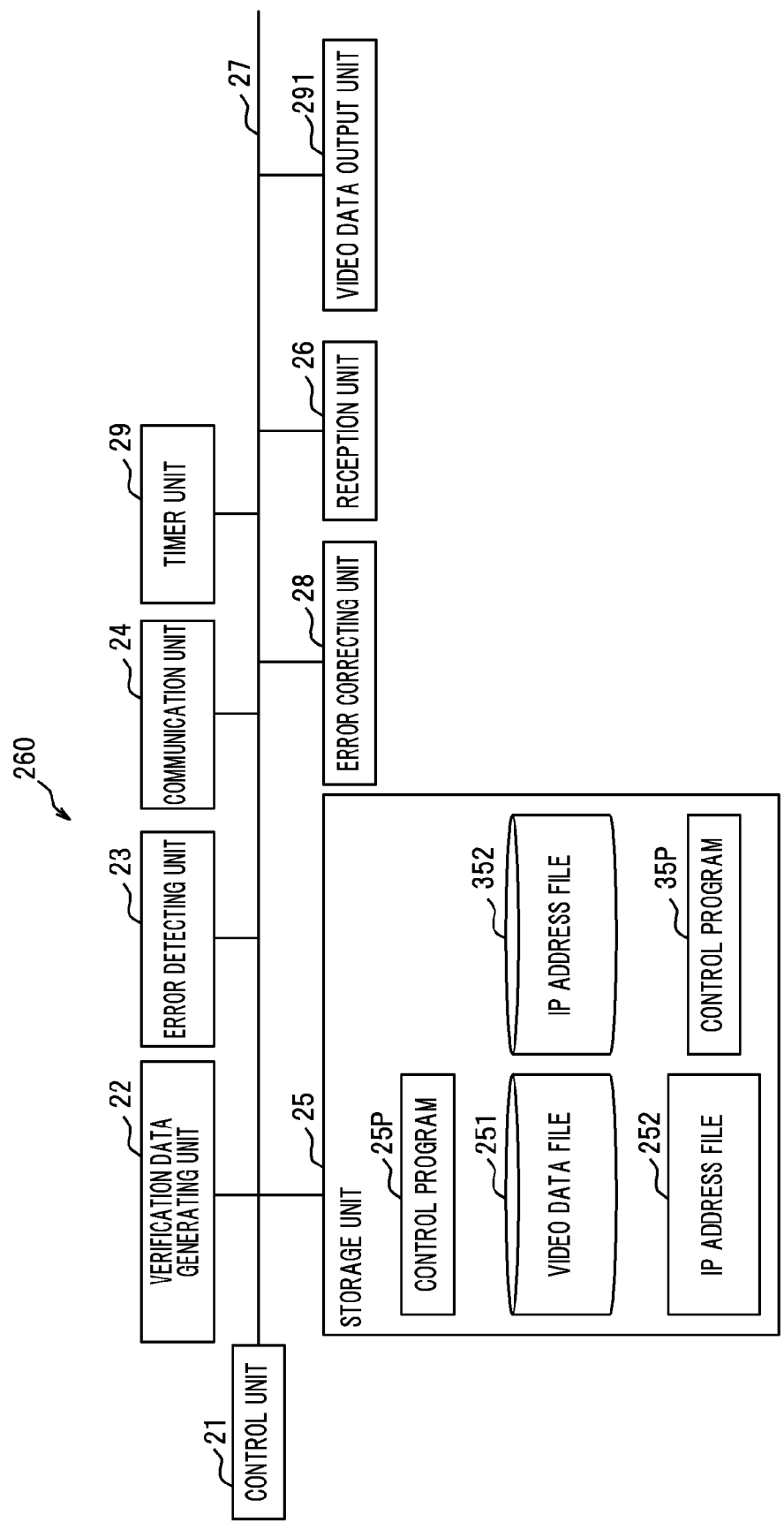
FIG. 54 is a block diagram illustrating the hardware of a tuner.

Yet another embodiment will be described. The present embodiment relates to an embodiment causing the information processing device 2 to serve as the information storage device 3. FIG. 53 is an explanatory diagram illustrating the outline of a content processing system according to the present embodiment. FIG. 54 is a block diagram illustrating the hardware group of a tuner 2 according to the present embodiment. The server computer 3 described in the above embodiment may be a tuner 2 having both the function of the server computer 3 and the function of the tuner 2 according to the above embodiment. A tuner 260 illustrated in FIG. 53 has functions of both the tuner 2 and the server computer 3, and according to an obtaining request for an IP address from a tuner 210 or the like, outputs the IP address stored in an IP address file 352 to the tuner 210.

As illustrated in FIG. 54, the control program 35P and the IP address file 352 stored in the storage unit 35 of the server computer 3 in FIG. 5, are stored in the storage unit 25. Upon accepting an obtaining request for an IP address, a tuner 260 refers to the IP address file 352 to output an IP address to another tuner 2 via the communication unit 24 in accordance with the control program 35P.

Figure 55:
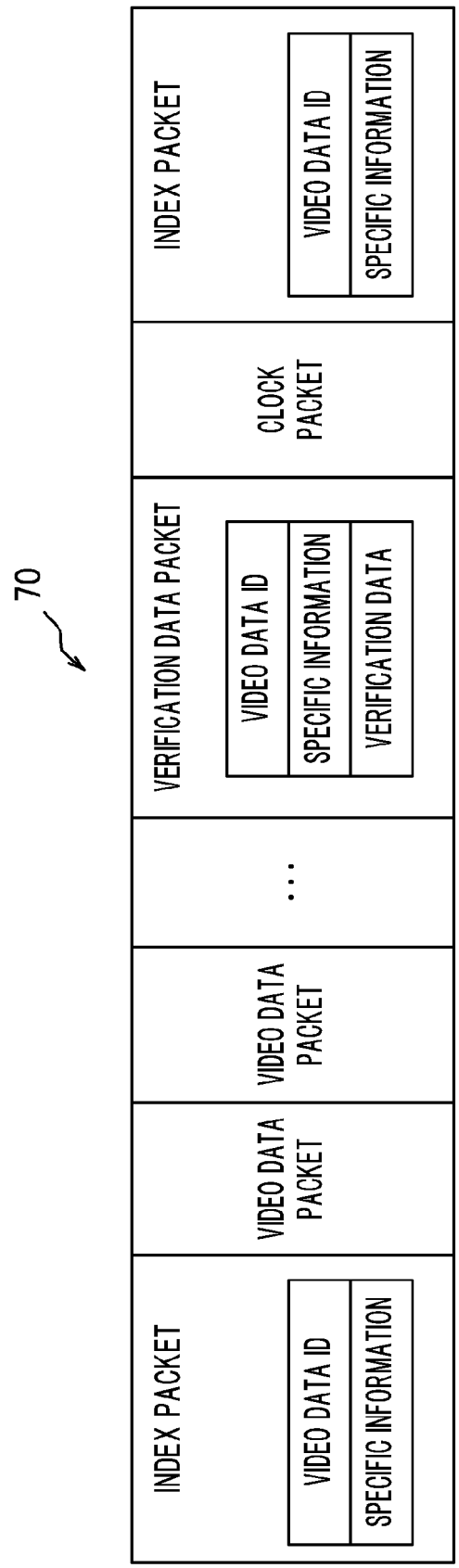
FIG. 55 is a diagram illustrating the data layout of transmission data.

FIG. 55 is an explanatory diagram illustrating the data layout of transmission data 70. FIG. 55 illustrates an example of transmission data 70 to be transmitted from the broadcast device 1 to the tuner 2 in operation S84 and the like. Transmission data 70 includes an index packet, a video data packet, a verification data packet, a clock packet, and the like. Note that description will be omitted regarding other packets such as an audio data packet and the like. The tuner 2 stores the received transmission data 70 in the storage unit 25. In this case, the control unit 21 may separate a verification data packet, and a video data packet and the like to store them in the storage unit 25.

Figure 56:
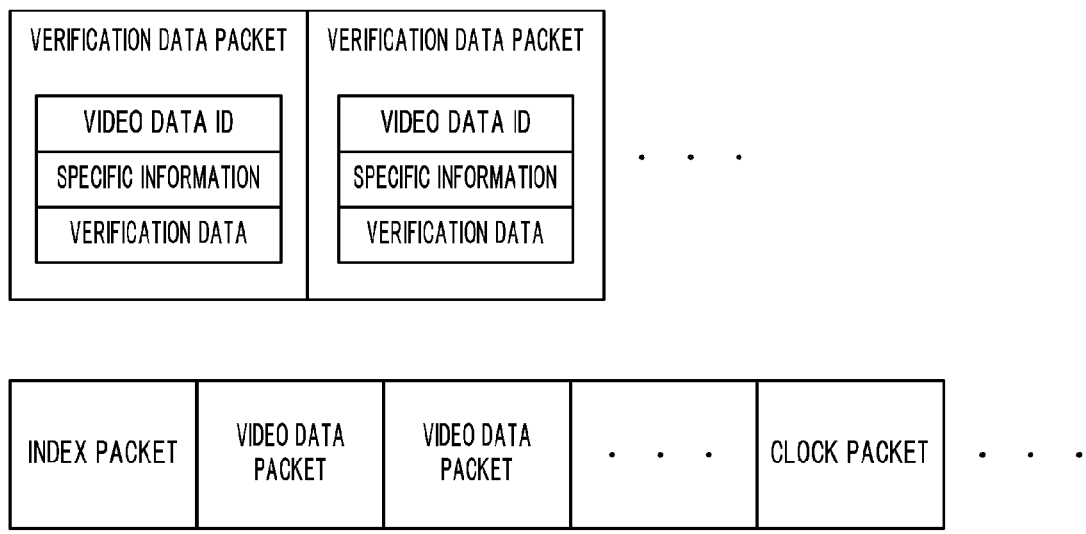
FIG. 56 is a diagram illustrating an example of a packet to be stored in a storage unit.

FIG. 56 is an explanatory diagram illustrating an example of packets to be stored in the storage unit 25. A verification data packet is extracted, the extracted verification data packet, and an index packet, video data packet, clock packet, and the like are separated and stored in the storage unit 25.

With the present embodiment, of portions of which the detailed descriptions were omitted, the portions corresponding to those in the above embodiment are denoted with the same reference numerals and description thereof will be omitted.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A non-transitory machine readable medium in which a program causing an information processing device to process content transmitted by a transmission device is recorded, the program causing the information processing device to execute:
   a receiving operation which receives, from the transmission device, divided content, specific information for specifying the divided content, and first verification data corresponding to the divided content;
   a detecting operation which detects an error of the divided content by comparing the first verification data received in the receiving operation and second verification data that is calculated based on the divided content received in the receiving operation and the specific information received in the receiving operation; and
   an obtaining operation which obtains divided content specified by the specific information from another information processing device different from the transmission device, when the error of the divided content is detected in the detecting operation.

2. The non-transitory machine readable recording medium in which the program according to claim 1 is recorded, the obtaining operation comprising:
   an operation for requesting an information storage device which stores transmission destination information indicating one of plurality of information processing devices that receive the content transmitted by the transmission device, to obtain the transmission destination information, when the error of the divided content is detected in the detecting operation;
   an operation for obtaining the transmission destination information from the information storage device;
   an operation for referring to the transmission destination information to request the another information processing device corresponding to the transmission destination information, for the other divided content corresponding to the divided content;
   an operation for receiving the other divided content transmitted from the another information processing device; and
   a determining operation for determining whether the second verification data calculated based on the other divided content received from the another information processing device, and the first verification data received in the receiving operation match.

3. The non-transitory machine readable recording medium in which the program according to claim 2 is recorded, wherein the receiving operation includes receiving the content and the first verification data as hash values to be calculated based on the divided content obtained by dividing the content, from the transmission device;
   and wherein the detecting operation includes
   an operation for calculating hash values based on the divided content obtained by dividing the content received in the receiving operation,
   an operation for determining whether the hash values related to the divided content, and the first verification data related to the divided content received in the receiving operation match, and an operation for outputting information indicating that the divided content related to unmatching verification data includes an error, when determining that the hash values and the first verification data do not match.

4. The non-transitory machine readable recording medium in which the program according to claim 3 is recorded, the receiving operation comprising:

an operation for receiving the content from the transmission device; and an operation for repeatedly receiving the first verification data as hash values to be calculated based on the divided content obtained by dividing the content, from the transmission device.

5. The non-transitory machine readable recording medium in which the program according to claim 4 is recorded, the receiving operation further comprising:

an operation for receiving first auxiliary verification data calculated based on the first verification data; and an operation for determining whether the first auxiliary verification data calculated based on the first verification data received in the receiving operation, and the received second auxiliary verification data match; and wherein the detecting operation detects an error of the divided content on a condition that is determined to match the first auxiliary verification data and the second auxiliary verification data.

6. The non-transitory machine readable recording medium in which the program according to claim 4 is recorded, the receiving operation comprising:

an operation for receiving changed information indicating that a piece of divided content was changed while receiving the content; where in the program further comprises a calculating operation for calculating third verification data based on the piece of divided content when receiving the changed information; an operation for requesting the information storage device to obtain the transmission destination information;

an operation for obtaining the transmission destination information from the information storage device;

an operation for referring to the transmission destination information to request the another information processing device corresponding to the transmission destination information for the third verification data corresponding to the piece of divided content;

an operation for receiving the third verification data transmitted from the another information processing device; and a change determining operation for determining whether the second verification data received from the another information processing device and the third verification data calculated in the calculating operation match.

7. The non-transitory machine readable recording medium in which the program according to claim 6 is recorded, the program further comprising:

an operation for referring to the transmission destination information to request a plurality of other information processing devices corresponding to the transmission destination information for the third verification data corresponding to the piece of divided content, when the determination is made in the change determining operation that the second verification data received from the another information processing device and the third verification data calculated in the calculating operation do not match;

an operation for receiving the third verification data transmitted from the plurality of other information processing devices;

an operation for extracting matching verification data among of the first verification data, the second verification data, and the third verification data;

an operation for requesting a third information processing device which transmitted the matching verification data, to obtain the piece of divided content; and an operation for obtaining the piece of divided content transmitted from the third information processing device.

8. The non-transitory machine readable recording medium in which the program according to claim 2 is recorded, the receiving operation comprising:

an operation for receiving related information of the content transmitted by the transmission device and other content transmitted by the another transmission device; wherein the program further comprises:

an operation for requesting the information storage device which stores, in association with the related information, the transmission destination information of the other content that the another transmission device transmits, to obtain transmission destination information of the content corresponding to the related information, when the second verification data calculated based on the other divided content received from the another information processing device, and the first verification data received in the receiving operation is determined to not match;

an operation for obtaining the transmission destination information of the content from the information storage device;

an operation for referring to the transmission destination information to request the another information processing device corresponding to the transmission destination information for the other divided content corresponding to the divided content;

an operation for receiving the other divided content transmitted from the another information processing device; and an operation for determining whether the second verification data to be calculated based on the other divided content received from the another information processing device, and the first verification data received in the receiving operation match.

9. The non-transitory machine readable recording medium in which the program according to claim 1 is recorded, the obtaining operation comprising:

an operation for requesting an information storage device which stores transmission destination information indicating a plurality of information processing devices that receive the content transmitted by the transmission device, to obtain the transmission destination information, when the error of the divided content is detected in the detecting operation;

an operation for obtaining the transmission destination information from the information storage device;

an operation for referring to the transmission destination information to request the another information processing device corresponding to the transmission destination information, for the second verification data corresponding to the other divided content;

an operation for receiving the second verification data transmitted from the another information processing device;

a determining operation for determining whether the second verification data received from the another information processing device and the first verification data received in the receiving operation match; and an operation for obtaining the other divided content corresponding to the second verification data from the another information processing device, when the second verification data received from the another information processing device and the first verification data received in the receiving operation match.

10. The non-transitory machine readable recording medium in which the program according to claim 9 is recorded, the receiving operation comprising:

an operation for receiving related information about the content transmitted by the transmission device and other content transmitted by the another transmission device; where in the program further comprises an operation for requesting the information storage device which stores, in association with the related information, the transmission destination information of the other content that the another transmission device transmits, to obtain the transmission destination information of the content corresponding to the related information, when determining that the second verification data received from the another information processing device and the first verification data received in the receiving operation do not match in the determination operation;

an operation for obtaining the transmission destination information of the content from the information storage device;

an operation for referring to the transmission destination information to request the another information processing device corresponding to the transmission destination information for the second verification data corresponding to the other divided content;

an operation for receiving the second verification data transmitted from the another information processing device;

an operation for determining whether the second verification data received from the another information processing device, and the first verification data received in the receiving operation match; and an operation for obtaining the other divided content corresponding to the second verification data from the another information processing device, when determining that the second verification data received from the another information processing device and the first verification data received by the receiving operation match.

11. An information processing device which processes content transmitted from a transmission device, the information processing device comprising:

a processor configured to receive divided content, specific information for specifying the divided content and first verification data corresponding to the divided content from the transmission device;

detect an error of the divided content by comparing the received first verification data and second verification data that is calculated based on the received divided content and the received specific information; and obtain divided content specified by the specific information from another information processing device different from the transmission device, when the error of the divided content is detected.

12. A content processing method for processing content transmitted from a transmission device to an information processing device, the method comprising:

receiving, by the processing device, divided content, specific information for specifying the divided content and first verification data corresponding to the divided content from the transmission device;

detecting an error of the divided content by comparing the received first verification data and second verification data that is calculated based on the received divided content and the received specific information; and obtaining divided content specified by the specific information from another information processing device different from the transmission device, when the error of the divided content is detected.

13. A content processing system comprising:

a transmission device; and an information processing device which processes content transmitted from the transmission device, the information processing device configured to receive divided content, specific information for specifying the divided content, and first verification data corresponding to the divided content from the transmission device;

detect an error of the divided content by comparing the received first verification data and second verification data that is calculated based on the received divided content and the received specific information; and obtain divided content specified by the specific information from another information processing device different from the transmission device, when the error of the divided content is detected.

* * * * *